United States Patent
Nakashima et al.

(10) Patent No.: US 6,491,321 B1
(45) Date of Patent: Dec. 10, 2002

(54) MULTISTAGE GAS GENERATOR FOR AIR BAG AND AIR BAG APPARATUS

(75) Inventors: Yoshihiro Nakashima, Himeji (JP); Nobuyuki Ohji, Himeji (JP); Nobuyuki Katsuda, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/713,040

(22) Filed: Nov. 16, 2000

Related U.S. Application Data

(62) Division of application No. 09/601,238, filed as application No. PCT/JP00/00800 on Feb. 15, 2000.

(30) Foreign Application Priority Data

| Feb. 16, 1999 | (JP) | ............................................ 11-37909 |
| Mar. 4, 1999 | (JP) | ............................................ 11-57127 |
| Mar. 23, 1999 | (JP) | ............................................ 11-78306 |
| Jun. 11, 1999 | (JP) | ............................................ 11-165924 |
| Jun. 14, 1999 | (JP) | ............................................ 11-167317 |
| Sep. 20, 1999 | (JP) | ............................................ 11-265998 |
| Dec. 1, 1999 | (JP) | ............................................ 11-342150 |

(51) Int. Cl.[7] .............................................. B60R 21/26
(52) U.S. Cl. ........................ 280/736; 280/741; 280/742; 102/530
(58) Field of Search ................................. 280/736, 741, 280/742; 55/529; 102/530

(56) References Cited

U.S. PATENT DOCUMENTS

| 3,877,882 A | | 4/1975 | Lette et al. |
| 3,972,545 A | | 8/1976 | Kirchoff et al. |
| 4,865,635 A | * | 9/1989 | Cuevas |
| 4,950,458 A | | 8/1990 | Cunningham |
| 4,998,751 A | | 3/1991 | Paxton et al. |

(List continued on next page.)

FOREIGN PATENT DOCUMENTS

| DE | 135005 C | 1/1902 |
| DE | 4019677 A1 | 1/1992 |
| DE | 4141620 A | 7/1992 |
| DE | 19520847 A | 12/1996 |
| DE | 9117212 U | 3/1997 |
| DE | 19611102 A | 9/1997 |
| DE | 29708380 U | 9/1997 |
| DE | 19620758 A1 | 11/1997 |
| DE | 29801477 U | 6/1998 |
| DE | 19725452 A | 12/1998 |
| DE | 19732825 A | 2/1999 |
| DE | 19816216 A | 10/1999 |
| EP | 0012627 A | 6/1980 |
| EP | 0359408 A | 3/1990 |

(List continued on next page.)

OTHER PUBLICATIONS

"Variable Output Pyrotechnic Air Bag Inflator," Research Disclosure, GB, Nov. 1995, No. 379, pp. 743–745.

(List continued on next page.)

*Primary Examiner*—Paul N. Dickson
*Assistant Examiner*—Toan C To
(74) *Attorney, Agent, or Firm*—Birch, Stewart, Kolasch & Birch, LLP

(57) ABSTRACT

A gas generator for an air bag includes: a housing having top and bottom plates and a cylindrical wall provided between those plates; a cylindrical filter unit, provided inside the housing, at least one end of the filter unit having an inclining end surface such that the length of the filter unit in an axial direction thereof decreases as the distance from a central axis of the filter in a radial direction increases, an outer peripheral surface of the filter unit and an inner surface of the cylindrical wall defining a plenum; and a supporting portion formed inside the housing and having an inclining surface substantially parallel to the inclining end surface of the filter unit. The supporting portion engages with the inclining end surface such that the plenum is maintained even when the filter unit is urged to expand in the radial direction by the combustion gas.

14 Claims, 29 Drawing Sheets

U.S. PATENT DOCUMENTS

| | | | |
|---|---|---|---|
| 5,009,855 A | | 4/1991 | Nilsson |
| 5,017,147 A | | 5/1991 | Sugiyama et al. |
| 5,215,721 A | * | 6/1993 | Tasaki et al. |
| 5,219,178 A | | 6/1993 | Kobari et al. |
| 5,221,107 A | | 6/1993 | O'Loughlin |
| 5,320,382 A | | 6/1994 | Goldstein et al. |
| 5,340,339 A | | 8/1994 | Desai et al. |
| 5,387,007 A | | 2/1995 | Ogawa et al. |
| 5,464,249 A | | 11/1995 | Lauritzen et al. |
| 5,468,017 A | | 11/1995 | Kirsch et al. |
| 5,513,879 A | | 5/1996 | Patel et al. |
| 5,564,743 A | | 10/1996 | Marchant |
| 5,582,427 A | * | 12/1996 | Rink et al. |
| 5,582,428 A | | 12/1996 | Buchanan et al. |
| 5,613,705 A | | 3/1997 | Hock et al. |
| 5,630,619 A | | 5/1997 | Buchanan et al. |
| 5,643,345 A | | 7/1997 | Cox et al. |
| 5,685,558 A | | 11/1997 | Cuevas |
| 5,743,556 A | | 4/1998 | Lindsey et al. |
| 5,756,928 A | | 5/1998 | Ito et al. |
| 5,799,973 A | | 9/1998 | Bauer et al. |
| 5,839,754 A | | 11/1998 | Schlüter |
| 5,847,310 A | | 12/1998 | Nagahashi et al. |
| 5,951,041 A | | 9/1999 | Iwai et al. |
| 6,019,389 A | | 2/2000 | Burgi et al. |
| 6,032,979 A | | 3/2000 | Mossi et al. |
| 6,050,599 A | | 4/2000 | Marsaud et al. |
| 6,095,560 A | | 8/2000 | Perotto |
| 6,177,028 B1 | * | 1/2001 | Kanda et al. |
| 6,234,521 B1 | * | 5/2001 | Katsuda et al. |
| 6,250,673 B1 | * | 6/2001 | Unterforsthuber et al. |
| 6,257,617 B1 | * | 7/2001 | McFarland et al. |
| 6,283,505 B1 | * | 9/2001 | Saso et al. |

FOREIGN PATENT DOCUMENTS

| | | |
|---|---|---|
| EP | 0365739 A1 | 5/1990 |
| EP | 0382552 A | 8/1990 |
| EP | 0405962 A | 1/1991 |
| EP | 0544918 A1 | 6/1993 |
| EP | 0609981 A | 8/1994 |
| EP | 0665138 A2 | 8/1995 |
| EP | 0708003 A1 | 4/1996 |
| EP | 0733519 A2 | 9/1996 |
| EP | 0733520 A1 | 9/1996 |
| EP | 0773145 A2 | 5/1997 |
| EP | 0787630 A1 | 8/1997 |
| EP | 0788945 A2 | 8/1997 |
| EP | 0800964 A2 | 10/1997 |
| EP | 0841225 A1 | 5/1998 |
| EP | 0857627 A1 | 8/1998 |
| EP | 0870651 A1 | 10/1998 |
| EP | 0879739 A1 | 11/1998 |
| EP | 0901946 A | 3/1999 |
| EP | 0943502 A | 9/1999 |
| JP | 2169347 A | 6/1990 |
| JP | 5024498 A | 2/1993 |
| JP | 5053169 U | 7/1993 |
| JP | 5082713 U | 11/1993 |
| JP | 5319199 A | 12/1993 |
| JP | 7232613 A | 9/1995 |
| JP | 8090259 A | 4/1996 |
| JP | 2532786 B2 | 6/1996 |
| JP | 3029326 U | 7/1996 |
| JP | 8198048 A | 8/1996 |
| JP | 8207696 A | 8/1996 |
| JP | 8332911 A | 12/1996 |
| JP | 9183359 A | 7/1997 |
| JP | 3040049 U | 8/1997 |
| JP | 9207705 A | 8/1997 |
| JP | 9213417 A | 8/1997 |
| JP | 10-6912 A | 1/1998 |
| JP | 10006912 A | 1/1998 |
| JP | 10129400 A | 5/1998 |
| JP | 10181516 A | 7/1998 |
| JP | 10217899 A | 8/1998 |
| JP | 10241785 A | 9/1998 |
| JP | 10-263336 A | 10/1998 |
| JP | 10297416 A | 11/1998 |
| JP | 10315901 A | 12/1998 |
| JP | 10324219 A | 12/1998 |
| JP | 11048905 A | 2/1999 |
| JP | 11059318 A | 3/1999 |
| JP | 11091494 A | 4/1999 |
| JP | 11096868 A | 4/1999 |
| JP | 11217055 A | 8/1999 |
| WO | 94/25315 A1 | 11/1994 |
| WO | 9734784 A1 | 9/1997 |
| WO | 98/09355 A | 3/1998 |
| WO | 9908062 A1 | 2/1999 |
| WO | 9942339 A | 8/1999 |

OTHER PUBLICATIONS

"Dual Connector for Two–Stage Air Bag Inflator," Research Disclosure, GB, Apr. 1998, No. 408, pp. 320–321.

"Variable Output Initiator," Research Disclosure, GB, Industrial Opportunities Ltd. Havant, No. 384, Apr. 1, 1996, pp. 239–240.

* cited by examiner (a)   (b)

(a)

(b)

(c)

(d)

MULTISTAGE GAS GENERATOR FOR AIR BAG AND AIR BAG APPARATUS

This application is a divisional of co-pending application Ser. No. 09/601,238, filed on Jul. 31, 2000. Application Ser. No. 09/601,238 is the national phase of PCT International Application No. PCT/JP00/00800 filed on Feb. 15, 2000 under 35 U.S.C. §371. The entire contents of each of the above-identified applications are hereby incorporated by reference.

TECHNICAL FIELD OF THE INVENTION

The present invention relates to a multistage gas generator for an air bag and an air bag apparatus using the gas generator.

PRIOR ART

An air bag system which is mounted on various kinds of vehicles and the like including automobiles, aims to hold an occupant by means of an air bag (a bag body) rapidly inflated by a gas when the vehicle collides at a high speed so as to prevent the occupant from crashing into a hard portion inside the vehicle such as a steering wheel, a windscreen due to an inertia and being injured. This kind of air bag system generally comprises a gas generator to be actuated according to a collision of the vehicle and discharge a gas, and an air bag to introduce the gas to inflate.

It is desired that the air bag system of this type can safely restrain the occupant even when frame of the occupant (for example, whether a sitting height is long or short, whether an adult or a child, and the like), a sitting attitude (for example, an attitude of holding on the steering wheel) and the like are different. Then, there has been conventionally suggested an air bag system which actuates, applying an impact to the occupant as small as possible at the initial stage of the actuation. Gas generators in such a system are disclosed in JP-A 8-207696, U.S. Pat. Nos. 4,998,751 and 4,950,458. JP-A 8-207696 suggests a gas generator in which one igniter ignites two kinds of gas generating agent capsules so as to generate the gas at two stages. U.S. Pat. Nos. 4,998,751 and 4,950,458 suggest a gas generator in which two combustion chambers are provided for controlling actuation of the gas generator so as to generate the gas at two stages due to a expanded flame of the gas generating agent.

Further, in JP-A 9-183359, and DE-B 19620758, there is disclosed a gas generator in which two combustion chambers storing a gas generating agent are provided in a housing and an igniter is arranged in each combustion chamber, so as to adjust an activation timing of each of the igniters, thereby adjusting an output of the gas generator.

However, these above conventional gas generators are not a multistage gas generator for an air bag with a simple structure which can be manufactured easily, suppressing the entire size of the container (housing).

DISCLOSURE OF THE INVENTION

The present invention provides a multistage gas generator for an air bag, wherein, at the initial stage of actuation, the gas generator is actuated to give a passenger as a small impact as possible, and according to variation of passengers' physiques (such that a sitting height is tall or low, adult or child) and sitting postures (such as clinging to a steering wheel), actuation output of the gas generator and timing of increase of output can be arbitrarily adjusted in order to restrain the passenger safely, and the gas generator can be manufactured easily with a simple structure, the entire size of the container (housing) can be suppressed, and finally the volume ratio of each combustion chamber can be arbitrarily be adjusted.

The present invention is characterized in an inner structure, specially a layout structure of the combustion chambers capable of suppressing the entire size of the gas generator and adjusting the volume ratio of each of the combustion chambers arbitrarily in a multistage gas generator for an air bag provided with a plural combustion chambers inside the housing thereof.

In other words, the multistage gas generator of the present invention having a cylindrical housing comprising a diffuser shell with a plurality of gas discharge ports formed in a cylindrical side wall and a closure shell forming a inner space with the diffuser shell, a plurality of combustion chambers for accommodating gas generating means provided in a cylindrical housing, and ignition means disposed in the respective combustion chambers to ignite and burn the gas generating means, wherein, in the housing, at least one of the combustion chambers is disposed in the inner side of an inner shell provided eccentrically with respect to a center axis of the housing, the ignition means provided for the respective combustion chambers are disposed eccentrically with respect to the center axis of the housing.

Further, in the gas generator of the present invention, a communication hole which allows mutual communication between the combustion chambers can be provided.

An automatic ignition material (AIM) which is to be ignited and burnt by transmitted heat may be disposed in either one of the combustion chambers.

The present invention further provides a multistage air bag apparatus which comprises the above-described gas generator, an ignition signal-outputting means provided with as many outputting portions, which outputs activation signals to the igniters on impact, as the igniters of the ignition means, and a plurality of lead wires having connectors, the igniters and the outputting portions are connected to each other through the lead wires having the connectors, and the connectors include defining means for deciding the unique connection between one of the connectors and one of the outputting portions.

The above gas generator may further comprise a cylindrical filter means for purifying and/or cooling an activation gas, one or both of axial end surfaces of the filter means may be formed as inclining end surfaces which get narrower in the axial extending direction and the interior angle with respect to the inner peripheral surface is an acute angle, and a supporting portion which is opposed to the inclining end surface of the filter may be provided in the housing (a self-contracting type filter).

In the present invention, most of an outer surface of the inner shell can be in direct contact with gas generating agent existing outside of the inner shell without interposing a heat insulator. The gas generating agent comes into contact with the outer surface of the inner shell where the communication hole is provided. A wall of the inner shell exists between a first gas generating agent which burns first and the other second gas generating agent. Even if the first gas generating burns, the second gas generating agent will never start burning before actuation of a second igniter, and the second gas generating agent is burnt by actuation of the second igniter before a temperature of the second gas generating agent reaches an ignition temperature by heat transfer.

After the first gas generating is ignited, if the gas generator is left standing without igniting the second gas generating agent, the second gas generating agent is ignited after about 10 seconds.

In the present invention, it is generally preferable that the inner shell is of cylindrical shape whose upper end is closed and its horizontal cross sectional shape is circular. The horizontal cross sectional shape of the inner shell may be formed into various shapes such as rectangular shape and elliptic shape. However, it is desirable to form the horizontal cross sectional shape of the inner shell into circular in view of easiness of connection. The inner shell is disposed in the housing eccentrically with respect to the center axis of the housing. That is, the inner shell is disposed in the housing such that a center of the inner shell does not coincide with a center of the housing, and the inner shell is disposed in the housing eccentrically with respect to the cylindrical housing. Therefore, even if the plane shape of the housing is substantially elliptic, in case that the center of the plane shape and the center of the inner shell are deviated from each other, the inner shell and the housing are deviated from each other. Besides, the center axis of the housing is specified exclusively based on the plane shape of the cylindrical body, and even if the housing has a flange for mounting the housing to the module, the flange is not taken into consideration when the center axis of the housing is specified.

The ignition means disposed in the respective combustion chambers include an igniter which is actuated by electric signal. The igniters can be provided aligned in the axial direction of the housing. The closure shell constituting the housing can include a collar portion for fixing the igniter, and the igniter can be fixed to the collar portion. In this case, it is preferable that all igniters included in the respective ignition means are fixed to a single collar portion. This is because when the closure shell is formed including the collar portion, by fixing the plurality of igniters to the collar portion beforehand, the plurality of igniters can be fixed in the housing with a single operation for forming the closure shell, which is advantageous in manufacture.

The inner shell disposed in the housing eccentrically is of cylindrical shape and the inner shell includes an opening portion which opens by combustion of the gas generating means in one of the combustion chambers. The inner shell can be formed into another shape as described above. However, in view of easiness in connecting to the closure shell, it is preferable that the plane cross sectional shape is circle. The inner shell enable the gas to flow through the combustion chambers which are defined inside and outside of the inner shell by opening the opening portion. Such opening portion may be formed by forming a plurality of holes in the peripheral wall of the inner shell, and by closing the holes using breaking members. The holes closed by the breaking members can be opened exclusively by burning the gas generating means in the combustion chambers provided inside the inner shell. The hole is opened by combustion of the gas generating means, e.g., by rupturing, peeling, burning or detaching the breaking member due to a pressure caused by combustion of the gas generating means. Alternatively, this can be realized by providing the inner shell with a notch or by reducing the thickness of a portion of the inner shell. A shielding plate can be disposed outside of the opening portion, and the shielding plate can prevent flame generated in the combustion chamber provided outside the inner shell from coming into direct contact with the opening portion. The opening portion may be formed such as to be opened only by combustion of the gas generating means in one of the combustion chambers.

As described above, the inner shell is disposed in the housing eccentrically with respect to the center axis of the housing, and the ignition means disposed in each of the combustion chambers is disposed eccentrically with respect to the center axis of the housing. With this structure, it is possible to suppress the size of the housing to the minimum, and flexibility in volume, layout and the like of the combustion chamber can be maximized. That is, when two combustion chambers are defined in the housing, by disposing the inner shell eccentrically in the housing and defining a first combustion chamber on the outer side thereof and defining a second combustion chamber on the inner side, the volume ratio of the first and second combustion chambers can be freely changed by changing the volume of the inner shell. At that time, if the igniter of the ignition means disposed in each of the combustion chambers is also disposed eccentrically with respect to the center axis of the housing, the igniter disposed in the first combustion chamber will not be an obstacle to increase the volume of the second combustion chamber. Therefore, in the present invention, it is possible to maximize the flexibility in volume and the like of the first and second combustion chambers.

Further, the present invention provides a multistage gas generator for an air bag which is provided, in the combustion chamber inside the inner shell, with an automatic ignition material (AIM), to be ignited and burnt by heat generated by combustion of the gas generating means disposed in the combustion chamber outside the inner shell, and also provides a multistage gas generator for an air bag in which the automatic ignition material (AIM) is included in the ignition means disposed in the combustion chamber inside the inner shell. That is, in most cases, when the multistage type gas generator is actuated, all the ignition means are actuated and the gas generating means in all the combustion chambers are burnt. However, under a certain actuating condition, there is a case in which only one of the ignition means is actuated intentionally to burn the gas generating means in a selected combustion chamber. In this case, remaining ignition means and gas generating means which were not actuated cause inconvenience at the time of later disposal or damping. Therefore, it is preferable to ignite and burn them after actuation of the gas generator. Thereupon, by disposing the automatic ignition material (AIM) in the combustion chamber and/or ignition means, even when the gas generating means and/or ignition means in either of the combustion chambers were not burnt and remained, it is possible to ignite and burn the gas generating and/or ignition means at a delayed timing by heat (transmitted heat) caused by combustion of the gas generating means in the other combustion chamber. Therefore, in the present invention also, in the combustion chamber and/or the ignition means provided inside the inner shell, it is preferable to dispose the automatic ignition material (AIM) which is to be ignited and burnt by heat generated by combustion of the gas generating means in the combustion chamber provided outside the inner shell. As the automatic ignition material (AIM), material which is ignited with a lower temperature compared with the gas generating means or transfer charge is preferably used. The gas generating means is ignited by the automatic ignition material (AIM) after activation of the gas generating means. That is, the ignition of the gas generating means by the automatic ignition material is different from the ignition of the gas generating agent delaying intentionally the actuation timing of the ignition means for the purpose of adjusting the actuation performance of the gas generator. The ignition by AIM is performed when a sufficient period of time has passed after actuations at intentional intervals of the igniters to adjust the actuation performance of the gas generator. Therefore, after one ignition means is actuated first, the remaining gas generating means will not be ignited by the automatic ignition material before the other ignition means is actuated with intentionally delayed timing.

The housing can be formed by joining the diffuser shell and the closure shell by various welding methods such as friction welding, electron beam welding, laser welding, TIG welding and projection welding. Among these welding methods, when both the shells are joined by friction welding to form the housing, it is preferable to carry out the friction welding while fixing the closure shell. Generally, both the shells are joined at the final stage. And by performing the friction welding while fixing the closure shell in this manner, even when the center of gravity of the closure shell side is deviated such that the ignition means is disposed eccentrically, both the shells can be stably be joined. In other words, the friction welding is carried out in a state where one object is fixed and the other object is rotated. If the center of gravity of the object to be rotated is deviated, it is difficult to stably carry out the friction welding. Thereupon, in the present invention, stable friction welding is realized by carrying out the friction welding while fixing the closure shell side.

When the friction welding is carried out while fixing the closure shell, it is preferable that the flange portion for mounting the gas generator to the module case is provided on the closure shell, and the flange portion is formed with a positioning portion for specifying a direction and/or a position of the closure shell which is fixed at the time of friction welding. When the flange portion has a plurality radially projections for fixing the gas generator to the module case, the positioning portion is realized by forming the projections asymmetrically with respect to each other. Only one projecting is provided, the projection itself can be the positioning portion. By forming the flange portion with the positioning portion in this manner, when the inner shell is fixed in the housing by the friction welding, the joining position of the housing is always determined constantly with respect to the inner shell which is rotated. Therefore, it is possible to reliably fix the inner shell in a predetermined direction and/or position. By forming the positioning portion on the flange portion, the flange portion is used both for positioning and mounting of the gas generator. In the present invention, in order to fix the closure shell in the predetermined direction and/or a position at the time of friction welding, it is of course possible to form the positioning portion on another portion such as a peripheral wall and bottom surface instead of the flange.

Further, the igniting means disposed in the combustion chamber can include injecting-direction restricting means for restricting an injecting direction of flame which is generated by the actuation of the ignition means. The injecting-direction restricting means is used for restricting the injecting direction of flame generated by actuation of the ignition means, i.e., the injecting direction of flame to ignite and burn the gas generating means.

The injecting-direction restricting means can envelop at least a portion of the ignition means which generates the flame, and includes a hollow container having two or more flame-transferring holes for restricting the injecting direction of the flame into a desired direction. Examples of such injecting-direction restricting means are deflector plates, a cylindrical member capable of enveloping the entire ignition means, and a cup-like container or the like capable of enveloping a portion of the ignition means where the flame is generated.

By using such injecting-direction restricting means, it is possible to restrict the injecting direction of flame of the ignition means to a direction along the inner wall surface of the combustion chamber. The "direction along the inner wall surface of the combustion chamber" means that the flame is ejected, moving in a direction which coincides with a shape of the inner wall surface. By restricting the injecting direction of the flame of the ignition means in this manner, it is possible to preferably burn the gas generating means in the combustion chamber even when the ignition means is not disposed at center of the combustion chamber or when the combustion chamber is not circular in shape and a distance between the gas generating means and the ignition means disposed at corners of the combustion chamber is remarkably fair.

As the injecting-direction restricting means, the gas discharge ports may be distributed so that the number of the gas discharge ports formed further from the first igniter may be greater or the total opening area thereof may be greater than otherwise. It is preferable to combine these to form the injecting-direction restricting means.

The outputs of the ignition means disposed in the respective combustion chambers can be changed from one another. When the ignition means include a transfer charge in addition to the igniters having different outputs, it is possible to adjust the material, shape or amount of the transfer charge, thereby adjusting the output of the ignition means.

A retainer can be disposed inside the inner shell in order to perform the connection with the closure shell stably and smoothly. The retainer may be a gas generating agent fixing member shown in the embodiment. When fixing the inner shell to the closure shell by friction welding, crimping, resistance welding, convex-concave joint or the like, the retainer keeps the gas generating agent in the inner shell so that the gas generating agent does not come into direct contact with the closure shell, and also obtains a space for accommodating the ignition means in the inner shell. By using this retainer, the assembling operation can be facilitated. Especially when charging directions of two or more gas generating means are different at the time of assembling as in the present invention, it is effective to use the retainer. The retainer may have a canister-like shape made of aluminum or iron, or may be a porous material made of wire mesh or the like.

The igniter included in the ignition means is activated upon reception of activation signal of the gas generator which is outputted from a control unit or the like. Therefore, a cable for transmitting the activation signal from the control unit or the like is connected to each of the igniters. Since the gas generator of the present invention includes two or more ignition means, two or more igniters are included. By pulling out the cables connected to the igniters in the same direction, the gas generator can be mounted to the module easily afterwards.

In the multistage gas generator for the air bag of the present invention, when the ignition means disposed in each of the combustion chambers comprises an igniter which is to be activated by an electric signal and a cable for transmitting the electric signal is connected to each igniter through a connector, it is preferable that the connector has a positioning means capable of connecting the cable to only one of the igniters. That is, in the cables which are connected to the respective igniters to transmit different activation signals with the aim of adjusting activation timing, if a wrong cable is connected to one of the igniters, a desired activation output can never be obtained. Thereupon, the respective igniters are provided with the respective positioning means to be connected to exclusively one of the cables, which can prevent the connection error. Such positioning means can be realized by forming the engaging portions, which is between the igniter and the connector and for connecting the igniter and the cable, into different shapes for the respective igniters, or by forming the connectors with groove and/or projections having different positions and/or shapes. Additionally, plural cables of the respective igniters can be collected to one connector and the connector can be formed with the positioning means. The positioning means provided in the connector of the invention also includes all cases in which any elements determining whether a plug and a jack can be connected such as a case in which shape and size of a portion (blade or current-carrying plug) which connects and energize the connector) or shape and size of the case of the connector are different. That is, any means which uniquely defines combination of connection between the cable and the ignition is included.

With a gas generator comprising a housing having a plurality of combustion chambers therein and gas generating means which are different from each other in an amount of a generated gas per unit time in the respective combustion chambers such as gas generating means which are different from each other in at least one of burning rate, composition, composition ratio, shape and amount, activation performance of the gas generator, particularly the change with time of the gas discharging amount can be adjusted distinctively and arbitrarily. When the gas generating means in each of the combustion chambers is independently ignited and burnt with arbitrary timing, ignition means which is independently ignited and burnt is disposed in each of the combustion chambers. As the gas generating means, it is possible to use inorganic azide which is conventionally and widely used such as azide-based gas generating agent based on sodium azide or non-azide-based gas generating agent not based on inorganic azide. If safety is taken into consideration, non-azide-based gas generating agent is desirable. The gas generating means is appropriately selected in accordance with requirements such as burning rate, non-toxicity, combustion temperature, decomposition-starting temperature. When gas generating means having different burning rate for each combustion chamber, it is possible to use gas generating means having different composition or composition ratio itself by using inorganic non-azide such as sodium azide, non-azide such as nitroguanidine or the like as fuel and nitrogen source, or gas generating means in which the shape of composition can be changed such as pellet-like, wafer-like, hollow columnar, disk-like, body having a single hole, porous body or the surface area is changed by size of the molded article. Especially when the gas generating means is formed into a porous body having a plurality of through-holes, although layout of the holes is not limited, it is preferable to a distance between an outer end of the molded article and a center of the hole and a distance between the centers of the respective holes are substantially equal to each other so that performance of the gas generator is stabilized. More specifically, in a cylindrical molded article whose cross section is circular, a preferred structure is such that one hole is arranged at the center and six holes are formed around the hole so that the center of each hole is the apex of regular triangles of the equal distances between the holes. Further, it is conceived to dispose one hole at a center and 18 holes around the central hole. The number of holes and layout of the holes are determined based on combination of easiness of manufacture of the gas generating agent, manufacturing cost and performance, and accordingly, the number of holes and layout of the holes are not limited.

In a gas generator (pyrotechnic gas generator) using solid gas generating means for obtaining gas for expanding the air bag, a filter or a coolant is usually preferably used for purifying or cooling combustion gas generated by combustion of the gas generating means. Therefore, in the gas generator of the present invention, when a combustion gas generated by combustion of the gas generating means is purified and/or cooled, filter means formed by compressing laminated wire mesh can be used. If such filter means is formed into self-contracting structure in which the filter means can be pushed radially outward by the pressure of the combustion gas and its upper and lower ends are pressed by the inner surface of the housing, a short pass of the combustion gas between the end surface of the filter means and the inner surface of the housing can be avoided without providing any special member. Such a self-contracting structure can be realized by inclining upper and lower inner surfaces of the housing such as to narrow the inner surfaces, and by inclining upper and lower end surfaces of the filter means such as to be aligned with the upper and lower inner surfaces of the housing. Inside and outside of the filter means can be formed into different laminated wire mesh bodies to provide a triple structure, so that the inner side of the filter means can exhibit protection function of the filter means and the outer side of the filter can exhibit suppressing expansion function of the filter means. The suppressing expansion function can be exhibited by supporting an outer periphery of the filter means with an outer layer made of laminated wire mesh body, porous cylindrical body, annular belt body or the like such as to suppress the expansion.

When the plurality of combustion chambers are provided in the housing and combustion gas is generated by combustion of the gas generating means in the respective combustion chambers as described above, it is preferable that the combustion gas discharged from each combustion chamber passes through a common filter. If all combustion gas passes through the common filter means, it is enough to dispose one filter means in the housing and as a result, the entire volume can be reduced, and the manufacturing cost can be reduced. Further, the combustion gas passing through the common filter means can be discharged from a common gas discharge port(s) formed in the housing.

The above-described gas generator for the air bag is accommodated in a module case together with an air bag (bag) into which gas generated by the gas generator is introduced for expansion, thereby constituting the air bag apparatus. In this air bag apparatus, the gas generator is actuated when an impact sensor senses an impact, thereby discharging the combustion gas from the gas discharge port of the housing. The combustion gas flows into the air bag so that the air bag breaks a module cover and expands, thereby forming a cushion between a passenger and a hard structural member of the vehicle for absorbing the impact.

According to the present invention, there is provided a multistage gas generator for an air bag in which the entire size of the container can be suppressed, the structure is simple and the gas generator can be manufactured easily, the gas generator is actuated, at the initial stage of actuation, to give a passenger as a small impact as possible, and, according to variation of passengers' physiques (such that a sitting height is tall or low, adult or child) and sitting postures (such as clinging to a steering wheel), actuation output of the gas generator and timing of increase of output can be arbitrarily adjusted in order to restrain the passenger safely.

Further in the gas generator of the invention, at least one of the combustion chambers is disposed eccentrically with respect to the housing, the ignition means provided for each of the combustion chambers is disposed in the housing eccentrically with respect to the housing. With this feature, it is possible to maximize the flexibility of the combustion chamber while suppressing the size of the housing in its radial direction.

The gas generator of the eccentric structure can be realized by including AIM, a connector, a self-contracting type filer which will be explained later, or combination thereof. The gas generator can also be realized by combining other parts described in the present specification.

According to the present invention, the gas generator for the air bag includes a plurality of igniters, activation signals are outputted from the ignition signal-outputting means to the igniters respectively, connection error between each igniter and the ignition signal outputting apparatus outputting section is eliminated, and the multistage type gas generator can always actuate with desired output. Therefore, in the multistage type air bag apparatus capable of adjusting actuation output and timing of output increase, desired actuation performance can always be obtained.

Further, also when the filter means radially expands by passage of the activation gas, since the inclining end surface of the filter means is in contact with the supporting portion in the housing and the surface contact between both the members can be maintained, and thereby, short pass of the activation gas can be effectively avoided. Since the filter means is a member capable of expanding, high assembling accuracy is not required, and assembling operation into the hosing can be easily carried out.

Figure 1:
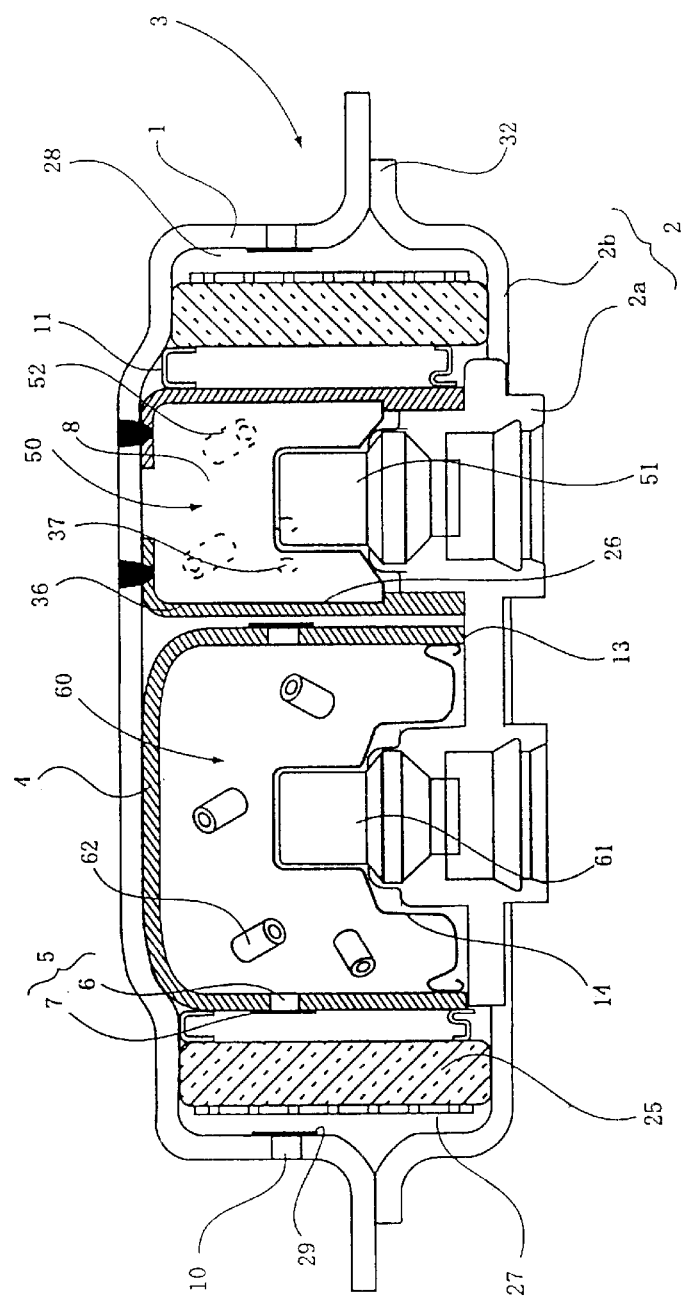
FIG. 1 is a vertical cross sectional view showing one embodiment of a gas generator of the present invention.

EXPLANATION OF SYMBOLS 1 diffuser shell
2 closure shell
3 housing
4 inner shell
5 opening portion
8 transfer charge
10 gas discharge port
25 coolant/filter
32 flange
50 first combustion chamber
51 first igniter
52 first gas generating agent
60 second combustion chamber
61 second igniter
62 second gas generating agent
101 gas generator for air bag
102 activation signal outputting means
103 air bag
107 activation signal outputting portion
108 igniter
109 lead wire
110 connector
301 diffuser shell
302 closure shell
303 housing
305 filter means
309 gas generating agent
311 igniter
351 inclining end surface of filter means
352, 452, 552, 652, 752 inclining surface (supporting portion)

353 filter means supporting means
453, 553, 653, 753 inclining portion of housing
803 housing
822 coolant/filter
1105a first combustion chamber
1105b second combustion chamber
1107 partition wall
1109a first gas generating agent
1109b second gas generating agent
1112a first igniter
1112b second igniter
1113 initiator collar
1185 automatic ignition material (AIM)

MODE FOR CARRYING OUT THE INVENTION

A multistage gas generator for an air bag of the present invention will be explained below based on embodiments shown in the drawings.

Embodiment of Eccentric Structure

FIG. 1 is a vertical cross sectional view showing one embodiment of the gas generator of the present invention. The gas generator shown in FIG. 1 has a structure suitable to be disposed on a driver side.

In FIG. 1, the gas generator includes a cylindrical housing 3 which is formed by joining, using friction welding, a diffuser shell 1 having a gas discharge port 10 and a closure shell 2 forming an interior accommodating space with the diffuser shell. A capsule-like inner shell 4 whose horizontal cross section is circular and upper end thereof is closed is disposed and fixed in the housing 3 eccentrically with respect to a center axis of the housing. An eccentric degree of the inner shell with respect to the housing can be appropriately changed in accordance with a desired volume ratio of the combustion chambers. The eccentric degree might be changed depending upon a structure inside the housing, e.g., whether or not there exists a coolant/filter 25. For example, when the coolant/filter 25 is placed such as to be opposed to a peripheral wall surface as in the gas generator shown in FIG. 1, the eccentric degree can be appropriately selected within a range of 10 to 75%. However, since this numeral range might be changed depending upon a size of the igniter and the like, the numeric value range is shown as an index of eccentricity of the inner shell 4 in the gas generator shown in FIG. 1.

The horizontal cross sectional shape of the inner shell can be formed into various shapes such as rectangular shape and elliptic shape. In view of facilitating joint to the closure shell 2 and the like, the horizontal cross sectional shape of the inner shell is preferably formed into circular. In other words, the horizontal plane cross sectional shape of the inner shell 4 needs to be circular, when the inner shell 4 is joined to the closure shell 2 by the friction welding. Further, when these members are joined by laser welding, it is necessary to keep the laser irradiation distance constant.

The inner shell 4 is disposed while securing a slight gap between the inner shell 4 and the coolant/filter 25. This gap is secured to form a gas flow between the coolant/filter 25 and the inner shell 4 and to effectively use the entire surface of the filter 25. And when an opening portion of the inner shell 4 is opened as will be described later, the coolant/filter 25 will not hinder because of the gap. Therefore, this gap is appropriately selected in a range of the above purpose.

The inner shell 4 defines a first combustion chamber 50 and a second combustion chamber 60. That is, the first combustion chamber 50 is provided outside the inner shell, and the second combustion chamber 60 is provided inside the inner shell 4. A volume ratio of the first combustion chamber 50 and the second combustion chamber 60 (a volume of the first combustion chamber: a volume of the second combustion chamber) is set to 3.3:1 in the present embodiment, but this ratio can be appropriately selected within a rage of 97:1 to 1:1. This volume ratio also might be changed depending upon a size of the igniter, a shape of the gas generating agent and the like. Therefore, the numeric value range is shown as a range which can be selected in the structure of the gas generator shown in FIG. 1.

Gas generating agent (52, 62) are respectively accommodated in the second combustion chamber 60 and the first combustion chamber 50 which are isolated form each other by the inner shell 4. The first gas generating agent 52 is accommodated in the first combustion chamber 50, and the second gas generating agent 62 is accommodated in the second combustion chamber 60. In the present embodiment, the first gas generating agent 52 and the second gas generating agent 62 are the same in shape and the like, the respective combustion chambers can accommodate gas generating means which are different from each other in at least one of burning rate, composition, composition ratio and amount.

The inner shell 4 defining the first combustion chamber 50 and the second combustion chamber 60 is disposed eccentrically with respect to the center axis of the housing 3. The second combustion chamber 60 provided inside the inner shell 4 is also eccentric with respect to the housing 3. Igniters are respectively disposed in the first combustion chamber 50 and the second combustion chamber 60, and among them, the second igniter 61 disposed in the second combustion chamber is disposed at a center of the second combustion chamber 60 which is eccentric with respect to the center axis of the housing 3. As a result, flame generated due to the actuation of the igniter 61 can uniformly burn the second gas generating agent 62. Further, the second igniter 61 and the first igniter 51 which is disposed in the first combustion chamber 50 are both disposed eccentrically with respect to the center axis of the housing 3. By disposing the first and second igniters as well as the inner shell eccentrically with respect to the center axis of the housing 3, variation in volume ratio of the first and second combustion chambers can be expanded, and a size of the housing 3 in its radial direction can be suppressed to the minimum.

Among the igniters disposed in the respective combustion chambers, the igniter 51 disposed in the first combustion chamber 50 has transfer charge 8 around and above the igniter 51. The transfer charge 8 is accommodated in a transfer charge container 26 in order to facilitate assembly of the gas generator, and to prevent the transfer charge 8 from being dispersed in the first combustion chamber 50 due to impacts or vibrations caused while the transfer charge is mounted in a vehicle so that the ignition performance with respect to the first gas generating agent 52 is deteriorated. The transfer charge container 26 is made of aluminum having such a thickness (e.g., about 200 μm) that the container 26 is easily broken by combustion of the transfer charge 8 in the transfer charge container 26 to transfer flame to its surroundings. A transfer charge such as that disposed in the first combustion chamber 50 is not necessarily needed for the second combustion chamber 60. This is because the second gas generating agent 62 is ignited more easily, than the first gas generating agent 52, and the pressure of the second combustion chamber is increasing in a sealed state until the breaking member 7 for sealing a hole 6 of the below-described inner shell 4 is ruptured. The breaking member 7 is not ruptured even when the internal pressure of the first combustion chamber 50 increases due to the combustion of the first gas generating agent 52 but it is ruptured when the internal pressure of the second combustion chamber 60 increases more than that of the first combustion chamber 50. However, the transfer charge can be used as required.

A cylindrical member 36 is disposed in the first combustion chamber 50 so as to surround the first igniter 51 and a radially outer side of the transfer charge 8 disposed above the first igniter 51. The cylindrical member 36 is formed into a cylindrical shape whose upper and lower ends are opened, one end thereof is fitted over an outer periphery of a portion to which the igniter 51 is fixed without gap, and the other end is interposed by the retainer 11 provided in the vicinity of an inner surface of a ceiling portion of the diffuser shell 1 and fixed to a predetermined location. The cylindrical member 36 is formed at its peripheral wall with a plurality of flame-transferring holes 37. Flame generated by combustion of the transfer charge 8 ejects from the flame-transferring holes 37, and then ignites and burns the first gas generating agent provided outside the cylindrical member. It is preferable that the cylindrical member is made of the same material as that of the housing 3.

Figure 2:
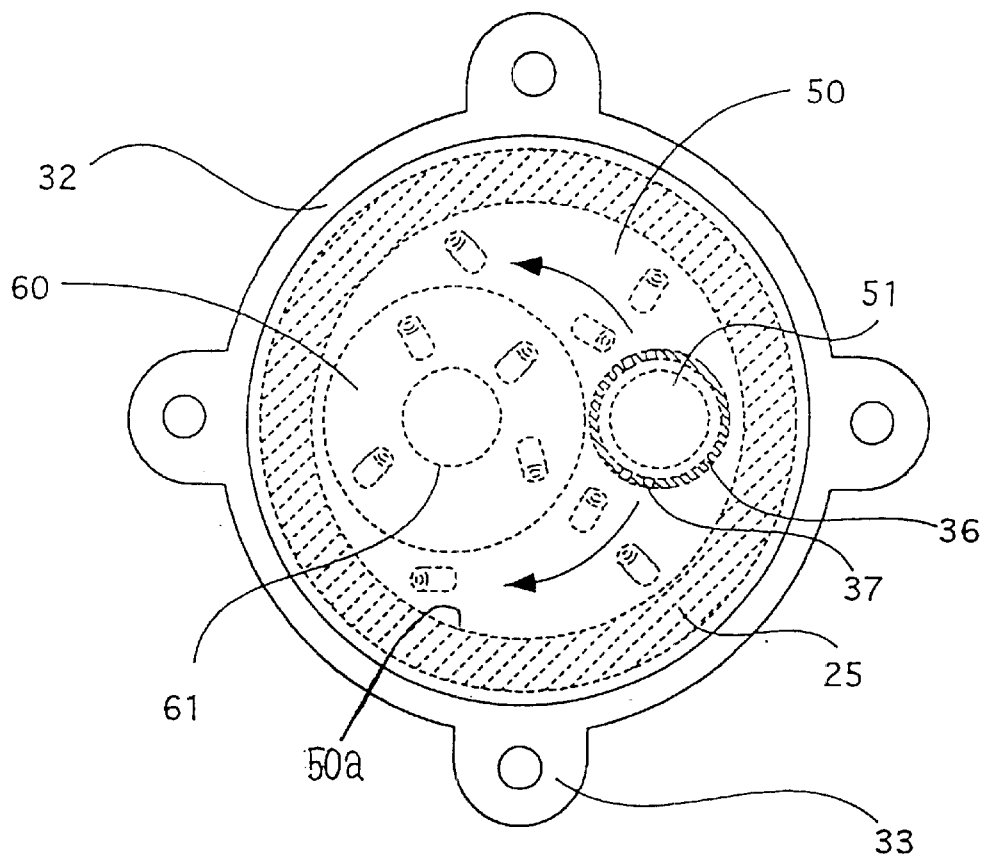
FIG. 2 is a plan view of the embodiment.

Especially in the gas generator shown in this embodiment, the first combustion chamber 50 is formed, as shown in FIG. 2, into annular shape similar to falcate shape whose circular inner side thereof is punched out circularly, and the first gas generating agent 52 is disposed in this. Therefore, unlike the second combustion chamber 60, in the first combustion chamber 50, a distance between the gas generating agent 52 and the ignition 51 is varied depending upon a location where the gas generating agent 52 is accommodated. Accordingly, when the igniter 51 is ignited, the first gas generating agents 52 is ignited and burnt unevenly. For this reason, the directions of the flame-transferring holes 37 formed in the peripheral wall of the inner cylindrical member 36 are restricted such that the flame of the transfer charge 8 is ejected in the direction along an inner wall surface 50a of the first combustion chamber 50 (the direction shown with the arrows in FIG. 2). With this arrangement, the gas generating agent 52 located behind the second combustion chamber 60 (i.e., the inner shell 4) can also be burnt uniformly. In this embodiment, the inner wall surface 50a coincides with a surface of the coolant/filter 25.

As another example of the injecting-direction restricting means, instead of the inner cylindrical member 36, it is possible to use a cup-like container having a nozzle on the peripheral wall thereof for ejecting flame of the first ignition means (the igniter 51 and the transfer charge 8 in FIG. 1) in a direction along an inner wall surface 50a of the first combustion chamber 50 (direction shown with the arrows in FIG. 2). Therefore, the cup-like container as the injecting-direction restricting means can envelop at least the ignition 51 and the transfer charge 8 to restrict the injecting direction of the flame, and is used being mounted (put on) around the first ignition means. Even when such an injecting-direction restricting means is used, it is preferable that the first ignition means disposed inside thereof includes a transfer charge which is to be ignited and burnt by the igniter and actuation of the igniter.

Figure 34:
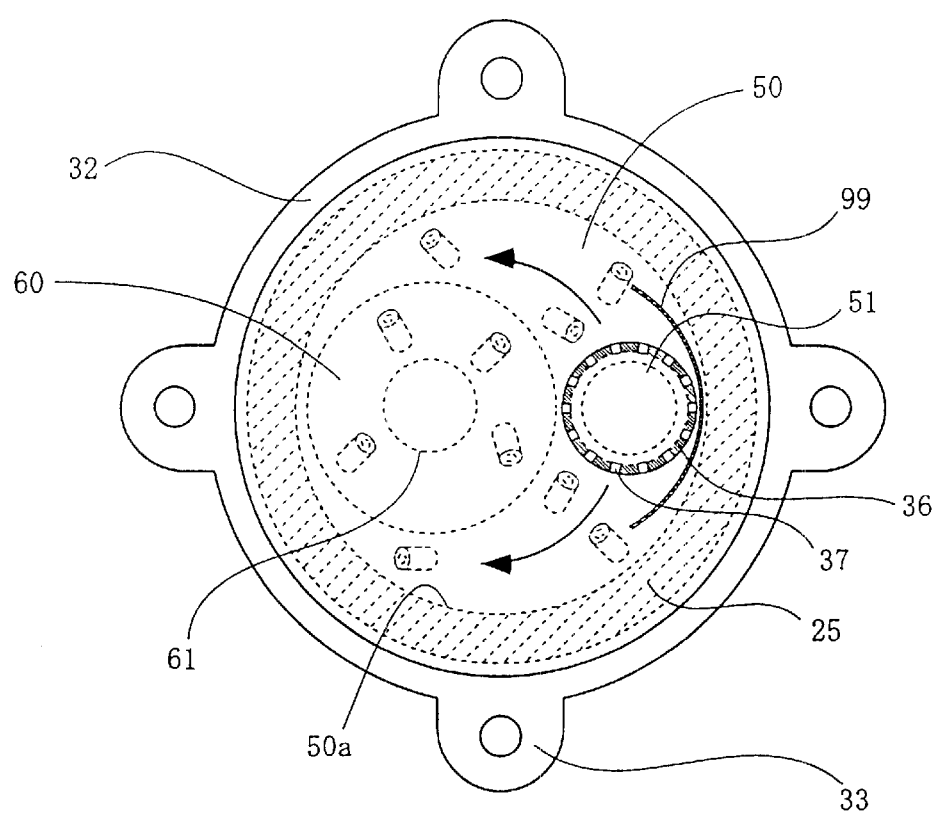
FIG. 34 is a plain view of the present embodiment having a deflector plate.

Another example of the injecting-direction restricting means is a deflector plate 99 shown in FIG. 34 which reflect the flame in direction shown with arrows to restrict the direction. For example, a concave plate is placed between the combustion chamber and the housing. The deflector plate may be inside the filter or outside the filter. The deflector plate functions to control the direction of flame from the first igniter and also functions to control a flow of gas generated by combustion of the gas generating agent.

The inner shell 4 defining the first combustion chamber 50 and the second combustion chamber 60 is of capsule-like shape as described above, and a plurality of opening portion 5 are formed on the peripheral wall thereof. The opening portion 5 formed such that they are opened only by combustion of the second gas generating agent 62 disposed in the second combustion chamber 60, and such that they are not opened by combustion of the first gas generating agent 52 disposed in the first combustion chamber 50. In the present embodiment, the opening portions 5 comprise a plurality of holes 6 formed in the peripheral wall of the inner shell 4 and a breaking member 7 for closing these holes. As for the breaking member 7, a stainless seal tape is used. The breaking member 7 is formed such that it opens the holes 6 by being broken, peeled, burnt or detached exclusively due to the combustion of the second gas generating agent 62, and such that the breaking member 7 is not broken by combustion of the first gas generating agent 52. Alternatively, as another way to prevent the opening portions of the inner shell 4 from opening by the first gas generating agent 52, it is also possible to cover the opening portions 5 of the inner shell 4 with a shielding plate or the like which is obtained by forming a shielding plate having appropriate shape, for example, by forming a band-like member into annular shape, so that the flame caused by combustion of the first gas generating agent 52 does not come into direct contact with the opening portion 5.

Figure 3:
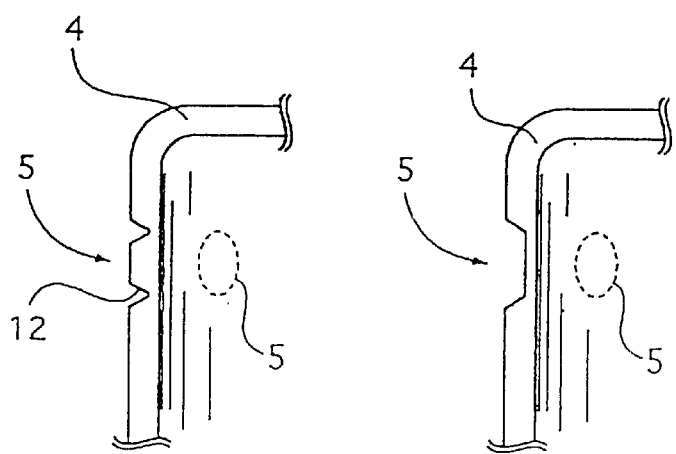
FIGS. 3(a) and (b) are cross sectional views of the gas generator of the invention.

Alternatively, the opening portions 5 can also be realized by forming a notch 12 in the peripheral wall of the inner shell 4 as shown in FIG. 3a, or by partially reducing the thickness of the peripheral wall of the inner shell as shown in FIG. 3b. When the opening portions are opened, the first combustion chamber 50 and the second combustion chamber 60 communicate with each other, and the combustion gas generated in the second combustion chamber 60 passes through the first combustion chamber 50 and then, is discharged outside the housing 1.

The inner shell 4 is fixed by connecting an opened lower portion 13 thereof to the closure shell 2. When the closure shell 2 includes a collar portion 2a for fixing the igniter, the inner shell 4 can be mounted to the collar portion 2a. In the gas generator shown in FIG. 1, the closure shell 2 is formed such that a circular collar portion having a size capable of fixing two igniters is integrally connected to a bottom surface of the cylindrical shell portion 2b which is connected to the diffuser shell 1. The inner shell 4 is connected the collar portion 2a. The collar portion 2a can be formed integrally on the bottom surface of the circular cylindrical shell portion 2b as a circle having a size capable of fixing for each igniter. Further, the collar portion 2a can be formed integrally on the bottom surface of the cylindrical shell portion 2b. In such a case, the inner shell 4 can directly be mounted to the bottom surface of the cylindrical shell portion 2b other than the collar portion 2a of the closure shell.

The joint of the inner shell 4 and the closure shell 2 can be performed by friction welding, crimping, resistance welding, or convex-concave joint. When both members are joined by the friction welding, it is preferable to join the members while fixing the closure shell 2. With this arrangement, even if axes of the inner shell 4 and the closure shell 2 are not aligned with each other, the friction welding can be carried out stably. If the friction welding is carried out while the inner shell 4 is fixed and the closure shell 2 is rotated, since the center of gravity of the closure shell 2 is deviated from the rotation center, the friction welding can not be carried out stably. Thereupon, in the present invention, the friction welding is carried out while the closure shell 2 is fixed, the inner shell 4 is rotated. At the time of the friction welding, in order to dispose the inner shell 4 into the predetermined position constantly, it is desirable that the closure shell 2 is positioned and fixed. Therefore, it is desirable that the closure shell 2 is appropriately provided with a positioning means.

A gas generating agent fixing member 14 is disposed in the inner shell 4 for safely and smoothly connect the closure shell 2. When the inner shell 4 is friction-welded to the closure shell 2, the gas generating agent fixing member 14 is used for preventing the gas generating agent 62 from coming into direct contact with the closure shell 2 and for securing the installation space of the igniter 61 in a space formed by the inner shell 4. When the inner shell 4 is mounted to the closure shell 2, it can be mounted not only by the abovedescribed friction welding, but also by resistance welding, crimping, convex-concave joint or the like. In that case also, by using the gas generating agent fixing member 14, the assembling operation is facilitated. As the gas generating agent fixing member 14, a canister made of aluminum having such a thickness that it is easily broken by combustion of the gas generating agent 62. Rather than this, it is possible to use appropriate members to achieve the above object such as porous member using wire mesh (a material, a shape and the like are not limited). When the gas generating agent fixing member 14 is not used, a single-hole cylindrical gas generating agent 62 is formed into a gas generating agent solid having the same shape as that of the inner space of the inner shell 4, and this solid can be disposed in the inner shell 4. In this case, the gas generating agent fixing member 14 may be omitted.

In the present embodiment, the collar portion 2a of the closure shell 2 is formed into a size capable fixing the two igniters 51 and 61 side by side. With this arrangement, if the two igniters 51 and 61 are previously fixed to the collar portion 2a by crimping or the like, and the collar portion 2a is integrally formed with the cylindrical shell portion 2b to form the closure shell 2, the two igniters 51 and 61 can be fixed to the closure shell 2. Although the first igniter 51 and the second igniter 61 are shown with the same size in the drawing, they can have different outputs for the respective combustion chamber.

Figure 4:
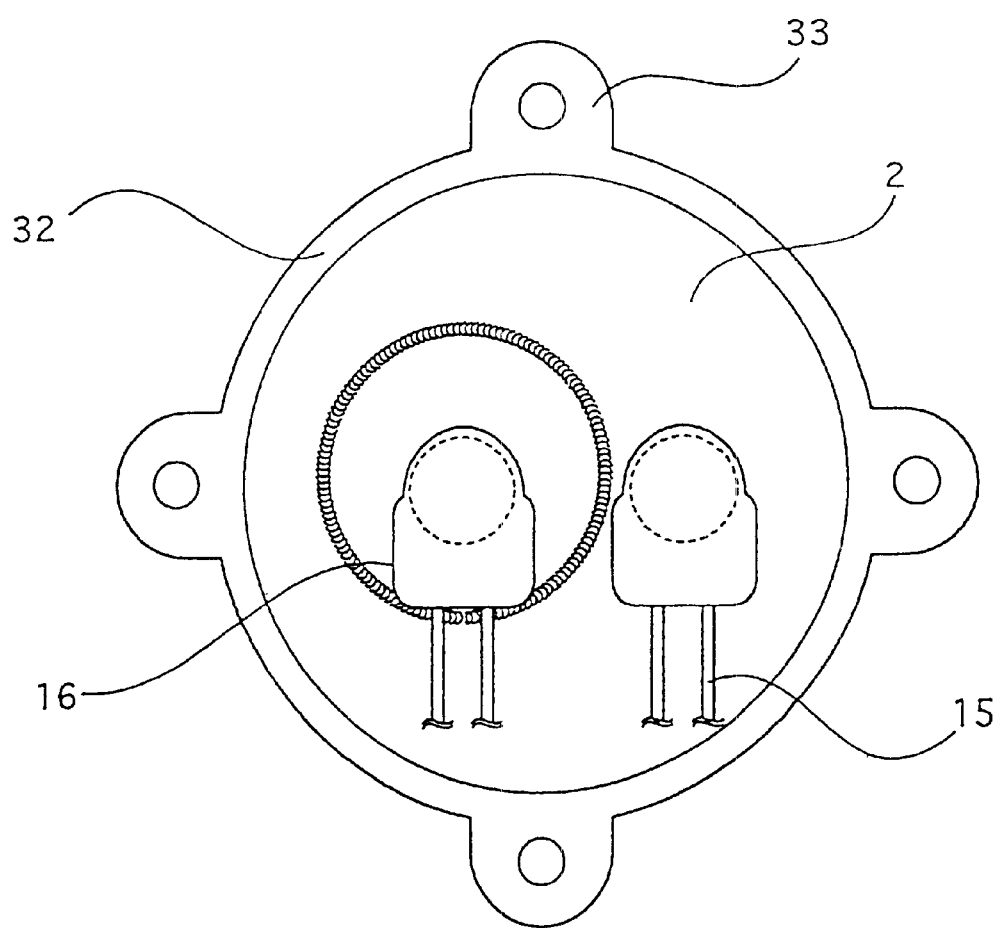
FIG. 4 is a rear view of the gas generator of the invention.
Figure 5:
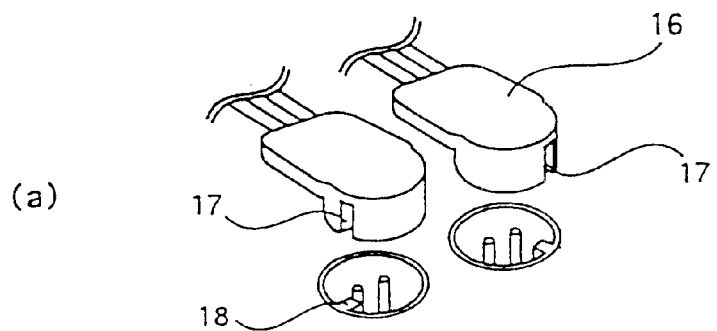
FIGS. 5(a)–(d) are partial perspective views showing positioning means.
Figure 5:
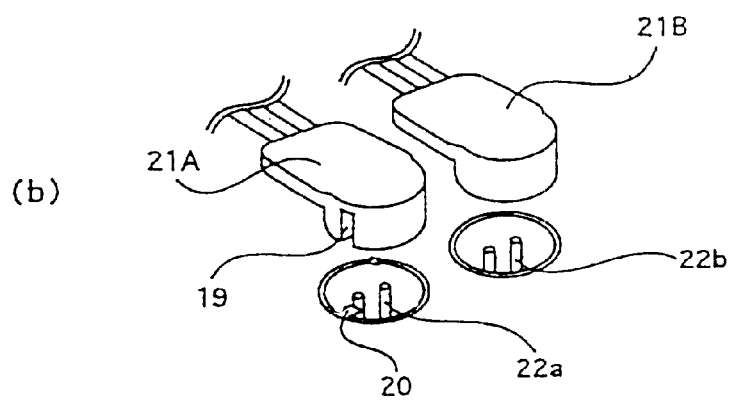
Figure 5:
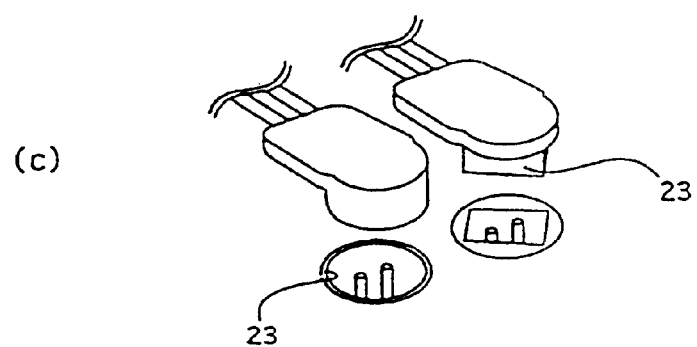
Figure 5:
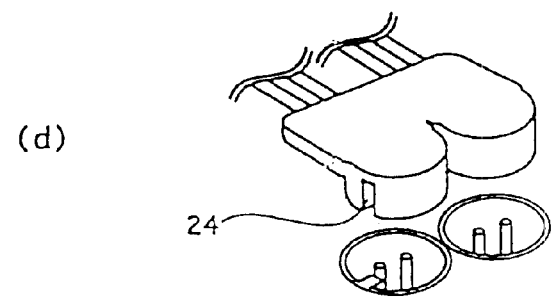

In this embodiment, as shown in a bottom view of FIG. 4, cables 15 which are respectively connected to the igniters 51 and 61 for transmitting actuation signals are pulled out in the same direction. Positioning means are formed on locations where the igniters 51 and 61 are disposed so that the respective cables 15 can be specified to be connected to the respective igniters. As shown in the enlarged views of essential portion of FIGS. 5a to 5d, such positioning means can be realized by using connectors 16 having different shapes for the respective igniters. In the positioning means shown in FIG. 5a, the connectors 16 are formed with positioning grooves (or projections) 17, and projections (or grooves) 18 corresponding to the positioning grooves (or projections) 17 are different from each other for the respective igniters. That is, positions of the grooves (or projections) 17 of the respective connectors are changed so that, at the time of mounting the connectors 16 to the gas generator, if the connectors 16 are not mounted in a right direction, the connectors interfere with each other and can not be mounted correctly. In the positioning means shown in FIG. 5b, only one of connectors 21 is provided with a positioning groove (or projection) 19. That is, a connector 21A having the groove (or projection) 19 can be connected to an igniter 22b which does not have a projection (or groove) 20, but a connector 21B which does not have the grove (or projection) 19 can not be connected to an igniter 22a having the projection (or groove) 20. As a result, connection error of the connectors 21 can be easily found at the time of assembling. In FIG. 5c, connecting portions 23 themselves of the connectors are different from each other. In FIG. 5d, two connectors are formed into one connector, and a positioning groove (or projection) 24 is formed. As the positioning means, other means for eliminating connection error of connector can be appropriately employed.

A coolant/filter 25 as filter means for purifying/cooling the combustion gas generated by combustion of the gas generating agent is disposed in the housing 3. Gases generated by combustion of the first and second gas generating agents commonly pass through the coolant/filter 25. In order to prevent the short pass such that the combustion gas passes through a space between the end surface of the coolant/filter 25 and the inner surface of the ceiling of the diffuser shell 1, the upper and lower inner peripheral surfaces of the coolant/filter 25 and the inner surface of the housing can be covered with an inwardly-bending flange-like short pass preventing member.

An outer layer 27 for preventing the coolant/filter 25 from expanding due to passage of combustion gas. This outer layer 27 can be formed using not only a laminated wire mesh body, but also a porous cylindrical member provided at its peripheral wall surface with a plurality of through-holes, or a belt-like suppressing layer comprising an annular band-like member having a predetermined width. The outer layer is provided at its outer side with a gap 28 having a predetermined width so that the combustion gas can pass through the entire surface of the filter. The gas discharge port 10 formed in the diffuser shell 1 is closed by a seal tape 29 for preventing outside air from entering. This seal tape 29 is ruptured when the gas is discharged. The purpose of the seal tape 29 is to protect the gas generating agent from outside moisture, and the seal tape 29 does not affect any performance adjustment such as combustion internal pressure at all. The gas caused by combustion of the first gas generating agent 52 and the gas caused by combustion of the second gas generating agent 62 both pass through the gas discharge port 10.

Figure 6:
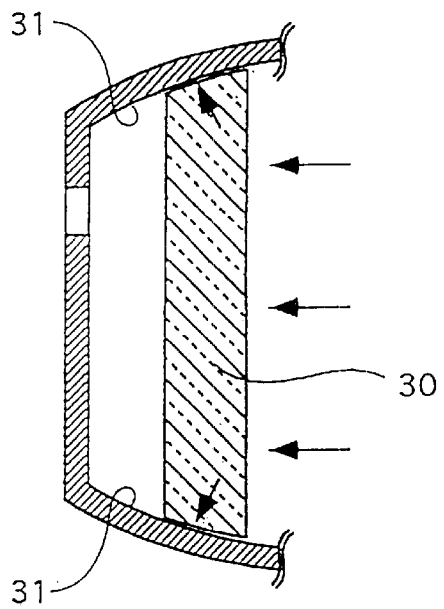
FIG. 6 is a partial cross sectional view showing a filter of self-contracting structure.

As shown in FIG. 6 or other drawing, as the filter means for purifying and/or cooling the combustion gas, self-contracting type filter means 30 whose upper and lower end surfaces are inclined in the outer peripheral direction. When the self-contracting type filter means 30 is used, it is preferable that the upper and inner surfaces 31 of the housing are inclined so as to be narrowed. As a result, the upper and lower end surfaces of the filter means 30, when pushed radially outward by combustion gas, abuts against the inner surface 31 of the housing, and it is possible to prevent the short pass of the combustion gas therebetween.

Figure 7:
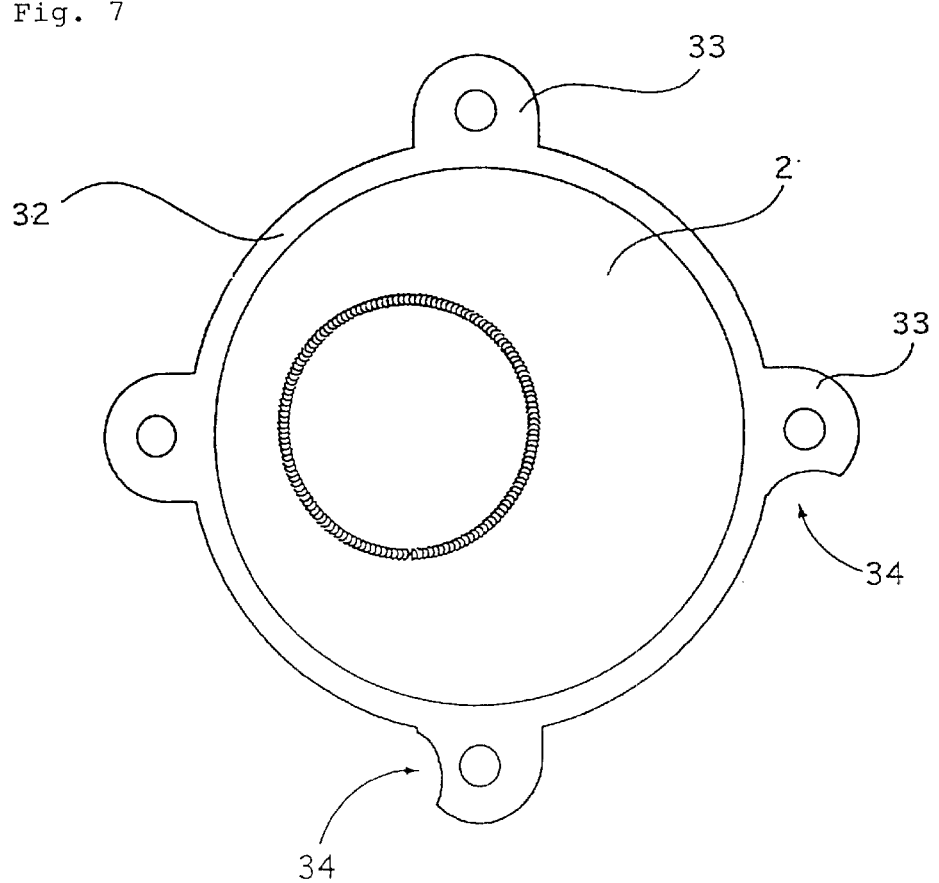
FIG. 7 is a rear view of the gas generator showing a positioning portion.

As described above, in the gas generator shown in FIG. 1, the igniters 51, 61 and the inner shell 4 are disposed eccentrically with respect to the housing 3. In such a gas generator, when the diffuser shell 1 and the closure shell 2 are joined by the friction welding, by fixing the closure shell 2 while the friction welding is carried out, both the shells can be joined stably. Especially when the inner shell 4 is directly mounted to the closure shell 2 by the friction welding, as shown in FIG. 7, it is preferable that the closure shell 2 is provided with a flange portion 32 for mounting the gas generator to the module case and a positioning portion 34 which has their peripheries notched is formed on a portion constituting the flange portion 32 such as a projection 33. If the positioning portion 34 is formed in this manner, since the closure shell 2 is fixed at any time in the constant direction according to the positioning portion 34, the inner shell 4 can reliably be mounted to the predetermined position.

In the gas generator formed in the above-described manner, when the first igniter 51 which is disposed inside the first combustion chamber 50 provided outside the inner shell 4 is actuated, the first gas generating agent 52 in the combustion chamber 50 is ignited and burnt to generate the combustion gas. Since a gap through which the gas can pass is secured between the inner shell 4 and the coolant/filter 25, the combustion gas can pass through the entire coolant/filter 25. While the combustion gas passes through the coolant/filter 25, the gas is purified and cooled and then, is discharged from the gas discharge port 10.

Figure 8:
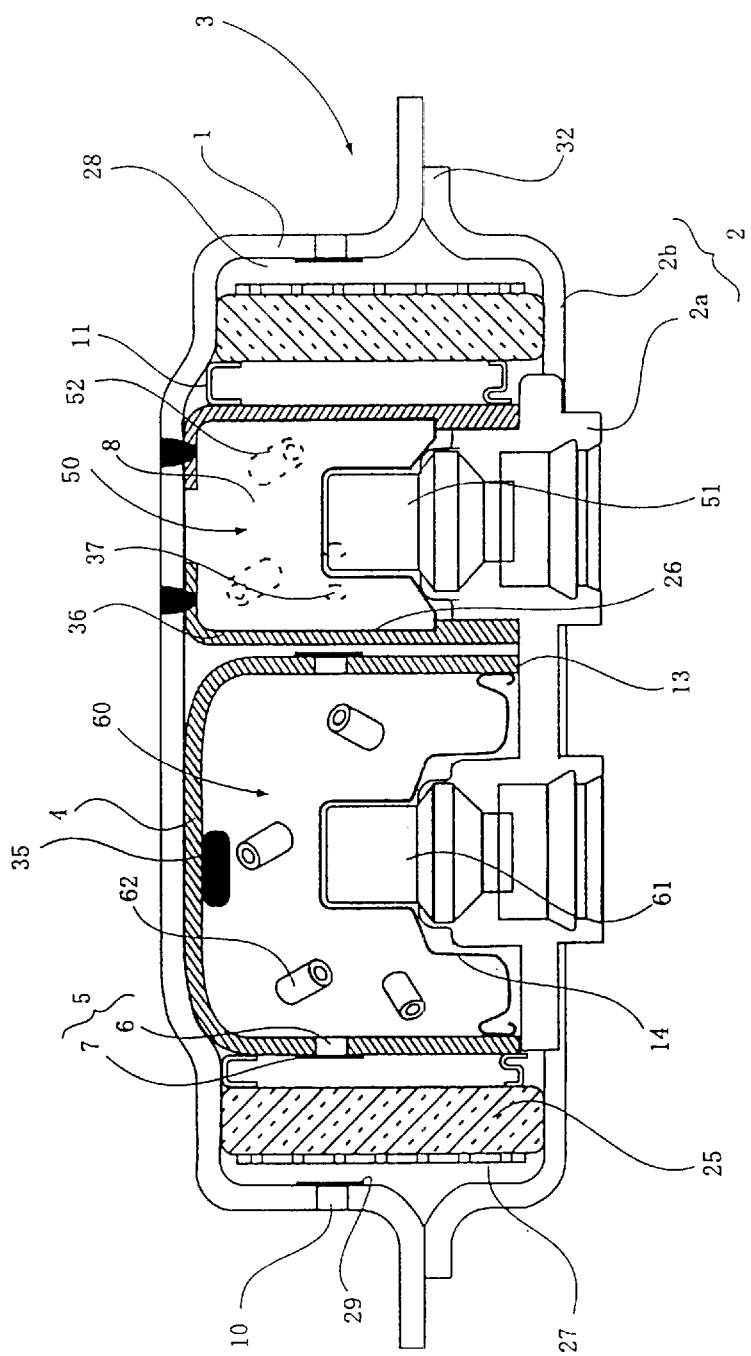
FIG. 8 is a vertical cross sectional view showing another embodiment of the gas generator of the invention.

On the other hand, when the second igniter 61 disposed in the inner shell 4 is actuated, the second gas generating agent 62 is ignited and burnt to generate the combustion gas. This combustion gas opens the opening portion 5 of the inner shell 4, and flows into the first combustion chamber 50 from the opening portion 5. Thereafter, the combustion gas passes through the coolant/filter 25 and is discharged from the gas discharge port 10 like the combustion gas of the first gas generating agent 52. The seal tape 29 closing the gas discharge port 10 is ruptured by passage of the combustion gas generated in the housing 3. The second gas generating agent 62 is ignited and burnt by the actuation of the second igniter 61, and is not directly burnt by combustion of the first gas generating agent 52. This is because that the opening portion 5 of the inner shell 4 is opened exclusively by combustion of the second gas generating agent 62, and is not opened by combustion of the first gas generating agent 52. However, as shown in FIG. 8, when the automatic ignition material (AIM) 35 which is to be ignited by combustion heat of the first gas generating agent 52 transmitted from the housing 1 and the like is accommodated in the second combustion chamber 60, the second gas generating agent 62 can be burnt indirectly through the combustion of the first gas generating agent 52.

That is, in the above-described multistage gas generator for an air bag, the first and second gas generating agents 52 and 62 are respectively ignited and burnt by the first and second igniters independently, However, there is a case that electric current is allowed to flow only to the first igniter 51 to ignite and burn exclusively the gas generating agent 52 in the first combustion chamber 50 intentionally. That is, the second gas generating agent 62 and the second igniter 61 are left unburnt intentionally. In such a case, inconvenience is caused at the time of later disposal or damping. Therefore, it is preferable that, after the actuation of the gas generator (only the first igniter), the gas generating agent 62 of the second combustion chamber 60 is burnt at further delayed timing (e.g., 100 milliseconds or more) than the normal delay ignition timing (e.g., 10 to 40 milliseconds) for actuating the second igniter 61. Thereupon, the automatic ignition material 35 which is to be ignited and burnt by transmission of the combustion heat of the first gas generating agent 52 is provided in the gas generator shown in FIG. 8. The second gas generating agent 62 is ignited by the automatic ignition material 35 when a sufficient period of time longer than the delayed timing (i.e., actuation interval between the igniters) when the second igniter 61 is actuated after a predetermined time lag is elapsed since the first igniter 51 is actuated. That is, this is different from the case that combustion of the second gas generating agent 62 is delayed (in other words, ignition of the second igniter is delayed) in order to adjust the actuation performance of the gas generator. Further, the gas generating agent 62 is never be ignited and burnt by the automatic ignition material 35 during the period when the actuation current to the second igniter 61 is delayed arbitrarily in order to adjust actuation performance of the gas generator. The automatic ignition material 35 can be combined with the second igniter 61.

According to the gas generator formed in the above-described manner, the output mode (actuation performance) of the gas generator can be adjusted arbitrarily by adjusting the igniting timing of the two igniters 51 and 61, e.g., by actuating either of the first and second igniters 51 and 61 at first or by actuating both the igniters simultaneously. Therefore, in various conditions such as speed of the vehicle and environment temperature at the time of collision, development of the air bag in the air bag apparatus described later can be made most suitably. Especially in the gas generator shown in FIG. 1, since the two combustion chambers are arranged in the radial direction, the height of the gas generator can be suppressed to the minimum.

Also, shapes, composition, composition ratio and amount and the like of the gas generating agent can be appropriately changed for obtaining desired output mode.

Embodiment of an Air Bag Apparatus

Figure 9:
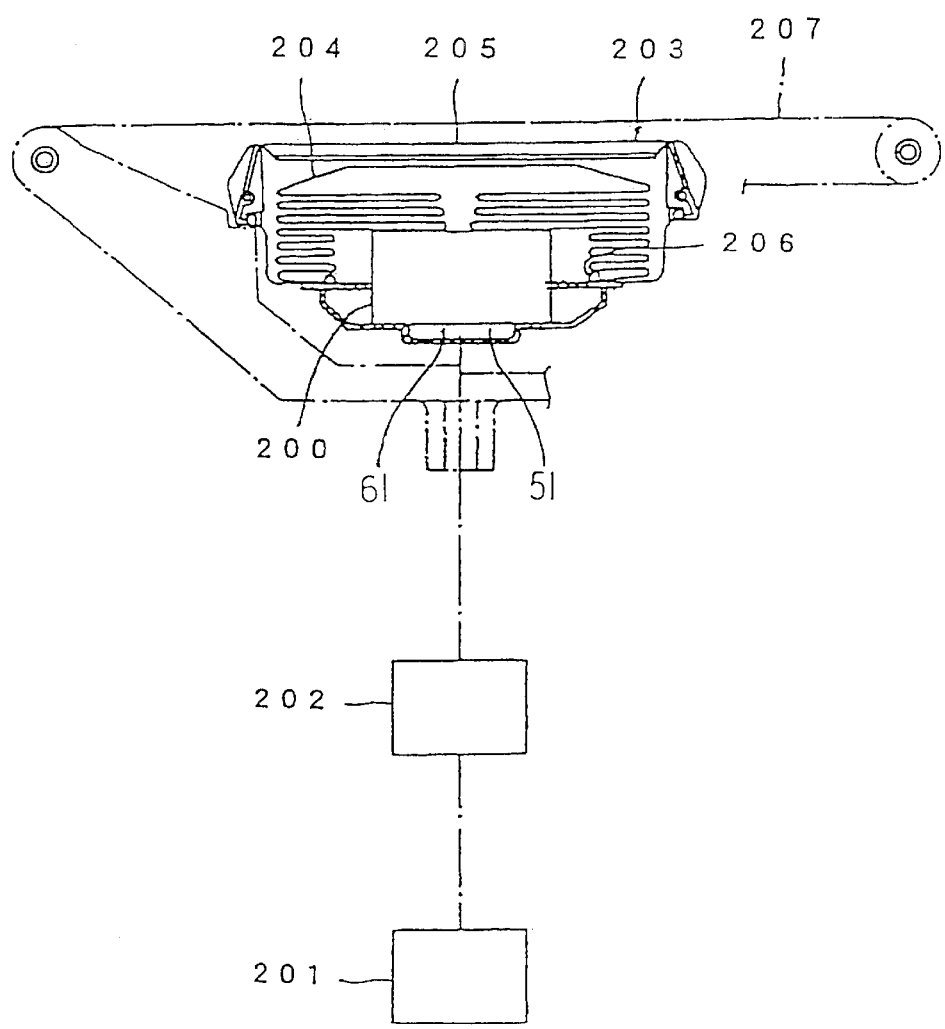
FIG. 9 is a view showing a structure of an air bag apparatus of the invention.

FIG. 9 shows an embodiment of an air bag apparatus according to the present invention in the case of constructing the air bag apparatus in such a manner as to include a gas generator using the electric ignition type ignition means.

The air bag apparatus comprises a gas generator 200, an impact sensor 201, a control unit 202, a module case 203 and an air bag 204. In the gas generator 200, the gas generator described with reference to FIG. 1 is used and the actuation performance thereof is adjusted so as to apply as a small impact as possible to the occupant at the initial stage of the actuation of the gas generator.

The impact sensor 201 can comprises, for example, a semiconductor type acceleration sensor. This semiconductor type acceleration sensor is structured such that four semiconductor strain gauges are formed on a silicone base plate to be bent when the acceleration is applied, and these semiconductor strain gauges are bridge-connected. When the acceleration is applied, the beam defects and a strain is produced on the surface. Due to the strain, a resistance of the semiconductor strain gauge is changed, and the structure is made such that the resistance change can be detected as a voltage signal in proportion to the acceleration.

The control unit 202 is provided with an ignition decision circuit, and the structure is made such that the signals from the semiconductor type acceleration sensor is inputted to the ignition decision circuit. The control unit 202 starts calculation at a time when the impact signal from the sensor 201 exceeds a certain value, and when the calculated result exceeds a certain value, it outputs an activating signal to the igniter 51, 61 of the gas generator 200.

The module case 203 is formed, for example, by a polyurethane, and includes a module cover 205. The air bag 204 and the gas generator 200 are stored in the module case 203 so as to be constituted as a pad module. This pad module is generally mounted to a steering wheel 207 when being mounted to a driver side of an automobile.

The air bag 204 is formed by a nylon (for example, a nylon 66), a polyester or the like, is structured such that a bag port 206 thereof surrounds the gas discharge port of the gas generator and is fixed to a flange portion of the gas generator in a folded state.

When the semiconductor type acceleration sensor 201 detects the impact at a time of collision of the automobile, the signal is transmitted to the control unit 202, and the control unit 202 starts calculation at a time when the impact signal from the sensor exceeds a certain value. When the calculated result exceeds a certain value, it outputs the activating signal to the igniter 51, 61 of the gas generator 200. Accordingly, the igniter 51, 61 is activated so as to ignite the gas generating agent, and the gas generating agent burns and generates the gas. The gas is discharged into the air bag 204, by whereby the air bag breaks the module cover 205 so as to inflate, thereby forming a cushion absorbing an impact between the steering wheel 207 and the occupant.

The gas generator of eccentric structure can be realized by the AIM, the communication hole, the connector, the self-contracting type filter or a combination thereof. The gas generator can also be realized by combining other parts described in the present specification.

The present invention includes a gas generator or an air bag apparatus including AIM, the communication hole, the connector, the self-contracting type filter. The AIM, the communication hole, the connector, the self-contracting type filter disclosed here are suitable for the eccentric structure and can be used in combination.

(AIM)

Namely, a gas generator for an air bag of the present invention comprises a housing including a gas discharge port, igniting means which is accommodated in the housing and to be actuated on an impact, and gas generating means which is accommodated in the housing and to be ignited and burnt by the ignition means and generate combustion gas for expanding the air bag, wherein two or more combustion chambers for accommodating gas generating means are provided being partitioned in the housing, and the automatic ignition material (AIM) to be ignited and burnt by transmitted heat is disposed in either of the combustion chambers.

A communication hole which allows mutual communication between the combustion chambers can also be provided.

For example, if the gas generating means accommodated in the plurality of combustion chambers are burnt at different timing in the respective combustion chambers, it is preferable that the automatic ignition material (AIM) is disposed in the combustion chamber in which the gas generating means to be burnt at delayed timing is accommodated. In this case, the automatic ignition material (AIM) can be ignited and burnt by transmitted heat generated by combustion of gas generating agent which has been burnt first. It is preferable that the automatic ignition material burns the gas generating agent to burn at delayed timing after 100 milliseconds or longer from the point when the ignition means for igniting the gas generating means which is burnt first is actuated. Further, the automatic ignition material can be disposed in combination with the igniter included in the ignition means which ignites and burns the gas generating means which is burnt at a delayed timing (or which may still remain after the actuation of the gas generator).

The gas generator which burns the gas generating means in the respective combustion chambers at different timing can be realized by a gas generator in which an ignition means includes a transfer charge to be ignited and burnt by the actuation of a igniter, and the transfer charge is divided for each igniter and to be independently ignited and burnt at each igniter, and gas generating means accommodated in the plurality of combustion chambers are to be ignited and burnt by flame caused by combustion of the transfer charges in different sections.

For example, in the gas generator in which two combustion chamber for accommodating the gas generating means are provided in the housing, the first gas generating means which burns first and the second gas generating means which burns at delayed timing are respectively disposed in the combustion chambers, and the first ignition means for igniting the first gas generating means and the second ignition means for igniting the second gas generating means are provided, the automatic ignition material (AIM) is provided in the igniter included in the second combustion chamber or the second ignition means. As the automatic ignition material (AIM), the material, which is ignited and burnt by the heat transmitted through the housing which is generated by combustion of the first gas generating means, is used.

Two combustion chambers for accommodating the gas generating means can be provided in the housing concentrically adjacent to one another in the radial direction of the housing, and a communication hole which allows communication between the combustion chambers can be provided.

As the automatic ignition material (AIM) which can be used in the present invention, the material which can be ignited and burnt at least by combustion heat (i.e. transmitted heat) of the gas generating means (which has been burnt first) transmitted from the housing and the like. An example of such material is nitrocellulose.

However, since these may be changed, naturally, by kinds of gas generating means to be used, a heat transfer member (e.g., housing) for transmitting the combustion heat, a distance from a position where the gas generating means to be burnt first is accommodated, it is necessary to appropriately employ these at the stage of design.

The above-described gas generator for the air bag is accommodated in a module case together with an air bag (bag) which introduces a gas generated by the gas generator to expand, thereby constituting the air bag apparatus. In this air bag apparatus, the gas generator is actuated in reaction that an impact sensor senses an impact, thereby discharging the combustion gas from the gas discharge port of the housing. The combustion gas flows into the air bag so that the air bag breaks a module cover and expands, thereby forming a cushion between a passenger and a hard structural member of the vehicle for absorbing the impact.

Embodiment of AIM 1

Figure 28:
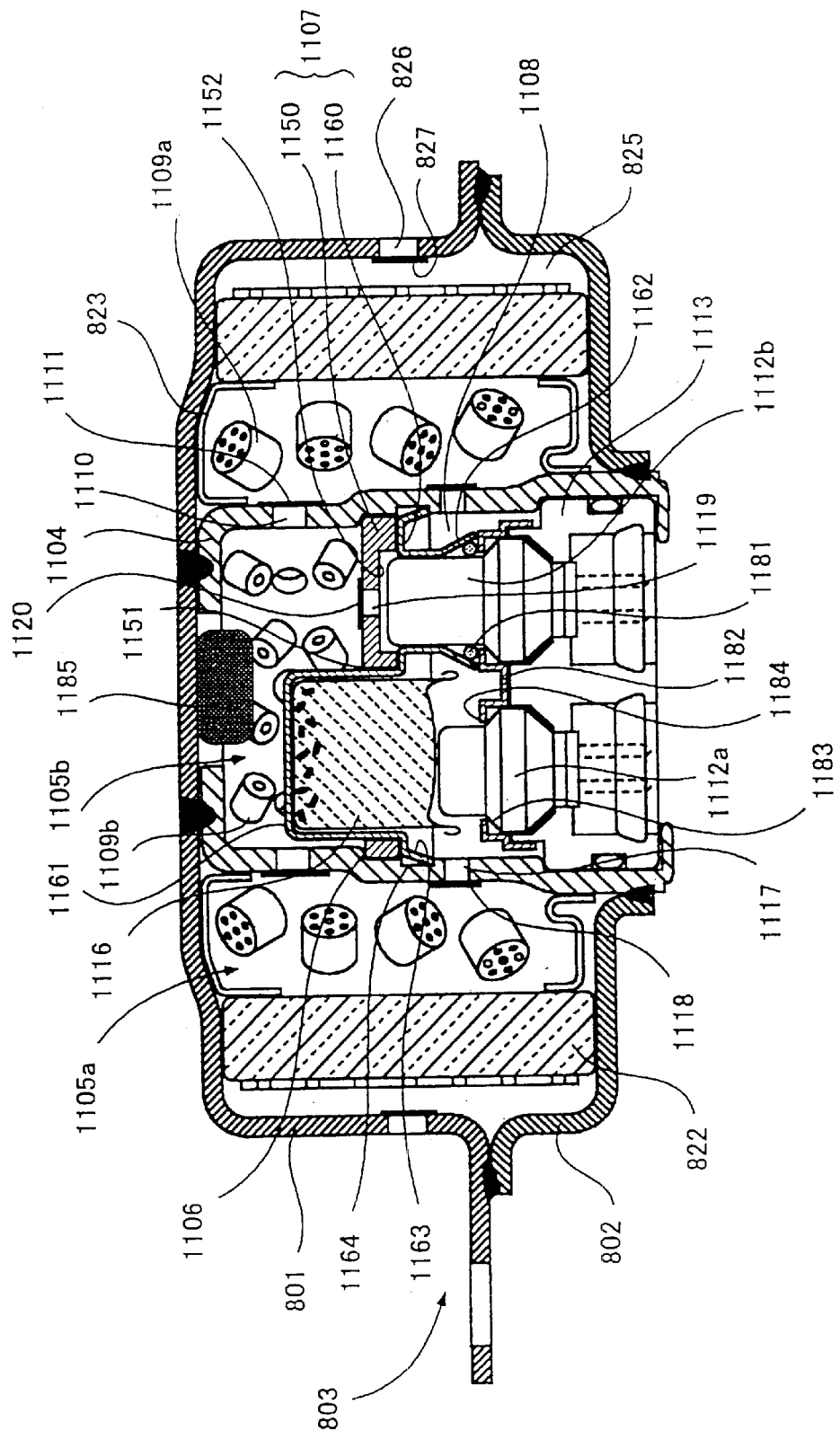
FIG. 28 is a vertical cross sectional view showing one embodiment of the gas generator of the invention.

FIG. 28 is a vertical cross sectional view showing another embodiment of the gas generator for an air bag of the present invention. The gas generator shown in this figure has a structure suitable to be disposed on a driver side.

Figure 29:
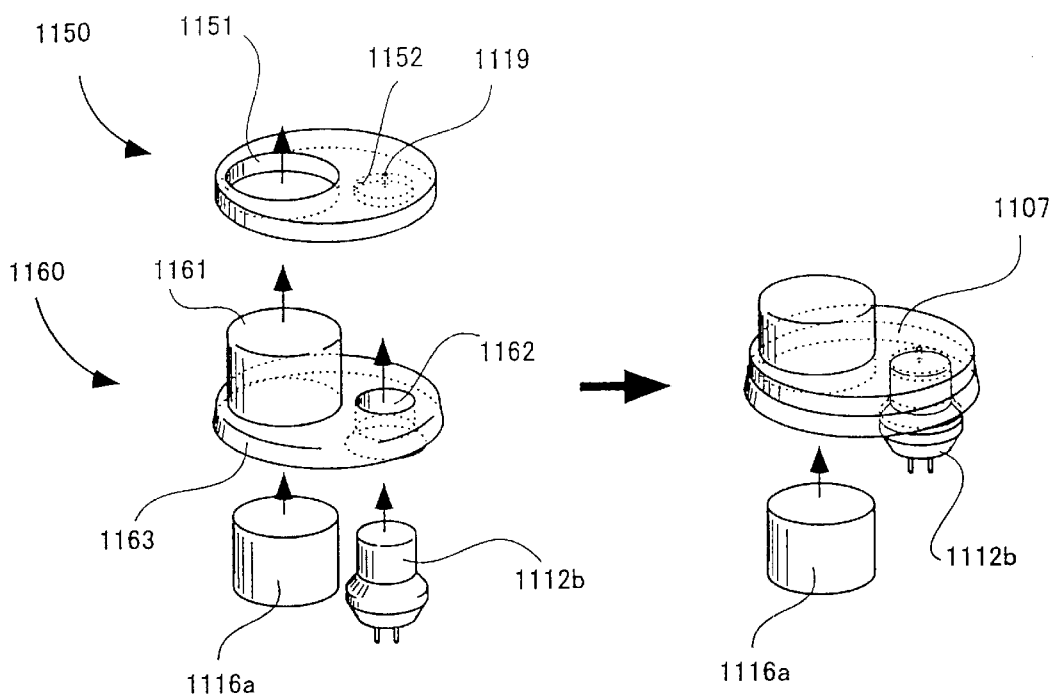
FIG. 29 is a exploded perspective view of an essential portion showing a partition wall.

In the gas generator shown in this figure, a first combustion chamber 1105*a* and a second combustion chamber 1105*b* are defined by an inner cylindrical member 1104, and are disposed adjacent to each other concentrically in a housing 803. The inner cylindrical member 1104 is provided at its inner peripheral surface with a step notch 1106 at a predetermined height. A partition wall 1107 for defining the second combustion chamber 1105*b* and an ignition means accommodating chamber 1108 is disposed in the step notch 1106. In the present embodiment, as shown in an exploded perspective view in FIG. 29, the partition wall 1107 comprises a sectioning circular member 1150 which engages the step notch 1106 of the inner cylindrical member 1104 and a seal cup member 1160 which engages the sectioning circular member 1150. The sectioning circular member 1150 is of substantially flat circular shape, and includes an opening portion 1151 into which a transfer charge accommodating portion 1161 of the seal cup member 1160 is fitted inwardly, a circular hole 1152 having a bottom surface with a circular hollow for accommodating an upper portion of an igniter 1112*b,* and a second flame-transferring hole 1119 which pierces through the substantial center of the circular hole 1152. The seal cup member 1160 includes the cylindrical transfer charge accommodating portion 1161 fitting into the opening portion 1151 of the sectioning circular member 1150 and projecting into the second combustion chamber 1105*b*, and a cylindrical igniter receiving port 1162 formed at a location opposed to the circular hole 1152 of the sectioning circular member 1150 and extending to the opposite side from the transfer charge accommodating portion 1161. A first transfer charge 1116*a* is accommodated in the transfer charge accommodating portion 1161, and a second igniter 1112*b* is fitted into the igniter receiving portion 1162. The sectioning circular member 1150 and the seal cup member 1160 are engaged with each other such that the transfer charge accommodating portion 1161 of the seal cup member 1160 is fitted into the opening portion 1151 of the sectioning circular member 1150. An upper portion of the second igniter 1112*b* fitted through the igniter receiving port 1162 projects into the circular hole 1152 of the sectioning circular member 1150.

The partition wall 1107 comprising the sectioning circular member 1150 and the seal cup member 1160 are engaged with the step notch 1106 formed in the inner peripheral surface of the inner cylindrical member 1104 as shown in FIG. 28. That is, a peripheral edge of the sectioning circular member 1150 is supported by the step notch 1106, and the seal cup member 1160 is abutted against and supported by the sectioning circular member 1150. A peripheral edge of the seal cup member 1160 is formed such as to bend in the same direction as that of the igniter receiving port 1162, and a bent portion 1163 is fitted to the groove 1164 formed in the inner peripheral surface of the inner cylindrical member 1104. With this arrangement, the sectioning circular member 1150 is supported by the seal cup member 1160 so that movement thereof in the axial direction of the housing 803 is inhibited. Further, by fitting the bent portion 1163 of the peripheral edge of the seal cup member 1160 into the groove 1164 of the inner peripheral surface of the inner cylindrical member 1104, the partition wall 1107 (i.e., seal cup member 1160) and the inner cylindrical member 1104 are engaged with each other without a gap. Therefore, in the inner cylindrical member 1104, the ignition means accommodating chamber 1108 provided on the side of the closure shell 802 and the second combustion chamber 1105*b* provided on the side of the diffuser shell 802 are reliably sectioned by the ignition means seal structure comprising the seal cup member 1160 and the groove 1164.

The igniter receiving port 1162 formed in the seal cup member 1160 has a skirt portion which spreads like a fan, and its inner side, i.e., between the igniter receiving port 1162 and the-second igniter 1112*b* accommodated in the igniter receiving port 1162, an O-ring 1181 is disposed for sealing a space between the igniter receiving port 1162 and the second igniter 1112*b*. Further, since the O-ring 1181 is also pressed on an under-mentioned igniter fixing member 1182, the second igniter 1112*b* is disposed in a space defined by the circular hole 1152 of the sectioning circular member, the igniter receiving port 1162 of the seal cup member, the O-ring 1181 and the igniter fixing member 1182. When, on the actuation of the second igniter 1112*b*, the seal tape 1120 closing the second flame-transferring hole 1119 formed in the circular hole 1152 of the sectioning circular member 1150 is ruptured, and the defined space communicates with the second combustion chamber 1105*b*. The first igniter 1112*a* and the second igniter 1112*b* are reliably separated from each other by the seal structure (hereinafter referred as "the igniter seal structure") comprising the skirt of the igniter receiving port 1162, the O-ring 1181 and the igniter fixing member 1182. With this arrangement, flame generated by actuation of any of the igniters will not directly flow into the space where another igniter is accommodated.

In the present embodiment also, the two igniters 1112*a* and 1112*b* are fixed to a single initiator collar 1113 such that the igniters can easily be disposed into the housing. Especially in the present embodiment, the two igniters 1112*a* and 1112*b* are supported by the igniter fixing member 1182 which engages the initiator collar 1113 and are fixed to the initiator collar 1113. The igniter fixing member 1182 is formed into a shape which covers the upper surface of the initiator collar 1113, and has holes 1184 into which into the upper portions of the igniters are inserted, that support the shoulders 1183. The two igniters 1112*a* and 1112*b* disposed in the initiator collar 1113 are fixed to the igniter fixing member 1182 which fits over the initiator collar 1113. By using such an igniter fixing member 1182, the two igniters 1112*a* and 1112*b* can easily assembled into the initiator collar 1113. In the gas generator shown in this embodiment, the first igniter 1112*a* and the second igniter 1112*b* are different from each other in the shapes and the actuation output, but igniters having the same actuation output can also be used.

When the gas generator shown in the present embodiment is actuated, flame generated by the actuation of the first igniter 1112*a* ignites and burns the first transfer charge 1116*a* disposed above the igniter. Flame generated by combustion of the first transfer charge 1116*a* never flows into a space where the second igniter 1112*b* is accommodated because of the igniter sealing structure, nor flows into the second combustion chamber 1105*b* because of the ignition means sealing structure comprising the bent portion 1163 of the seal cup member 1160 and the groove 1164 of the inner cylindrical member 1104. Therefore, the flame generated by combustion of the first transfer charge 1116*a* passes through a first flame-transferring hole 1117 formed in the peripheral wall of the inner cylindrical member 1104 and flows exclusively into the first combustion chamber 1105*a,* and ignites and burns the first gas generating agent 1109*a* to generate a combustion gas. Flame generated on actuation of the second igniter 1112*b* passes through the second flame-transferring hole 1119 formed in the circular hole of the dividing circular member 1150 and flows exclusively into the second combustion chamber 1105*b,* and ignites and burns the second gas generating agent 1109*b* to generate a combustion gas. Especially in the gas generator of this embodiment, the second transfer charge is not provided, and the second gas generating agent 1109*a* directly ignited and burnt by the flame generated on actuation of the second igniter 1112*b.*

Combustion gases generated by combustion of the first gas generating agent 1109*a* and the second gas generating agent 1109*b* then pass through a common coolant/filter 822 and during which, the combustion gas is purified and cooled, and is discharged from the gas discharge port 826 after passing through a gap 825. Seal tapes 1118 and 1120 closing the first and second flame-transferring holes are ruptured when the flame of the igniter and the combustion gas of the transfer charge pass through, and the seal tape 827 closing the gas discharge port 826 is ruptured when the combustion gas passes through.

Figure 30:
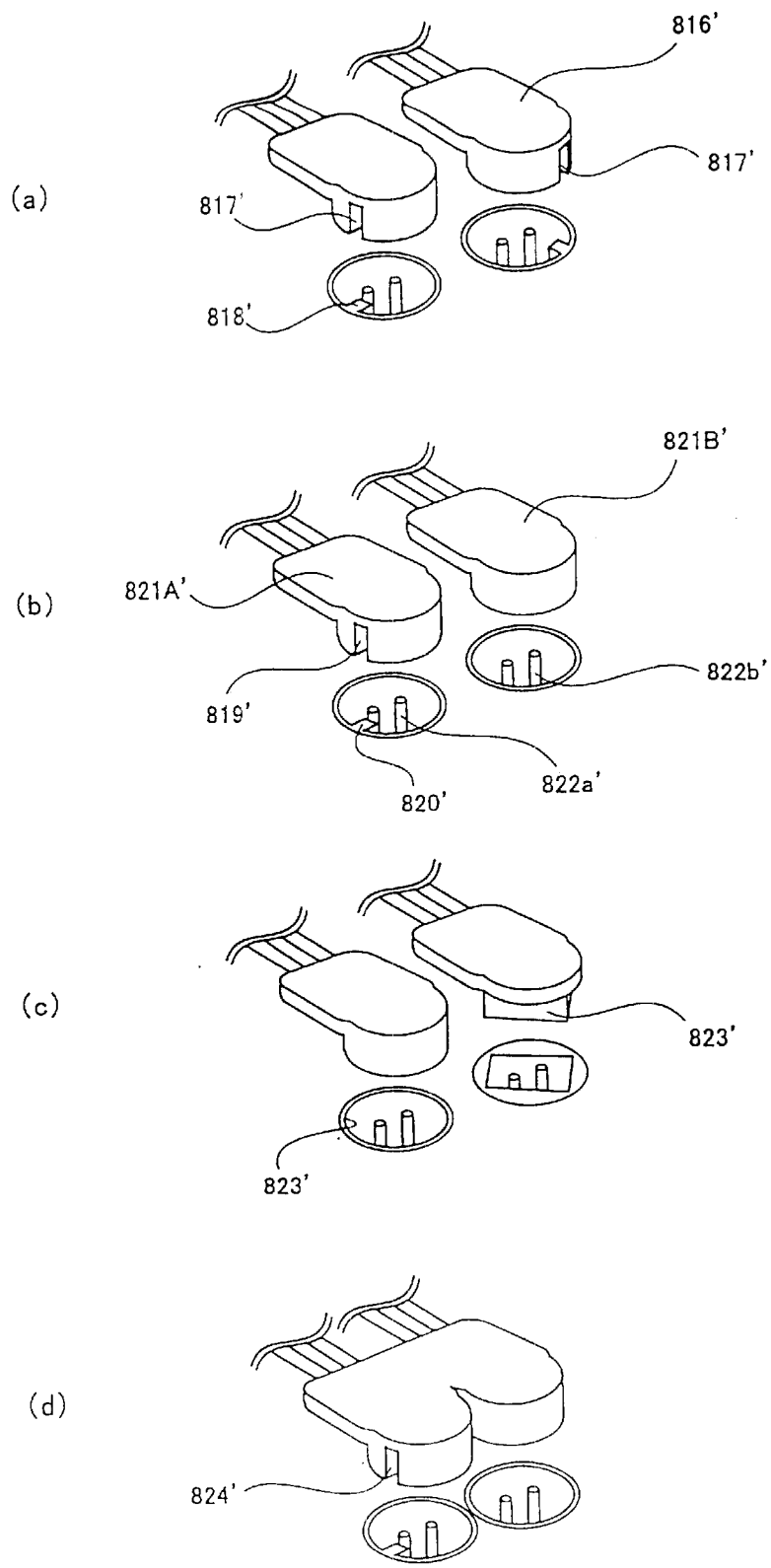
FIGS. 30(a)–(d) are exploded perspective views of an essential portion showing the positioning means.

In this manner, when the actuation timing of the igniters 1112*a* and 1112*b* are staggered, and igniting timing of the gas generating agents 1109*a* and 1109*b,* i.e., actuation performance of the gas generator is adjusted, positioning means is formed to decide the specified lead wires 815' for the respective igniters 1112*a* and 1112*b.* As shown in exploded perspective views of essential portions in FIGS. 30*a* to 30*d* for example, the positioning means can be realized by using connector 816' having different shape for each igniter. In the case of the positioning means shown in FIG. 30a, connectors are formed with positioning grooves (or projections) 817', and position of projections (or grooves) 818' corresponding to the positioning grooves (or projections) 817' are different for each igniter. That is, positions of the grooves (or projections) 817' of the connectors are changed so that, if the connectors 816' are not mounted in a right direction at the time of mounting the connectors 816' to the gas generator, the connectors interfere with each other and can not be mounted correctly. In the positioning means shown in FIG. 30b, only one of connectors 821' is provided with a positioning groove (or projection) 819'. That is, a connector 821A' having the groove (or projection) 819' can be connected to an igniter 822b' which does not have a projection (or groove) 820', but a connector 821B' not having the grove (or projection) 819' can not be connected to an igniter 822a' which has the projection (or groove) 820'. As a result, connection error of the connectors 821' can easily be found at the time of assembling. In FIG. 30c, connecting portions 823' themselves of the connectors are different from each other. In FIG. 30d, two connectors are formed into one connector, and a positioning groove (or projection) 824' is formed. As the positioning means, other means for eliminating connection error of connector can be appropriately employed.

That is, in the gas generator of the present embodiment also, the first and second gas generating agents 1109a and 1109b are respectively ignited and burnt by the first and second igniters 1112a and 1112b independently. In some cases, an electric current is applied only to the first igniter 1112a to ignite and burn only the gas generating agent 1109a in the first combustion chamber 1105a. In other words, the second gas generating agent 1109b and the second igniter 1112b are left unburnt . This case causes inconvenience at the time of later disposal or damping. Therefore, it is preferable that the gas generating agent 1109b in the second combustion chamber 1105b is burnt after at further delayed timing (e.g., 100 milliseconds or more) than the normal delay ignition timing (e.g., 10 to 40 milliseconds) of actuating the second igniter 1112b after actuation of the gas generator (the first igniter 1112a only). Thereupon, the automatic ignition material 1185 which is ignited and burnt by transmission of combustion heat of the first gas generating agent 1109a is disposed in the present invention. In such case, the second gas generating agent 1109b is ignited by the automatic ignition material 1185 after further sufficient time passes, which is longer than the normal predetermined delayed timing (i.e., the actuation interval between the igniters) for actuating the second igniter 1112b following actuation of the first igniter 1112a. That is, it is different from the case that the second gas generating agent 1109b is burnt at the delayed timing (i.e., the second igniter is ignited at delayed timing) in order to adjust the actuation performance of the gas generator. While the actuation current to the second igniter 1112b is delayed arbitrarily to adjust the actuation performance of the gas generator, the second gas generating agent 1109b is never ignited and burnt by the automatic ignition material 1185. Besides, the automatic ignition material 1185 can be provided, being combined with the second igniter 1112b.

The ignition timing of the automatic ignition material is determined by thermal conductivity of heat transmitting material (e.g., housing) which transmits the combustion heat of the first gas generating agent, a distance and the like. In this embodiment, non-azide based gas generating agent is used as the gas generating agent. The heat transmitting material for transmitting the combustion heat of the gas generating agent which burns first is the housing and/or the inner cylindrical member. It is preferable that the automatic ignition material is disposed in a position near each shell in the second combustion chamber and more preferably, the automatic ignition material is in contact with the shell.

The automatic ignition material may be disposed in the second combustion chamber by adhesion, or only the automatic ignition material may be put into another container and the container may be placed in the second combustion chamber. It is preferable that the automatic ignition material is in contact with the heat transmitting material.

In the gas generator in which the automatic ignition material is disposed as described above, even when only the first gas generating agent 1109a is burnt and the second gas generating agent 1109b disposed in the second combustion chamber 1105b left unburnt after the activation of the gas generator, it is possible to burn the second gas generating agent indirectly resulting from the combustion of the first gas generating agent 1109a, and after the actuation of the gas generator, disposal or damping can be carried out without any problem.

Figure 31:
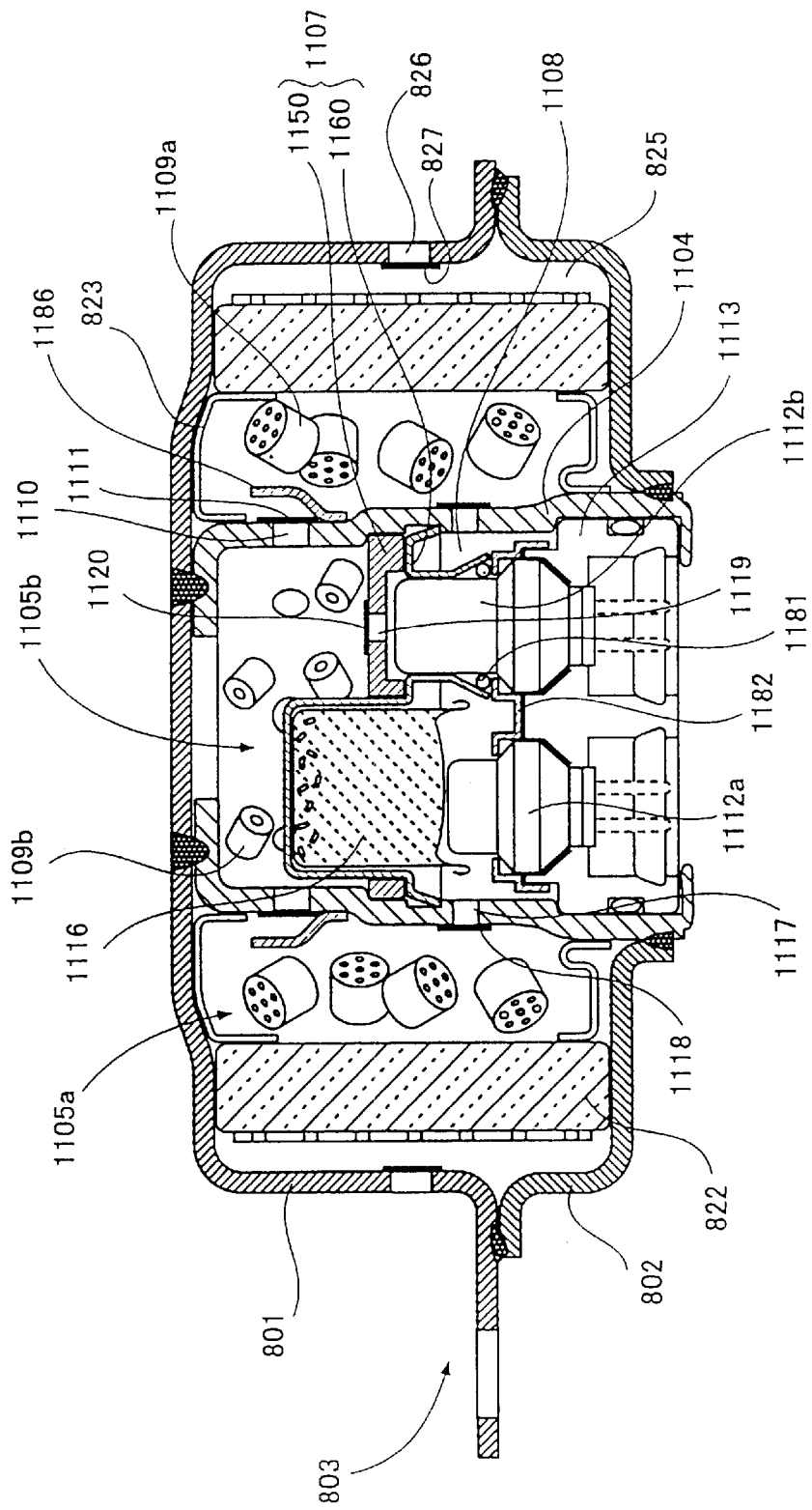
FIG. 31 is a vertical cross sectional view showing another embodiment of the gas generator for an air bag.

The first combustion chamber 1105a and the second combustion chamber 1105b are defined by the inner cylindrical member 1104. The inner cylindrical member 1104 is provided with a through-hole 1110 which is closed by a stainless plate 1111. The stainless plate 1111 is adhered to the inner cylindrical member 1104 by adhesion member such as adhesion, and the through-hole 1110 is opened only by combustion of the second gas generating agent 1109b, and is never opened by combustion of the first gas generating agent 1109a. The reason why the through-hole 1110 is closed by the stainless plate 1111 is to prevent a flame caused by combustion of the first gas generating agent 1109a from flowing into the second combustion chamber 1105b through the through-hole 1110 to burn the second gas generating agent 1109b. Therefore, if such a function can be ensured, instead of closing the through-hole 1110 by the stainless plate 1111, a breaking plate which is broken, peeled, burnt or detached by pressure or the like due to the combustion of the second gas generating agent may be welded, adhered or heat-sealed to close the through-hole 1110, or the peripheral wall of the inner cylindrical member 1104 may be provided with a notch, or the thickness of the peripheral wall of the inner cylindrical member 1104 maybe formed partially thin. Further, as shown in FIG. 31, a substantially ring-like shielding plate 1186 can be disposed such as to cover the through-hole 1110 formed in the inner cylindrical member 1104. Especially in the gas generator shown in FIG. 31, even if the combustion gas is generated by combustion of the first gas generating agent 1109a, since the seal tape which closes the through-hole 1110 is protected by the shielding plate 1186, it is not broken by combustion of the first gas generating agent 1109a. As described above, in the present embodiment, the through-hole 1110 of the inner cylindrical member 1104 is opened exclusively by combustion of the second gas generating agent 1109b, and is never opened by combustion of the first gas generating agent 1109a. Therefore, even if the combustion gas is generated in the first combustion chamber 1105a first, this never flows into the second combustion chamber 1105b, and the gas generating agent 1109b in the second combustion chamber 1105b is ignited and burnt by the actuation of the second igniter 1112b (combustion of the automatic ignition material 1185 in some cases). The combustion gas generated by the second gas generating agent 1112b passes through the through-hole 1110 which is opened by combustion of the second gas generating agent 1112*b* and passes through the first combustion chamber 1105*a* and then, purified and cooled by the coolant/filter 822 and discharged from the gas discharge port 826.

In FIG. 28, the numeral 823 represents a short-pass preventing member for preventing the combustion gas from passing between the end surface of the coolant/filter and the ceiling inner surface of the diffuser shell.

Connector

The present invention provides a multistage type gas generating device, wherein, in an air bag apparatus which includes a gas generator for an air bag comprising a plurality of igniters, and in which actuation signals are outputted from a ignition signal-outputting means to each of the igniters, connection error between the igniters and the ignition signal outputting apparatus is eliminated, and the air bag apparatus can always actuate with a desired output.

The present invention provides a multistage type air bag apparatus wherein, in a gas generating device which comprises a multistage type gas generator for an air bag including a plurality of igniters and in which actuation signals are outputted from ignition signal-outputting means to each of the igniters by a lead wire having the connector, the connector is provided with defining means, and, when the ignition signal-outputting means and the igniters are connected through the lead wires, the respective connections are specified as a unique combination.

In other words, the air bag apparatus of the present invention is a multistage type air bag apparatus comprising a multistage gas generator storing a plurality of electrical ignition type igniters in a housing thereof, an ignition outputting means provided with the equal numbers of the igniters and outputting portions for outputting an actuation signal to the igniters on an impact, and a plurality of lead wires having connectors, wherein the igniters and the outputting portions are connected by the lead wires having the connectors, and said connectors have a defining means which specifies a unique connection of the respective igniters and the respective outputting portions.

The defining means may be formed on the connector provided on at least one end of the lead wire connecting the igniter and the outputting portion, or the defining means may be formed on a way-connector provided at least one on the lead wire which connects the igniter and the outputting portion.

The lead wire may be provided in the same numbers as the electrical ignition type igniter provided n the gas generator. The ignition timing of each of a plurality of the igniters is individually adjusted in accordance with environmental condition at the time of actuation of the air bag apparatus.

When the igniter includes a connecting portion for connecting the igniter to the connector, and the defining means may be formed on the connecting portion of each of the igniters and the connector which connects the lead wire extending from the outputting portion to each of the igniters. When the outputting portion includes a connecting portion to be connected to the connector, the defining means may be formed on the connecting portion of the outputting portions and the connector which connects the lead wire extending from the gas generator to the outputting portion. The way-connector may comprise a plug portion and a jack portion, these portions includes connecting portions, the defining means may be formed on the connecting portions of the plug portion and the jack portion of the way-connector which connects the lead wire extending from the gas generator and the lead wire extending from the outputting portion.

Conductive portions exist on the connector and the connecting portion, the respective conductive portions are brought into contact with each other by connecting the connector and the connecting portion so that ignition signal outputted from the ignition signal-outputting means can be transferred to each of the igniters. In this case, the defining means can be realized by changing at least one of a shape, the number and a position of the conductive portion existing on the connector. For example, the conductive portion of the connector is of convex shape or concave shape, and is connected to the conductive portion of the connecting portion which is formed into a concave shape or convex shape. When the connector provided in each lead wire is made of plastic member, the plastic member may be provided with a defining means, and the a plurality of connectors can be connected to one another by the defining means. The plurality of lead wires are converged into one connector, and the connector can be provided with a defining means.

As described above, in the multistage air bag apparatus, if the connector having the defining means is used for the lead wire for connecting the ignition signal-outputting means and the igniter and for transmitting the actuation signal, it is possible to specify a unique connection of the respective igniters, the respective connectors and the respective actuation outputting means.

In this multistage type airbag apparatus, it is possible to use a gas generator having a cylindrical housing comprising a diffuser shell including a gas discharge port and a closure shell forming an internal space in cooperation with the diffuser shell. A plurality of igniters may be arranged in the same direction as the axis of the housing, and provided in the closure shell.

Further, the present invention also provides a multistage gas generator for an air bag, comprising a housing with a gas discharge port, a plurality of igniters which is accommodated in the housing and to be actuated by electric signals, and gas generating means which is accommodated in the housing and to be burnt and/or expanded by actuation of the igniter for generating an activation gas, wherein each of the igniters includes a connecting portion for connecting to connectors disposed on tip ends of lead wires which transmit an activation signal outputted from an outputting portion of ignition signal-outputting means, and the connecting portion is provided with defining means which allows only one connection of the respective connectors. Especially, this multistage type gas generator for an air bag can be preferably used for the multistage type air bag apparatus.

In other words, this gas generator has, when the gas generator is assembled into the air bag apparatus, the connecting portion for connecting to connectors disposed on tip ends of lead wires which transmit an activation signal outputted from an ignition signal-outputting means, and the connecting portion is provided with a defining means which enables to connect only one of the connectors. As an example of the defining means, the conductive portions in the igniters, which receives the actuation signal from the ignition signal-outputting means, are different from each other in a shape, the number and/or a position of for the respective igniters. With this arrangement, only the corresponding specific connector can be connected. Alternatively, the shape of the connecting portion of the igniter can be formed into a shape which is complementarily fitted only to the specific connector. In the latter case, a groove and/or a projection can be formed on the connecting portion so that positions and/or shapes thereof are different from each other at the respective igniters.

This gas generator is good enough as long as it includes two or more igniters, and the gas generating means for generating the actuation gas for expanding the air bag (bag)

may be solid gas generating agent or pressurized gas. And the gas generator may be formed into either shape suitable to be disposed on a driver side or suitable to be disposed on a passenger side. This gas generator preferably has a structure such that combustion chambers as many as igniters are provided in the housing, and gas generating means in each combustion chamber is burnt and expanded at each igniter.

Further, the present invention provides a connecting method for connecting the ignition signal-outputting means (outputting portion) and the igniter preferably used in the above-described multistage type air bag apparatus.

That is, the present invention provides a connecting method of connecting a ignition signal-outputting means which includes a control unit for sending an ignition signal to a plurality of igniters included in a gas generator, and a plurality of ignition means included in the gas generator, wherein each of the igniters is connected to an ignition means outputting apparatus through a lead wire having a connector, and connections of the respective igniter and the respective output portion are specified by defining means.

As for the defining means, the conductive portions provided on the respective igniters are formed differently from each other in a shape, the number and/or a position at the respective igniters. Alternatively, the defining means can be realized by forming the connector and the connecting portion so as to be fitted to each other complementarily, and thereby the combination thereof is unique. Especially, the latter case can be realized by forming a groove and/or a projection on the connecting portion which is different from each other in a position and/or a shape thereof at each igniter.

Usually, modules comprising the gas generator and the air bag (bag) are different in size and shape in accordance with a disposed position such as a driver side or a passenger side, but the multistage type air bag apparatus of the invention can be used irrespective of the shape and size of the module. Similarly, the gas generator for the multistage type air bag of the invention can be employed to any apparatus such as for a drive side, a passenger side and a backseat regardless of variation of shape and size.

In the multistage type air bag apparatus, any actuation signal outputting apparatus can be used as long as it includes a plurality of actuation signal outputting portions, the outputting timing of the actuation signal outputted from the outputting portions can be adjusted and it senses an impact and outputs the actuation signal. Therefore, the actuation signal outputting apparatus can be used as long as it includes a portion sensing the impact, and a portion for judging a degree of the impact and controlling the output signal, without regard to a structure whether the two portions are integrally formed or separately formed.

In the above-described multistage type air bag apparatus, for optimizing the developing pattern of the air bag (bag), when the actuation signal outputting means senses an impact, the outputting timing of the actuation signal is adjusted, and actuation timing of each igniter included in the gas generator is adjusted. At that time, since the connectors of the lead wires connecting the ignition signal-outputting means and the ignitions are provided with defining means respectively, the actuation signal outputted from the actuation signal outputting means is reliably sent to the specific igniter, i.e., the igniter which is initially planned to be actuated, no variation of actuation performance of the air bag apparatus is caused due to connection error of the ignition signal-outputting means and the igniter. Therefore, in this multistage type air bag apparatus, it is possible to optimize the developing pattern of the air bag more reliably.

Embodiment of Connector

Figure 10:
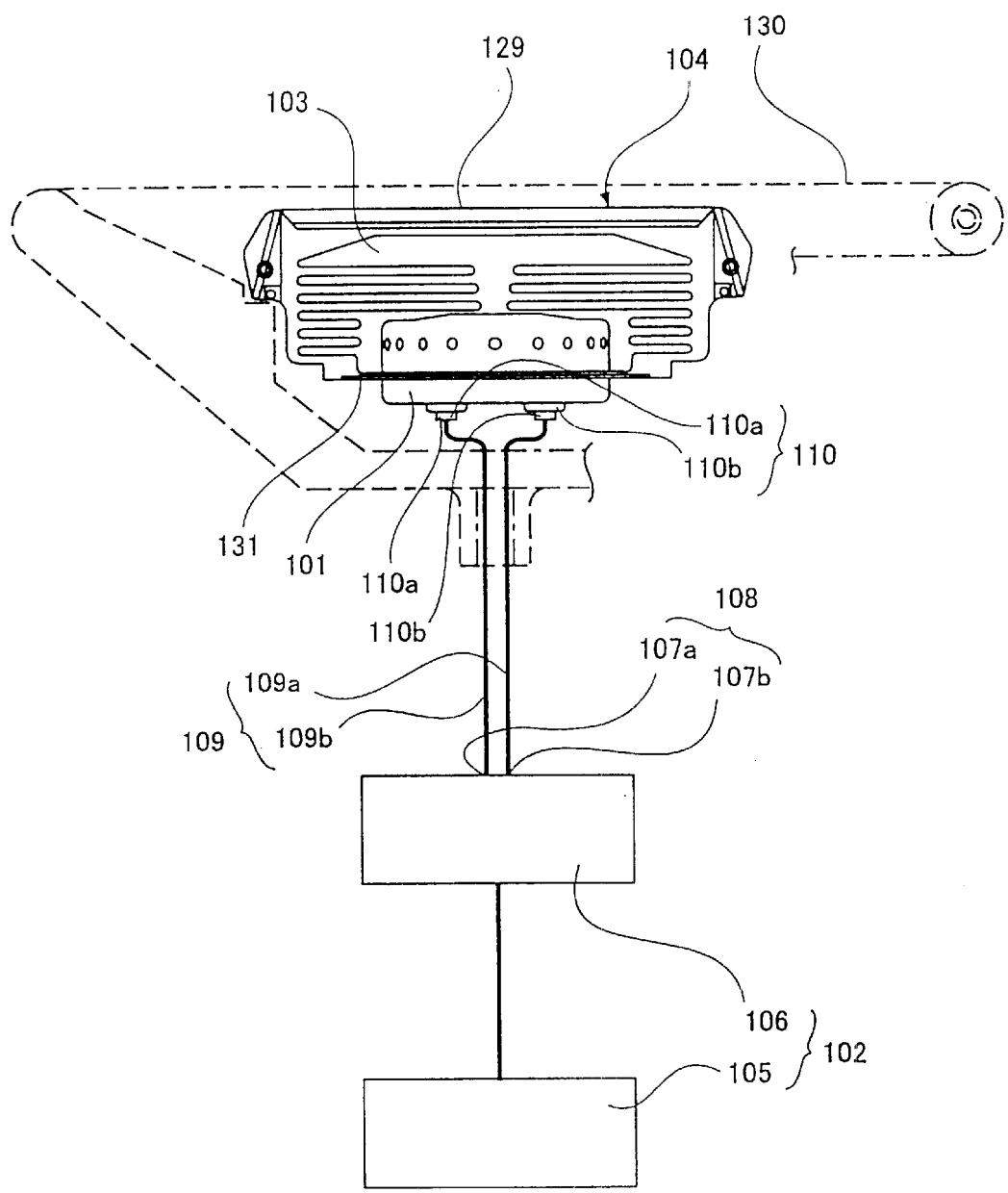
FIG. 10 is a schematic vertical cross sectional view showing one embodiment of the air bag apparatus of the invention.

The multistage gas generator for an air bag apparatus of the present invention will be explained based on the embodiment shown in the drawing below. FIG. 10 is a vertical cross sectional view showing one embodiment of the multistage type air bag apparatus of the invention.

The multistage type air bag apparatus shown in FIG. 10 comprises a gas generator 101 for a multistage type air bag including two igniters 108*a* and 108*b*, and an actuation signal outputting means 102 for outputting actuation signal to each igniter in accordance with an impact. Among them, the gas generator 101 for the multistage type air bag is accommodated in a module case 104 together with an air bag 103 which is to be expanded by introducing an actuation gas generated by actuation of the gas generator.

The actuation signal outputting means 102 comprises an impact sensor 105 which senses an impact and a control unit 106 for inputting a signal from the impact sensor and outputting the ignition actuation signal.

The impact sensor 105 is for sensing the impact, and can be formed using a semiconductor acceleration sensor for example. In the semiconductor acceleration sensor, four semiconductor strain gauges are formed on a beam of a silicon substrate which deflects if acceleration is applied, and the semiconductor strain gauges are bridge-connected. When acceleration is applied, the beam is bent, and strain is generated on the surface. With this strain, resistance of the semiconductor strain gauge is changed, and the resistance change is detected as a voltage signal in proportion with the acceleration.

The control unit 106 includes an ignition judging circuit. A signal from the semiconductor strain gauges is inputted to the ignition judging circuit. When an impact signal from the sensor 105 exceeds a certain value, the control unit 106 starts calculation, and when the calculated result exceeds a certain value, an actuation signal is outputted to the igniters 108*a* and 108*b* of the gas generator 101.

The module case 104 is made of polyurethane, for example, and includes a module cover 129. The air bag 103 and the gas generator 101 are accommodated in the module case 104 to constitute a pad module. When the pad module is mounted to the driver side of an automobile, it is usually mounted in a steering wheel 130.

The air bag 103 is made of nylon (e.g., nylon 66) or polyester and the like, its bag port 131 surrounds a gas discharge port of the gas generator, and the air bag is fixed to the flange portion of the gas generator in a folded state.

In the multistage type air bag apparatus having the above-described structure, when the semiconductor acceleration sensor 105 senses an impact at the time of collision of the automobile, its signal is sent to the control unit 106, and when the impact signal from the sensor exceeds the certain value, the control unit 106 starts calculation. If the calculated result exceeds the certain value, the actuation timing is adjusted, and the actuation signal is outputted to the igniters 108*a* and 108*b*. With this, the igniters 108*a* and 108*b* are actuated to ignite and burn the gas generating agents for generating a combustion gas. The gas is ejected into the air bag 103, and the air bag breaks the module cover 129 and expands, and then forms a cushion between the steering wheel 130 and the passenger for absorbing the impact.

The actuation signal outputted from the control unit 106 is outputted from an outputting portion 107 provided in the respective igniters 108*a* and 108*b* in the control unit 106. The number of the outputting portions 107 should be more than the number of igniters 108 included in the gas generator 101, i.e., two or more in the present embodiment. For adjusting the actuation timing of the igniters, the actuation signals from the outputting portions 107a and 107b can be outputted at different timings. The actuation signals outputted from the outputting portions 107a and 107b transmitted to the igniters 108a and 108b included in the gas generator 101 by the lead wires 109a and 109b provided in the same numbers as the igniters 108a and 108b. In this case, if wrong lead wire 109 is erroneously connected to any of the igniter, desired actuation output can not be obtained. Thereupon, the lead wires 109a and 109b for connecting the outputting portions 107a and 107b and the igniters 108a and 108b are provided with connectors 110a and 110b, and connectors 110a and 110b are provided with defining means. With this arrangement, actuation signal outputted from the first outputting portion 107a is reliably sent to the first igniter 108a, and actuation signal outputted from the second outputting portion 107b is reliably sent to the second igniter 108b. The defining means can be formed differently in accordance with a structure of the igniter 108 and the control unit 106 or a shape of the lead wire 109 for connecting the igniter 108 and the outputting portion 107.

Figure 11:
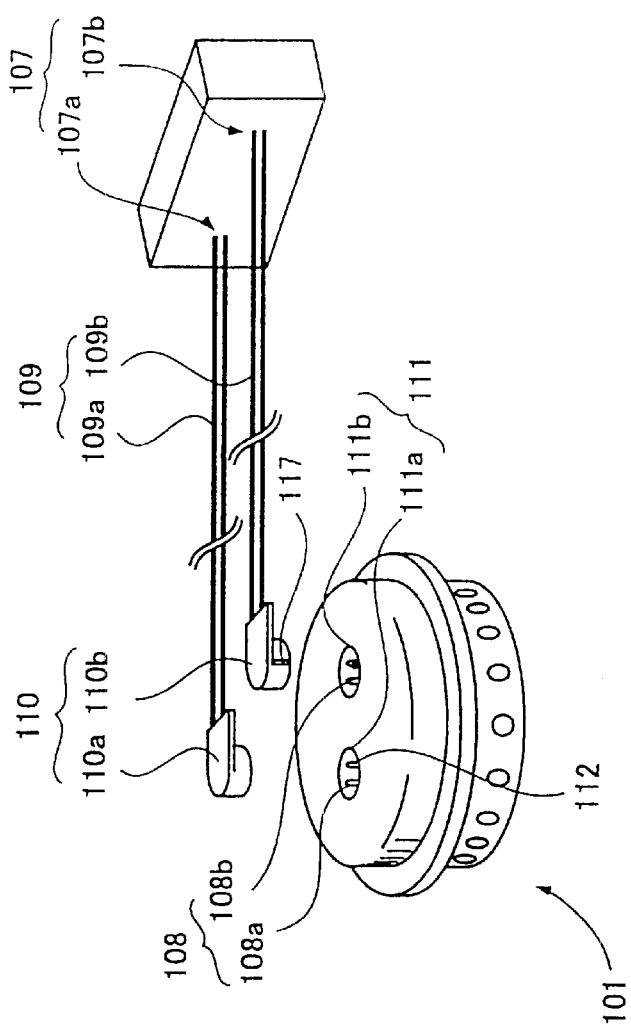
FIG. 11 is a schematic perspective view showing another embodiment of the air bag apparatus.
Figure 12:
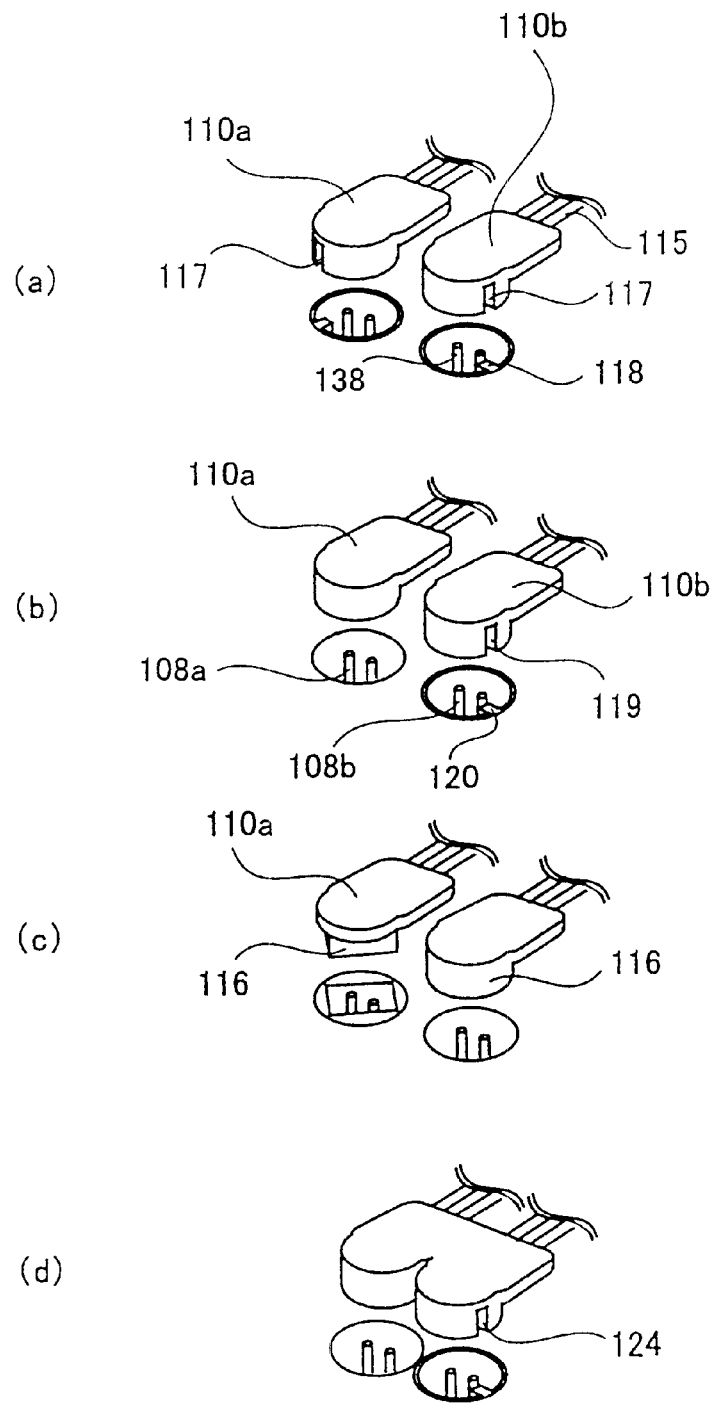
FIGS. 12(a)–(d) are schematic perspective views showing an embodiment of defining means.
Figure 13:
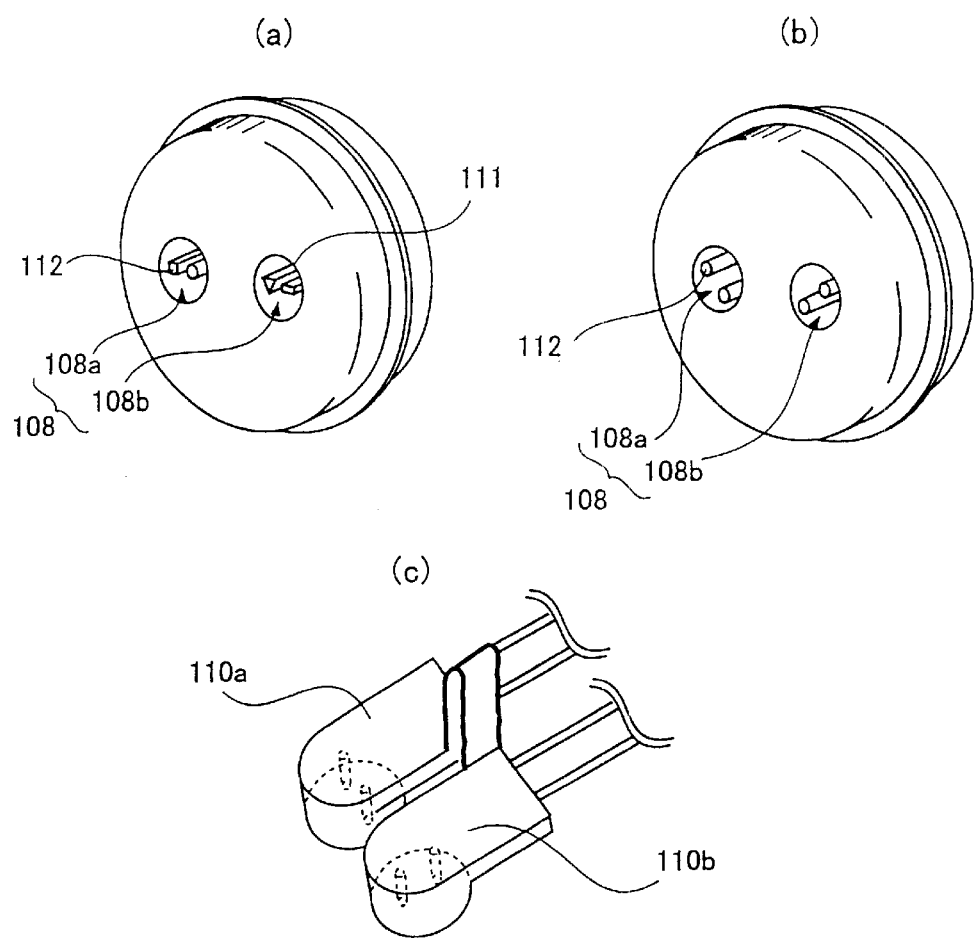
FIGS. 13(a)–(c) are schematic perspective views showing another embodiment of defining means.

In the multistage type air bag apparatus of FIG. 10, as shown in FIG. 11, when the connectors 110a and 110b are mounted to tip ends of the lead wires 109a and 109b respectively extending from the outputting portions 107a and 107b, and the respective connectors 110a and 110b are connected to connecting portions 111a and 111b of the igniter 108a and 108b, connectors 110a and 110b and the connecting portions 111a and 111b can be provided with defining means as shown in FIGS. 12 and 13. When the connector 110 of the lead wire 109 is connected to the igniter in this manner, a conductive portion i.e., a conductive pin 112, which receives the actuation output from the control unit 106, is used.

In the defining means shown in FIG. 12, shapes of the connecting portion are different from each other at the respective igniters, or a groove and/or a projection are formed so that positions and/or shapes thereof are different from each other at the respective igniters. In the case of the defining means shown in FIG. 12a, positioning grooves (or projections) 117 are formed on the connectors 110a and 110b, and positions where projections (or grooves) 118 corresponding to the positioning grooves (or projections) 117 are different from each other at each igniter. In the case of the defining means shown in this drawing, positions of the grooves (or projections) 117 of the connectors are different from each other so that, at the time of mounting the connectors 110a and 110b to the gas generator, if the connectors are not mounted in the right direction, the connectors interfere with each other and they can not be mounted right. In the defining means shown in FIG. 12b, only one connector 110b is provided with a positioning groove (or projection) 119. That is, a connector 110b having the groove (or projection) 119 can be connected to an igniter 108a which does not have a projection (or groove) 120, but a connector 110a which does not have the grove (or projection) 119 can not be connected to an igniter 108b having the projection (or groove) 120. As a result, connection error of the connectors can easily be found at the time of assembling. In FIG. 12c, the shapes of connecting portions 116 of the connectors 110a and 110b are different from each other. In FIG. 12d, two connectors are formed into one connector, and a positioning groove (or projection) 124 is formed.

As the gas generator shown in FIG. 11, when the conductive pin 112 is provided as the conductive portion on the connecting portion to which the connector is connected and the conductive portion (the conductive pin 112) of the connecting portion 111 is connected to the conductive portion of the connector 110 so that current can flow, the shape, the number or the position of the conductive pin 112 can be changed in each igniter, and in accordance with this, the shape, the number or the position of the conductive portion of the connector 110 can be changed.

FIG. 13 shows a mode of the conductive pins different from each other at the respective igniters. FIG. 13a shows that the shapes of the conductive pins 112 of the igniters 108a and 108b are different, and FIG. 13b shows that the conductive pins 112 of the igniters 108a and 108b are formed at the different positions. Such mode of conductive pins can be appropriately employed as long as the respective igniters have different conductive pins form each other. In this case, the shape, the position or the number of the conductive portions of the connectors 110a and 110b are adjusted in accordance with a mode of the conductive pins 112 of the igniters 108a and 108b. When the conductive pins 112 of the igniters 108a and 108b are formed at the different positions as shown in FIG. 13b, the connectors 110a and 110b can also be connected as shown in FIG. 13c.

When the defining means are provided to connect the igniters and the connectors 110a and 110b as described above, the connectors 110a and 110b are preferably designed so that the lead wires 109a and 109b which are connected to the respective connectors 110a and 110b are pulled out in the same direction and further, that direction is perpendicular to the center axis of the housing.

Figure 14:
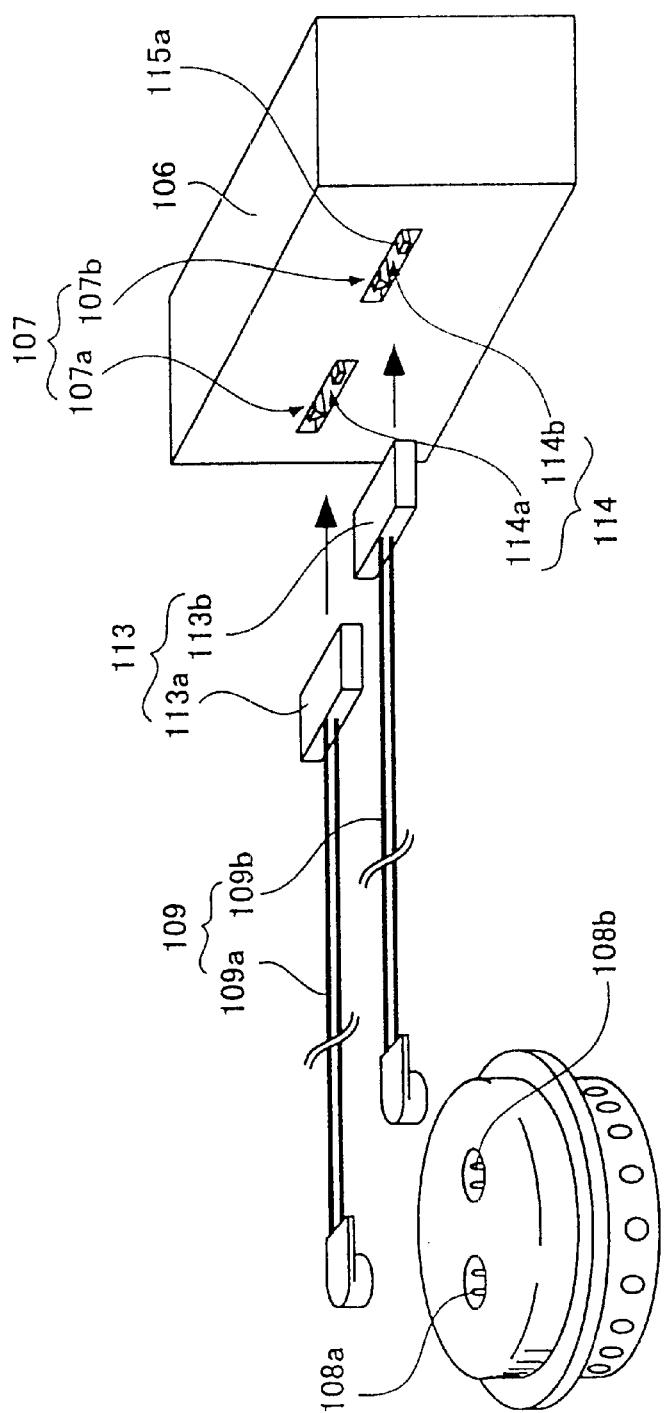
FIG. 14 is a schematic perspective view showing another embodiment of the air bag apparatus.

Further, in the multistage type air bag apparatus shown in FIG. 10, when the ends of the lead wires 109a and 109b are provided with connectors 113a and 113b, and the connectors 113a and 113b are respectively connected to connecting portions 114a and 114b of the outputting portions 107a and 107b as shown in FIG. 14, the connectors 113a and 113b and the connecting portions 114a and 114b can be respectively provided with defining means similar to those of the igniters shown in FIG. 12. Namely, shapes of the connecting portions 114a and 114b of the outputting portions 107a and 107b are different. at the respective connectors 113a and 113b, or grooves and/or projections which are different in position and/or shape are formed. In accordance with the connecting portions 114a and 114b of the outputting portions 107a and 107b, in this case, the connectors 113a and 113b are formed in shape to have positions and/or into shapes of the grooves and/or the projections respectively. Further, when the connecting portions 114a and 114b of the outputting portions 107a and 107b have conductive pins 115a and 115b which functions as the conductive portions, the conductive pins 115a and 115b can be formed into the mode shown in FIG. 13. In this manner, in the case of the multistage type air bag apparatus in which the connector 113 of the lead wire 109 is connected to the ignition signal-outputting means (the control unit 106 in the present embodiment), by providing the connecting portions 114a and 114b of the outputting portions 107a and 107b and the connectors 113a and 113b with the defining means, the lead wire 109a is connected to the first outputting portion 107a through the connector 113a, and the lead wire 109b is connected to the second outputting portion 107b through the connector 113b. Therefore, when the igniters 108a and 108b are connected to the lead wires 109a and 109b respectively, by providing the defining means shown in FIGS. 12 and 13, the actuation signal outputted from the first outputting portion 107a is inputted to the first igniter 108a without mistake, and the actuation signal outputted from the second outputting portion 107b is inputted to the second igniter 108*b* without mistake. With this arrangement, in the multistage type air bag apparatus, a desired actuation performance can be obtained reliably.

Figure 15:
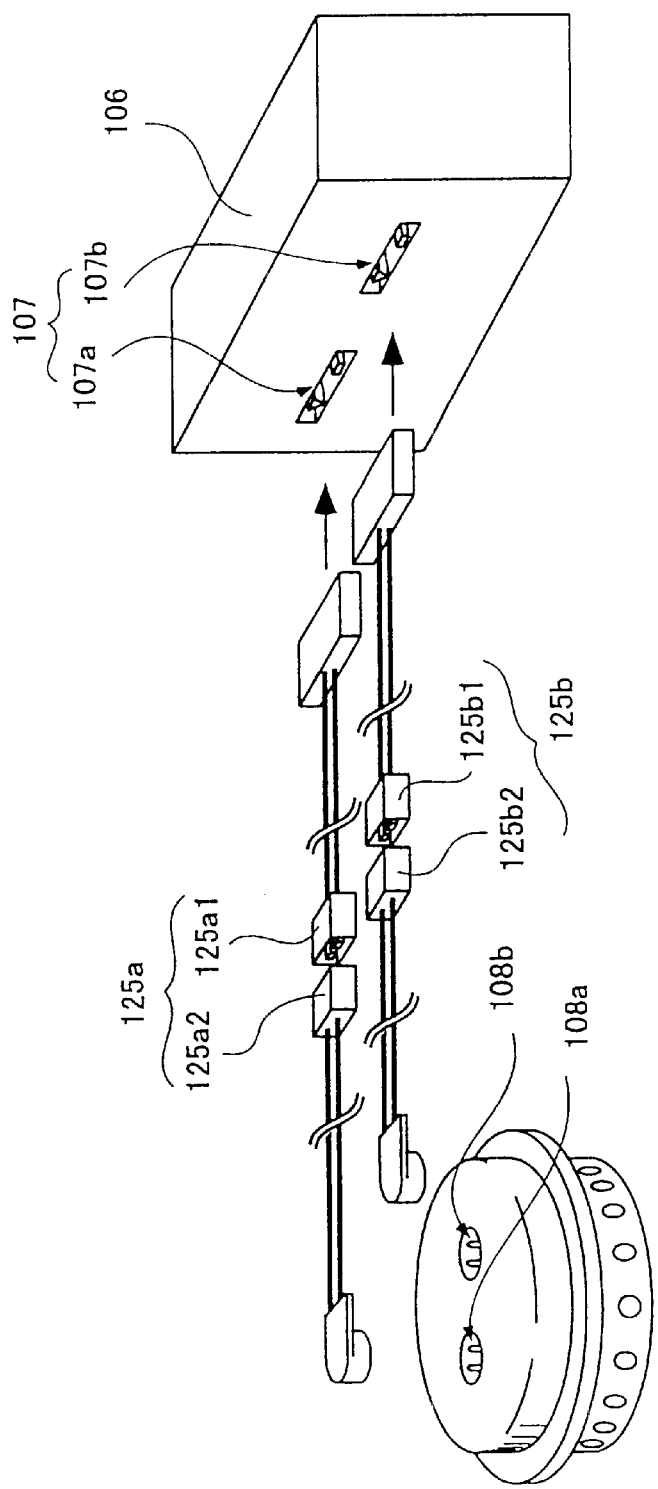
FIG. 15 is a schematic perspective view showing still another embodiment of the air bag apparatus.
Figure 16:
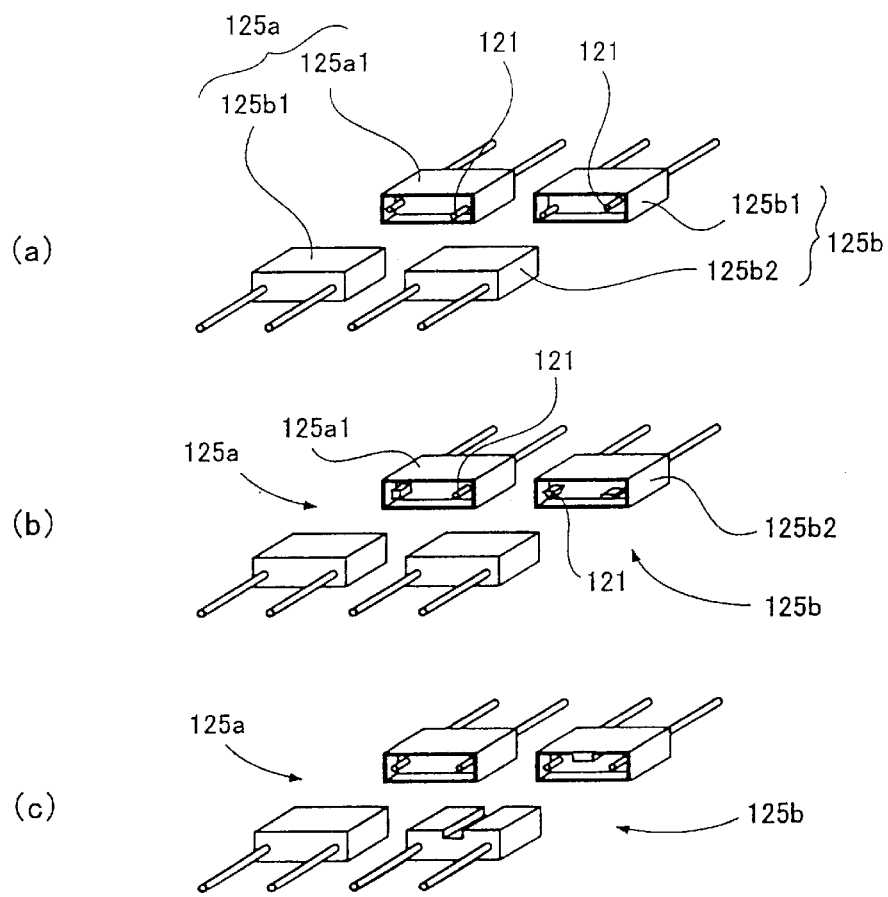
FIGS. 16(a)–(c) are schematic perspective views showing still another embodiment of defining means.
Figure 17:
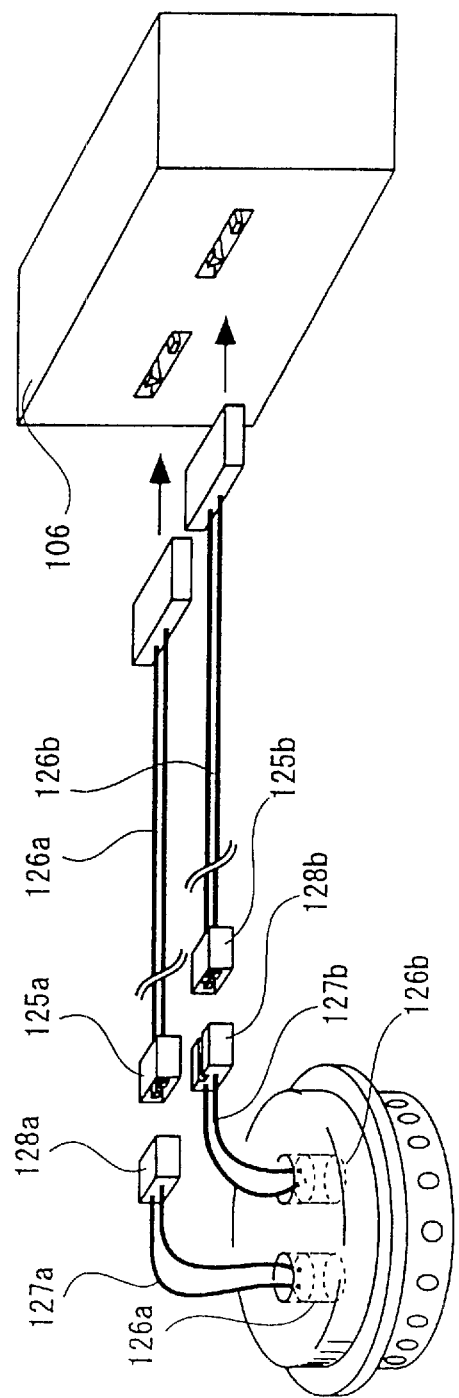
FIG. 17 is a schematic perspective view showing another embodiment of the air bag apparatus.

Further, in the multistage type air bag apparatus shown in FIG. 10, as shown in FIG. 15, when way-connectors 125*a* and 125*b* are connected to the intermediate portions of the lead wires which connect the outputting portions 107*a* and 107*b* of the ignition signal-outputting means (the control unit 106 in the present embodiment) and the gas generator for the multistage type air bag (the igniter 108 in the present embodiment), the way-connectors 125*a* and 125*b* can also be provided with defining means. That is, the defining means as explained in FIGS. 12 and 13 are provided in a plug 125*a*1 and a jack 125*a*2 of the way-connector 125*a*, and in a plug 125*b*1 and a jack 125*b*2 of the way-connector 125*b*. Such defining means can be realized by adjusting the shape of the connector itself or by providing or not providing concave and convex, or adjusting the position, shape and the like of the conductive pin so that the plug 125*a*1 can be connected only to the jack 125*a*2, and the plug 125*b*1 can be connected only to the jack 125*b*2. More specifically, as shown in FIG. 16(*a*), the locations where the conductive pins 121 of the plugs 125*a*1 and 125*b*1 can be set different from each other at the respective way-connectors 125*a* and 125*b*. Alternatively, as shown in FIG. 16(*b*), shapes of the conductive pins 121 of the plugs 125*a*1 and 125*b*1 can be made different from each other at the respective way-connectors 125*a* and 125*b*. Or as shown in FIG. 16(*c*) the shapes of the connectors 125*a* and 125*b* can be made different from each other. For example, as shown in FIG. 17, the method of providing the defining means to such way-connectors can be employed also when the igniters 126*a* and 126*b* provided in the gas generator do not directly connect the connectors. In other words, when the igniters include a connecting portion for connecting the connector, the defining means can be provided by the method as shown in FIGS. 12 and 13, but when the lead wires 127*a* and 127*b* are connected directly to the igniters 126*a* and 126*b* as shown in FIG. 17, it is difficult to connect the connectors directly to the igniters 126*a* and 126*b*. Thereupon, the lead wires 127*a* and 127*b* extending from the igniters 126*a* and 126*b* are provided at their tip ends with the connectors 128*a* and 128*b*, and the way-connectors 125*a* and 125*b* are connected to the connectors. If the connectors are respectively provided with the defining means and the way-connector 125*a* is connected to the connector 128*a* and the way-connector 125*b* is connected to the connector 128*b*, the actuation signal sent from the first lead wire 126*a* is reliably transmitted to the first igniter 126*a*, and the actuation signal sent from the second lead wire 126*b* is reliably transmitted to the second igniter 126*b*.

By the above-described structure and method, in this multistage type air bag apparatus, connection error of the outputting portion and the ignition is eliminated, and the actuation signals of the igniters outputted from the outputting portions 107*a* and 107*b* of the control unit 106 in the ignition signal-outputting means can be transmitted to the desired igniters. Therefore, according to this multistage type air bag apparatus, a desired actuation performance can reliably be obtained.

Figure 18:
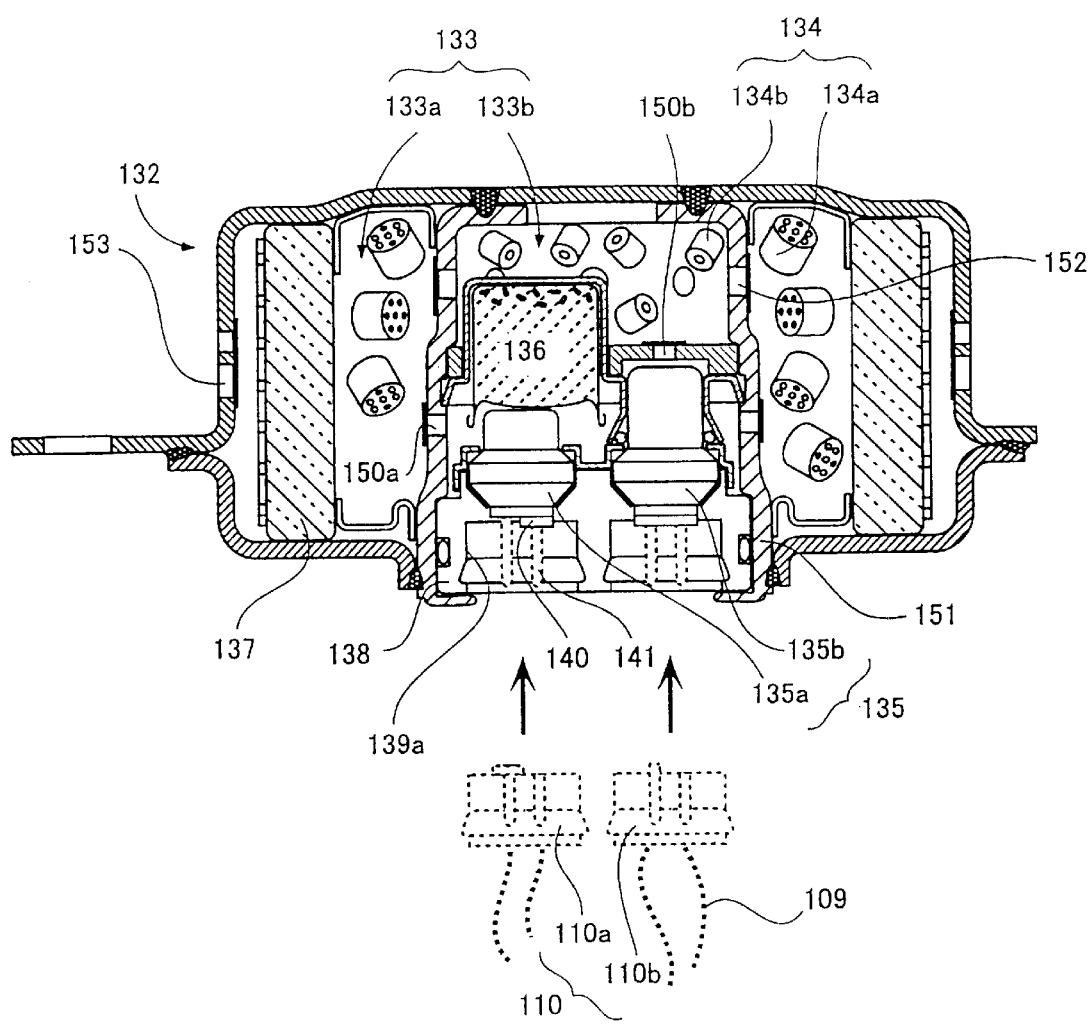
FIG. 18 is a vertical cross sectional view showing another embodiment of the gas generator of the present invention.

FIG. 18 is a vertical cross sectional view showing an embodiment of a multistage type air bag apparatus preferably used for the above-described multistage type air bag apparatus. Namely in this gas generator, the multistage type air bag is provided with defining means which can specify the connectors 110*a* and 110*b* mounted to tip ends of the lead wires connected to the ignition signal-outputting means and can connect the connectors, as explained in the above.

In this gas generator, two combustion chamber 133*a, b* for accommodating gas generating agents are provided in a housing 132, and two igniters 135*a, b* for burning gas generating agents 134*a, b* disposed in the respective combustion chambers are accommodated. The igniters disposed in the housing can be actuated independently, and when one of the igniters is actuated, the gas generating agent in one of the combustion chambers is ignited and burnt. That is, this gas generator is adapted such that the gas generating agents 134*a, b* in the combustion chambers 133*a, b* are ignited and burnt only by either one of the igniters 135. Therefore, if the actuation timings of the igniters 135*a, b* are adjusted, the burning timings of the gas generating agents 134*a, b* in the combustion chambers can be adjusted, and with this feature, the actuation performance of the gas generator and the air bag apparatus can be adjusted. More specifically, when the first igniter 135*a* is actuated, the transfer charge 136 is burnt, the flame is ejected from first flame-transferring hole 150 into the first combustion chamber 133*a* to ignite and burn the first gas generating agent 134*a* accommodated in the first combustion chamber. The second igniter 135*b* is actuated simultaneously with or slightly later than the first igniter, and the flame passes through the second flame-transferring hole 150*b* and ejected into the second combustion chamber. The second gas generating agent is ignited and burnt by this flame to generate the actuation gas, and the gas passes through the throughhole 152 of the inner cylindrical member 151 and is ejected into the first combustion chamber 133*a*. The actuation gas generated by combustion of the first gas generating agent 134*a* and the second gas generating agent 134*b* is purified and cooled while the gas passes through the coolant/filter 137 and discharged from the gas discharge port 153.

In this gas generator, the transfer charge 136 capable of being ignited and burnt by the actuation of the igniter 135 to efficiently burn the gas generating agent can be combined in the igniter 135. When the gas generating agent 134 is burnt and combustion residue is also generated, a filter for purifying the combustion residue can be disposed, and a coolant for cooling the combustion gas can be disposed. In the present embodiment, the coolant/filter 137 for purifying and cooling the combustion gas is used.

In this gas generator, the two igniters are respectively accommodated in igniter collars 138 and disposed in the housing 132. In the igniter collar, the position where the igniter 135 is accommodated is provided with a connecting portion 139. Connectors 110 of tip ends of the lead wires 109 extending from the ignition signal-outputting means are respectively connected to the connecting portions when the air bag apparatus is formed using the gas generator.

In the gas generator of the present invention, the connecting portion 139 is provided with a defining means 140 so that among the plurality of connectors 110*a, b* for transmitting the actuation signals from the ignition signal-outputting means to the igniters 135*a, b*, the connector 110*a* capable of being connected to the connecting portion 140 can be specified. That is, the defining means 140 of the igniter 110*a, b* are formed differently at the respective igniters 110*a, b*. For example, as shown in FIG. 12, the shapes of the connecting portions 139*a, b* of the igniters 125*a, b* can be formed differently from each other, or grooves and/or projections having different positions and/or shapes can be formed. Further, as shown in FIG. 13, shapes, positions or the like of the conductive pins 141 of the igniters projecting into the connections 139*a, b* can be set different from each other at the respective igniters 135*a, b*.

Although the gas generator suitable to be disposed on a driver side has been described in the present embodiment, a gas generator which is long in the axial direction suitable to be disposed on a passenger side, or a gas generator using pressurized gas instead of solid gas generating agent can be used as long as the gas generator includes two or more igniters.

The two igniters may not be always disposed on the same plane as shown in FIG. 18, and the igniters can also be disposed on different planes, e.g., on the upper surface and the lower surface of the gas generator.

Self-contracting type Filter

Filter means of a gas generator for an air bag of the present invention is substantially cylindrical shape as a whole, and at least any of axially end surface is formed such as to be inclined and narrowed outwardly in the radial direction. This filter means expands radially outward by the actuation gas generated by the actuation of the gas generator. By this expansion, the filter means abuts against the supporting portion and/or supporting member in the housing, and the filter means is contracted in the axial direction by the inclination of the end surface, and at the time of actuation of the gas generator, the short pass of the actuation gas at the end surface of the filter means can be prevented.

That is, the filter means of the gas generator for the air bag of the present invention is disposed in the housing of the gas generator for the air bag, and the cylindrical filter means is for purifying and/or a cooling an activation gas, one or both of axial end surfaces of the filter means are formed as inclining end surfaces which get narrower in an axial extending direction and the interior angle with respect to the inner peripheral surface is an acute angle. Especially, since this filter means expands outwardly in the radial direction by the actuation gas generated on the actuation of the gas generator, it is preferable that the filter means is made of wore rods, and formed so as to expand and contract in the radial direction.

Such filter means includes any filter means, having a opening through which the actuation gas passes, such as the filter used for cooling the actuation gas when a temperature of the gas is high and, in addition, a filter for purifying the combustion residue included in the actuation gas, and a coolant/filter having both the functions. The filter means is substantially cylindrical shape as a whole, and one or both of axial end surfaces of the filter means are formed as inclining end surfaces. The inclining end surfaces are inclined so as to be narrowed in the axial extending direction of the filter means. More specifically, if the upper end surface is inclined, it is inclined so as to descend outwardly in the radial direction, and if the lower end surface is inclined, it is inclined so as to ascent outwardly in the radial direction. That is, the filter means comprises an inclining portion formed with an inclined end surface, and a straight body portion axially connected to the inclining portion to form a peripheral surface. The inclining portion can be provided on the both sides of the straight body portion in the axial direction, or on either side of straight body portion.

This filter means can be formed by laminating cylindrically a wire mesh made of various wire rods to form a laminated wire mesh filter, and then compress-molding the filter. An example of the wire mesh made of wire rods is preferably a stainless steel wire mesh, and as the stainless steel of the wire mesh material, SUS304, SUS310S, SUS316 (in the Japanese Industrial Standards codes) and the like can be used. SUS304 (18Cr—8Ni—0.06C) exhibits excellent corrosion resistance as an austenitic stainless steel. If such a filter means made of wire rods is formed to expand and contract at least in the radial direction, further remarkable effects can be obtained.

Further, the present invention provides, a gas generator for air bag for effectively preventing the short pass of the actuation gas using the above-described filter means.

That is, a gas generator for an air bag of the present invention comprises, in a housing with a gas discharge port, a igniting means to be actuated on an impact, a gas generating means for generating an activation gas to expand the air bag due to actuation of the ignition means and a cylindrical filter means for purifying and/or cooling the activation gas, wherein in said filter means, one or both of axial end surfaces are formed as inclining end surfaces which get narrower in an axial extending direction and the interior angle with respect to the inner peripheral surface is an acute angle, and a supporting portion which is opposed to the inclining end surface of the filter exists in the housing.

As the supporting portion provided in this housing, for example, the inner surface of the housing opposed to the inclining end surface of the filter means, i.e., the inner surface where the inclining end surface of the filter means are provided as well as in the axial direction of the position where the filter means are provided, an inclining surface having substantially the same inclination as the inclining end surface of the filter means are formed as the supporting portion of the housing. Alternatively, a filter means supporting member which has a inclining side opposed to the inclining end surface of the filter means is disposed in the housing in the axial direction of the filter means end surface and on the side where the inclining end surface of the filter means is formed, and thereby, the inclining surface of the filter means supporting member can be the above supporting portion.

As the filter means, the one whose end surfaces of the axially opposite sides are formed as inclining end surfaces can be used. Alternatively, the filter means whose either of end surfaces of axially opposite sides formed into the inclining end surface. In other words, the filter means comprises a straight body portion forming the peripheral surface and an inclining portion formed with an inclining end surface. The inclining portion is provided on either or both sides of the straight portion in the axial direction. When the filter means formed at its axially both end surfaces with the inclining end surfaces (inclining portions) is used, the supporting portions provided in the housing are provided on axially both sides where the filter means is disposed. When the filter means formed at its axially one end surface with the inclining surface (inclining portion), the supporting portion provided in the housing is provided in the axial direction of the filter means as well as on the side of the inclining surface (inclining portion) of the filter means. In this case, it is preferable that a retainer having an annular portion and an outer peripheral wall is disposed in the housing on the axially opposite side of the supporting portion, i.e., the opposite side of the inclining end surface, with respect to the filter means end surface, and an inner surface of the outer peripheral wall of the retainer is opposed to an outer peripheral surface of the filter means end. Instead of disposing the retainer, the outer diameter on the end surface where the inclining end surface of the filter means is not formed can be formed larger so that the end surface abuts against the inner surface of the peripheral wall of the housing.

When it is not desired that the straight portion of the filter means is expanded and deformed, e.g., when it is desired to ensure a space between the inner surface of the housing and an outer surface of the filter means, the straight portion may be provided at its outer peripheral surface with expansion-suppressing means comprising a punching metal or a winding of a porous cylindrical shape to prohibit expansion thereof. In this case, only the inclining portion of the filter means expands and then abuts against and is supported by the supporting portion (material).

The gas generator of the present invention is not limited by the entire shape thereof. Therefore, for example, the gas generator having a cylindrical shape which is long in the axial direction or the gas generator having a cylindrical shape which is wide in the radial direction can be used. As the ignition means disposed in the housing, as long as it is actuated on an impact, an igniter which is actuated electric signal output by an impact, any known igniter, which is used to make the gas generating means generate an actuation gas, such as an igniter to be activated by an electrical signal outputted on an impact, or a combination of said igniter and a transfer charge to be ignited and burnt by actuation of the igniter, can be used.

Examples of the gas generating means which is accommodated in the housing for generating the actuation gas to expand the air bag on the actuation of the ignition means are a solid gas generating agent which is to be ignited and burnt by the actuated ignition means to generate an actuation gas, a pressurized gas which is heated to expand and generate an actuation gas, and a combination. As the gas generating agent, a conventionally and widely used azide-based gas generating agent based on inorganic azide such as sodium azide, or a non-azide-based gas generating agent not based on inorganic azide can be used. Further, as the pressurized gas, a known gas such as a mixture of oxygen and inert gas can be used. That is, the gas generator of the present invention can be realized by both of a pyrotechnic gas generator using a solid gas generating agent, and a hybrid gas generator using pressurized gas as well as solid gas generating agent.

The gas generator of the present invention is actuated so that, after the ignition means is actuated, the actuation gas is generated form the gas generating means, the actuation gas is purified and cooled while it passes through the filter means and then, the gas is discharged form the gas discharge port. When the actuation gas passes through the filter means, the filter means expands in the radial direction due to the pressure of the actuation gas, but in the gas generator, the axially one or both end surfaces of the filter means is formed as the inclining surface which is inclined so as to be narrowed outwardly in the radial direction, and the supporting portion having the inclining surface which is opposed to the inclining surface of the filter means is provided in the housing. Therefore, the inclining surface of the filter means which expands in the radial direction abuts against the supporting portion in the housing, and the filter means is slightly contracted in the axial direction by this inclination. With this, the end surface of the filter means is strongly brought into contact with the supporting portion with pressure, and the short-pass of the actuation gas between the inclining surface (i.e., end surface) of the filter means and the supporting portion can be prevented.

As realized also in the gas generator having the above-described structure, manufacturing cost can be reduced by employing the method of a purifying and/or cooling an actuation gas wherein a supporting portion which is inclined so as to be narrowed in the axial extending direction of the housing is provided in the housing, the cylindrical filter means expanded radially by passage of the actuation gas is contracted in the axial direction by inclination of the supporting portion and is abutted against the supporting portion, and thereby preventing the activation gas from passing between the filter means and the supporting portion.

The above-described gas generator is accommodated in the module case together with the air bag (bag) to expand by a gas generated by the gas generator, and combined with the impact sensor for sensing at least an impact to actuate the gas generator, thereby constituting the air bag apparatus. In this air bag apparatus, the gas generator is actuated as an impact sensor senses an impact, thereby discharging the combustion gas from the gas discharge port of the housing. The combustion gas flows into the air bag so that the air bag breaks a module cover and expands to form a cushion between a passenger and a hard structural member in the vehicle for absorbing the impact.

Embodiment of Self-contracting Type Filter 1

Figure 19:
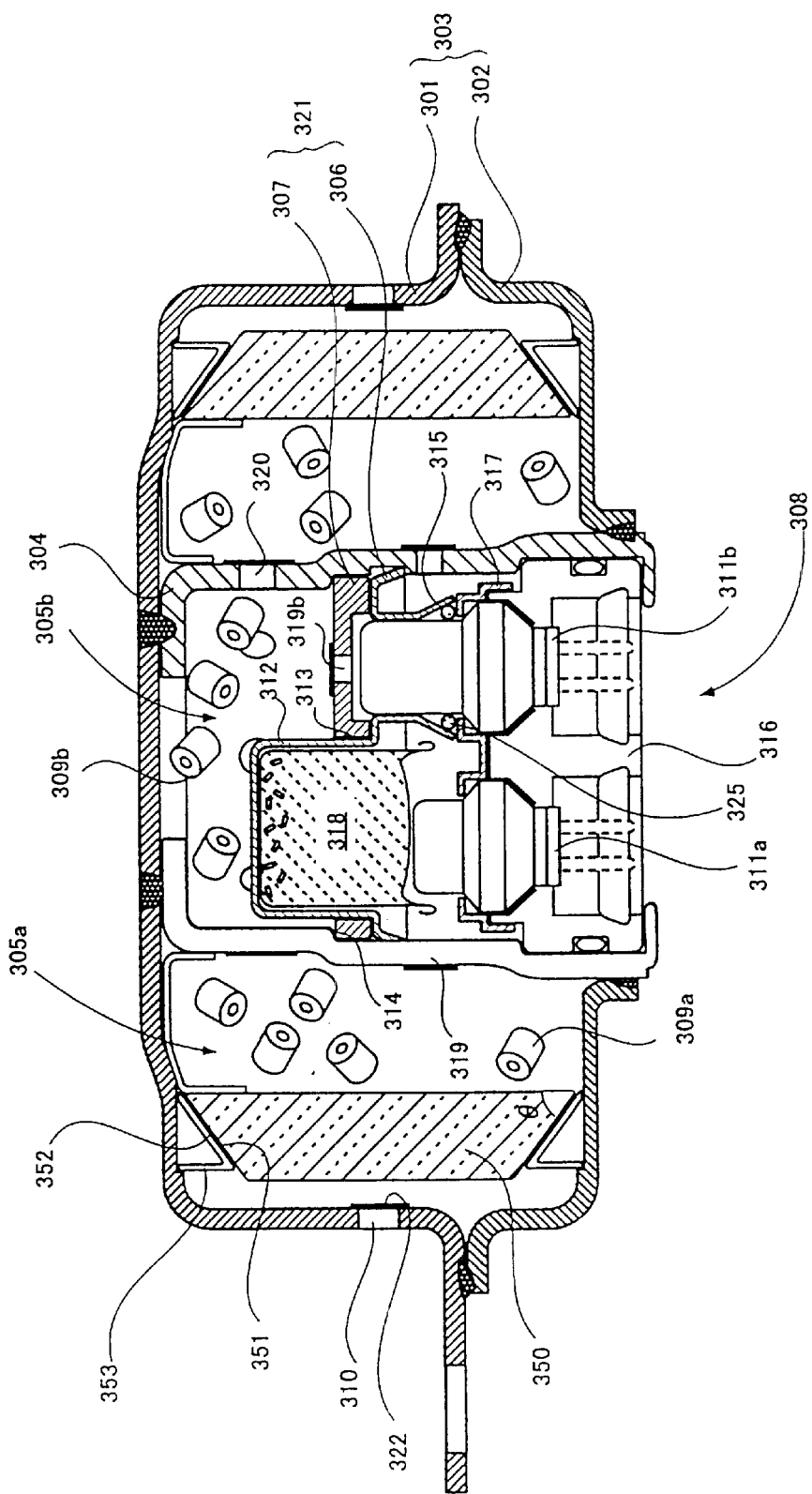
FIG. 19 is a vertical cross sectional view showing the embodiment of a gas generator of the present invention.

FIG. 19 is a vertical cross sectional view showing one embodiment of a gas generator for an air bag of the present invention. Especially, the gas generator shown in this drawing is a pyrotechnic type gas generator for generating the actuation gas by combustion, and has a structure which is longer in its diametrical direction than in the axial direction.

In the gas generator shown in the present embodiment, a diffuser shell 301 having a gas discharge port 310 and a closure shell 302 forming an internal space in cooperation of the diffuser shell are joined to each other to form a substantially cylindrical housing 303. An inner cylindrical member provided at its peripheral wall with a plurality of through-holes 320 is disposed in the housing 303 concentrically. The outside of the inner cylindrical member 304 is formed as a first combustion chamber 305a. Inside of the inner cylindrical member is divided into two chambers by a partition wall 321 comprising a seal cup member 106 and a dividing circular member 307, and the two chambers are adjacent to each other in the axial direction. One of the chambers closer to the diffuser shell 301 is a second combustion chamber 305b, and the other chamber closer to the closure shell 302 is an ignition means accommodating chamber 308. Gas generating agents 309 are disposed in the first and second combustion chambers, and the gas generating agents disposed in the combustion chambers are independently ignited and burnt by the actuation of two igniters 311a, b disposed in the ignition means accommodating chambers.

Figure 20:
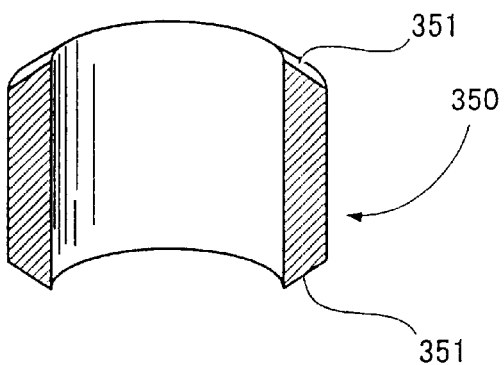
FIG. 20 is a vertical cross sectional view showing an embodiment of filter means of the invention.

A filter means 350 of one embodiment of the present invention is used in the housing 303. FIG. 20 shows a partial sectional view of the filter means 350. In the filter means having substantially cylindrical shape as a whole, axially opposite end surfaces thereof are inclined, being narrowed in the axial extending direction, to form an inclining end surface 351 whose interior angle θ with respect to the inner peripheral surface is acute angle. More specifically, the upper end surface thereof is inclined so as to descend outwardly in the radial direction, and the lower end surface thereof is inclined so as to ascend outwardly in the radial direction. This filter means 350 can be made by laminating cylindrically wire mesh made of various wire rods to form a laminated wire mesh filter, and then compress-molding the filter. As shown in FIG. 19, the filter means 350 is disposed in the housing so as to be opposed to an inner peripheral surface of the housing 301. A supporting member 353 having an inclining surface 352 opposed to an inclining end surface 351 of the filter means is disposed in the housing in the axial direction of the end surface of the filter. The inclining surface 352 of the supporting member 353 functions as a supporting portion of the filter means 350. That is, in this embodiment, the filter means 350 whose both axially opposite ends are formed as the inclining end surfaces 351 is used, and the filter means supporting members 353 are provided on axially opposite sides of the filter means in the housing. The inclining surface 352 of the filter means supporting member 353 abuts and supports the inclining end surface 351 of the filter means 350 which expands in the radial direction.

A partition wall 321 defining an interior of the inner cylindrical member into the second combustion chamber 305b and the ignition means accommodating chamber 308 comprises a seal cup member 306 and a substantially flat plate-like dividing circular member 307. A transfer charge accommodating portion 312 provided in the seal cup member 306 is combined so as to project from an opening portion 313 of the dividing circular member. The partition wall 321 is engaged with and fixed to a step notch 314 of the inner cylindrical member. The seal cup member 306 includes a cylindrical igniter receiving port 315 extending into the opposite side of the transfer charge accommodating portion 312, and a second igniter 311b is accommodated in the igniter receiving port 315.

The first igniter 311a and the second igniter 311b are accommodated in an initiator collar 316, and supported by and fixed to an igniter fixing member 317 which covers the collar 316. The igniter receiving port 315 of the seal cup member 306 is located in the vicinity of the igniter fixing member 317, and an O-ring 325 is disposed therebetween. With this arrangement, sealing between the first igniter 311a and the second ii 311b, as well as between the second combustion chamber 305b and the housing are realized.

This gas generator is actuated in such a manner that, on actuation of the first igniter 311a, the first transfer charge 318 accommodated in the transfer charge accommodating portion 312 of the seal cup member 306a is ignited and burnt, the flame is discharged from the first flame-transferring hole 319a provided in the inner cylindrical member 304 into the first combustion chamber 305a to ignite and burn the first gas generating agent 309a. The second igniter 311b accommodated in the igniting means accommodating chamber 308 is actuated simultaneously with or slightly later than the first igniter 311a, the flame is discharged into the second combustion chamber 305b from the second flame transferring hole 319b formed in the dividing circular member 307, thereby burning the second gas generating agent 309b. The actuation gas generated by combustion of the second gas generating agent is discharged into the first combustion chamber 305a from the through-hole 320 provided in the inner cylindrical member 304.

The actuation gas generated by combustion of the first gas generating agent 309a and the second gas generating agent 309b passes through the filter means 350 disposed so as to surround radially the outer side of the first combustion chamber 305a, and during that period, a combustion residue is collected and the gas is cooled. At that time, the filter means 350 slightly expands outwardly in the radial direction due to the pressure and the like of the actuation gas. The expanded filter means is abutted against and supported by the filter means supporting member 353 which is disposed in the axial direction of the filter, and the short pass of the actuation gas such that the actuation gas passes through the gap between the filter means end surface and the filter means supporting member 353 can be prevented. Namely, the filter means 350 is a self-contracting type filter which is contracted by itself due to passage of the actuation gas. The actuation gas which has passed through the filter means 350 breaks the seal tape 322 which closes the gas discharge port 310, and is discharged out from the housing through the discharge port 310.

In the gas generator of the present embodiment, known gas generating agents 309a, b, transfer charge 318, igniters 311a, b and the like can be used.

Figure 21:
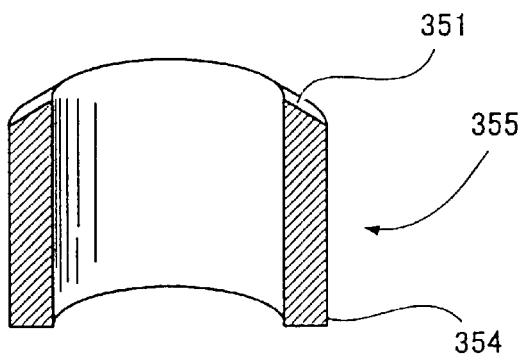
FIG. 21 is a vertical cross sectional view showing another embodiment of the filter means.
Figure 22:
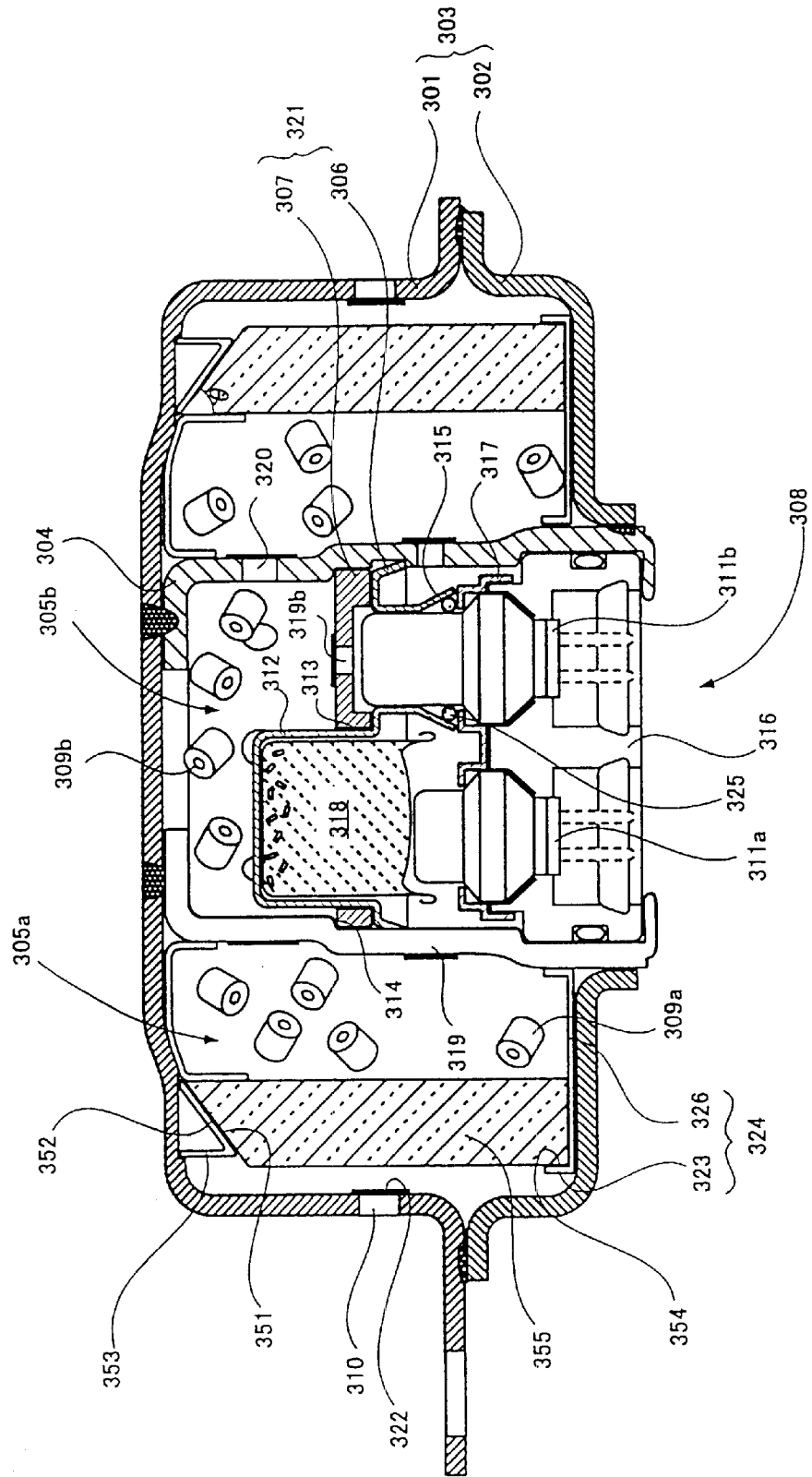
FIG. 22 is a vertical cross sectional view showing another embodiment of the gas generator.

In the present embodiment, it is possible to use filter means provided at its only one side with the inclining surface as shown in FIG. 21, i.e., a filter means 355 which is substantially cylindrical shape as a whole, and axially one end surface thereof adjusted to be inclined, being narrowed in the axial extending direction, to form an inclining end surface 351 whose interior angle θ with respect to the inner peripheral surface is an acute angle. However, in this case, as shown in FIG. 22, the filter means supporting member 353 disposed in the housing 303 is disposed only on the side where the inclining end surface 351 of the filter means is formed, and a retainer 324 comprising an annular portion 323b and a wall surface portion 323a having the inner and outer peripheries is disposed on the opposite side (i.e., on the closure shell 302 side). A outer peripheral skirt portion 354 of the filter means is abutted against and supported by an inner surface of an outer peripheral wall 323a of the retainer.

In the gas generator shown in FIG. 22, if the actuation gas is generated by the burning of the first and second gas generating agents, the actuation gas expands the filter means 355 outwardly in the radial direction when the gas passes through the filter means as the gas generator shown in FIG. 19. The radially expanded filter means 355 is abutted at its inclining end surface 351 against the inclining surface 352 of the filter means supporting member 353, the outer peripheral skirt portion 354 is abutted against the inner surface of the outer peripheral wall of the retainer 324. Therefore, this filter means 355 also becomes a self-contracting type filter which is contracted by itself by passage of the actuation gas due to the inclining end surface 352 formed on the upper end surface.

Embodiment of Self-contracting Type Filter 2

Figure 23:
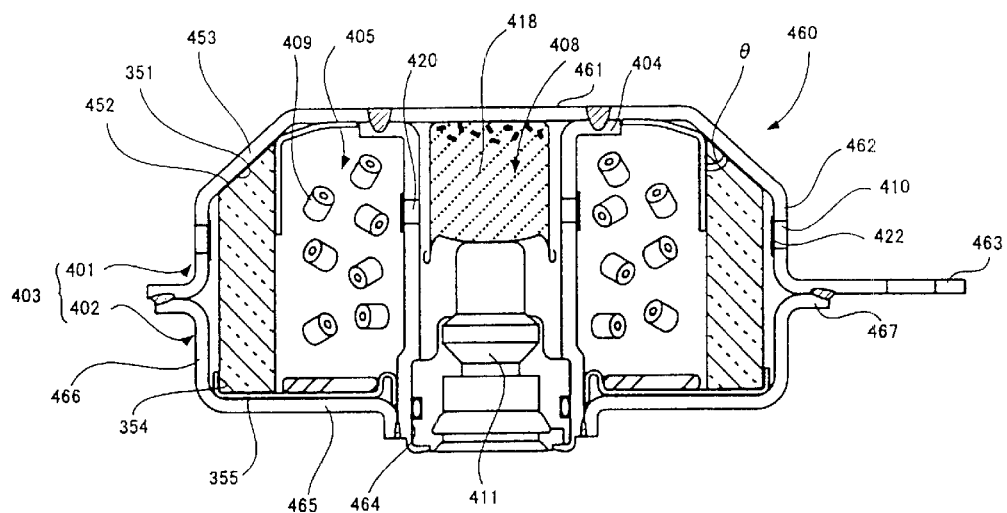
FIG. 23 is a vertical cross sectional view showing still another embodiment of the gas generator.

A gas generator shown in FIG. 23 is characterized in that an inclining surface 452 which is inclined so as to be narrowed outwardly in the radial direction is formed on the inner surface of the housing 403. This inclining surface 452 is formed inside the housing axially on the side where the inclining surface of the filter means is formed. In the present embodiment, the inclining surface functions as a supporting portion of the filter means, and this is provided by forming an inclining portion which inclines in a chamfering shape on a peripheral edge of a circular portion 461 of the housing 403.

In the gas generator shown in this embodiment, the housing 403 comprises a diffuser shell 401 having a gas discharge port 410 and a closure shell 402 forming an interior space in cooperation with the diffuser shell. A substantially cylindrical inner cylindrical member 404 provided at its peripheral wall with a plurality of through-holes 420 is disposed in the housing 403, and outside of the cylindrical member is defined as a combustion chamber 405 and inside thereof is defined as an ignition means accommodating chamber 408. A gas generating agent 409 for generating the actuation gas by combustion is accommodated in the combustion chamber 405. An ignition means comprises an igniter 411 and a transfer charge 418 is disposed in the ignition means accommodating chamber 408. Disposed radially outside of the combustion chamber 405 is filter means 355 provided at its only one side with the inclining surface as shown in FIG. 21, i.e., filter means 355 which is substantially cylindrical shape as a whole, and axially one end surface thereof is inclined, being narrowed in the axial extending direction, to form an inclining end surface 351 whose interior angle θ with respect to the inner peripheral surface is an acute angle.

Especially in this embodiment, a filter means supporting member as shown in Embodiment 1 is not disposed in the axial direction of the inclining end surface 351 of the filter means 355. This is because that the inclining surface 452 against which the inclining end surface of the filter means abuts is formed in the housing 403 at a location where the filter means 355 is disposed and the inclining end surface 351 is formed. Therefore, in this embodiment, the inclining surface 452 functions as the supporting portion of the filter means 355.

The housing 403 having such an inclining surface can be realized by press-molding various metal plates such as a stainless steel plate, a nickel plated steel plate and an aluminum alloy plate to form the diffuser shell and the closure shell, and forming the inclining portion 453 on the shell (diffuser shell 401 in the present embodiment) on the side of which the inclining surface 351 of the filter means 355 is provided.

In the present embodiment, the diffuser shell 401 constituting the housing comprises a circular portion 461 forming a ceiling surface, an inclining portion 453 which is inclined so as to spread like a fan outwardly in the radial direction from the outer periphery of the circular portion, a peripheral wall 462 bent from a tip end of the inclining portion and extended downward, and a flange portion 463 bending from the lower end of the peripheral wall and spreading radially outward of the housing. The closure shell 402 comprises an annular portion 465 provided at its central portion with a hole 464 in which the inner cylindrical member 404 is included, a peripheral wall 466 rising from the outer peripheral edge of the annular portion in the axial direction of the housing, and a flange portion 467 bending from the upper end of the outer peripheral wall and spreading radially outward of the housing. The flange portions of both the shells are joined to each other by various welding methods to form the housing. The diffuser shell 401 is formed at its peripheral wall surface with a plurality of gas discharge ports 410 for discharging the actuation gas, and the gas discharge ports are closed by moisture-proof seal tape 422. A tape which is ruptured by the actuation gas is used as the seal tape 422.

In the housing formed in this manner, an inner surface of the inclining portion 453 of the diffuser shell 401 is also formed as an inclining surface spreading downward like a fan, and more specifically, as the inclining surface 452 inclining downward radially outward. The filter means 355 is disposed in the housing 403 so that its inclining end surface 351 is opposed to the inclining surface 452. The inclining surface 452 formed on the inner surface of the housing functions as a supporting member of the filter means like the inclining surface of the filter means supporting member of Embodiment 1, and abuts and supports the inclining end surface 351 of the filter means which expands outwardly in the radial direction due to passage of the actuation gas.

In the present embodiment also, like the gas generator shown in FIG. 22, a retainer 424 comprising a flat plate annular portion 422 and a wall surface 423 provided at its inner periphery and outer periphery is disposed on an end surface of the filter means 355 on the side where the inclining end surface is not formed. The outer peripheral skirt portion of the filter means is abutted against and supported by an inner surface of the outer peripheral wall 423 of the retainer 424.

According to the gas generator shown in this drawing, when the igniter 411 is actuated, the transfer charge 418 disposed above the igniter 411 is ignited and burnt, and the flame is ejected from the through-hole 420 of the inner cylindrical member 404 into the combustion chamber 405 in which the gas generating agent 409 is accommodated. The flame of the transfer charge 418 ejected into the combustion chamber ignites and burns the gas generating agent 409, thereby generating the actuation gas for expanding the air bag. This actuation gas is purified and cooled while it passes through the filter means 355, and breaks the seal tape 422 and is discharged from the gas discharge port 410.

While the actuation gas passes through the filter means 355, the filter means is expanded radially outward due to the pressure. If the filter means 355 is expanded radially outward, its inclining end surface 351 abuts against the inclining surface 452 of the housing inner surface, and it is possible to prevent the short pass of the actuation gas between the filter means end surface (the inclining end surface 351) and the housing inner surface.

Therefore, in the gas generator shown in this embodiment, since the inclining end surface 351 of the filter means are pressed to the inclining surface 452 of the inner surface of the housing, it is possible to prevent the short pass of the actuation gas in the end surface of the filter means 355 without disposing a special member for supporting the filter means 355.

In this gas generator also, a known gas generating agent 409, transfer charge 418, igniter 411 and the like can be used.

Embodiment of Self-contracting Type Filter 3

Figure 24:
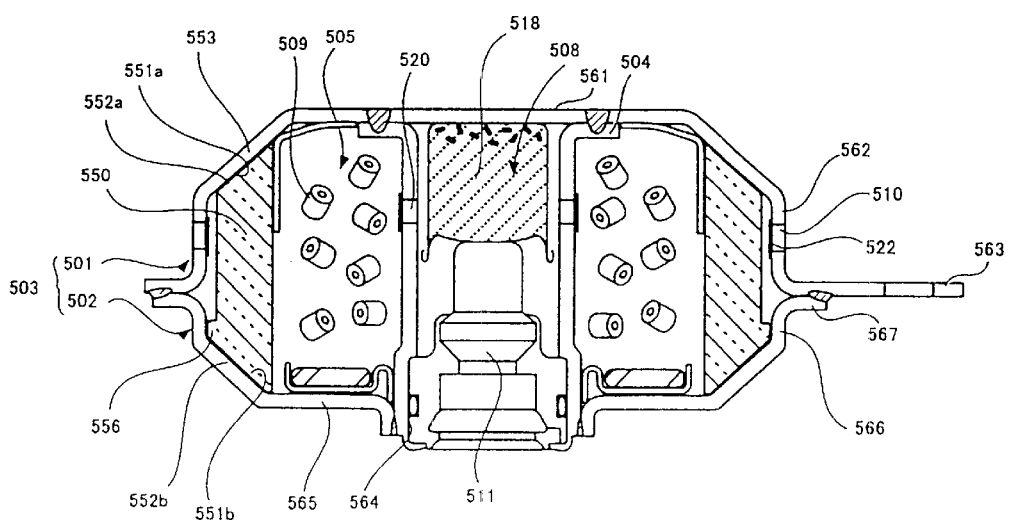
FIG. 24 is a vertical cross sectional view showing another embodiment of the gas generator.

FIG. 24 shows a gas generator for an air bag of the present invention of another embodiment. The gas generator shown in FIG. 24, like the gas generator shown in FIG. 23, an inner surface of a housing 503 is formed with inclining surfaces 552a, b, and inclining end surfaces 551a, b provided on an end surface of the filter means 550 are supported by the inclining surfaces 552a, b.

Unlike the gas generator shown in Embodiment 2, the gas generator shown in the present embodiment uses the filter means 550 which is provided at its axially end surfaces with inclining end surfaces 551. The inclining surfaces 551 formed on the opposite sides of the axial end surfaces of the filter means are inclined so as to be narrowed radially outward, the upper end surface 551a is inclined so as to descend outwardly in the radial direction, and the lower end surface 551b is inclined so as to ascend outwardly in the radial direction. A lower portion of the filter means of the present embodiment is formed so as to expand radially outward.

The inclining surfaces 552a, b capable of supporting the filter means 550 are formed on an inner surface of the housing 503 so as to be opposed to the inclining end surfaces 551a, b of the filter means. Especially in this embodiment, since the filter means is provided at its opposite sides of axial end surfaces with inclining end surfaces 551, the inclining surfaces 552a, b opposed to the inclining end surfaces 551a, b of the filter means 550 are formed on both the inner surface of the diffuser shell 501 and the inner surface of the closure shell 502. More specifically, the diffuser shell 501 and the closure shell 502 are formed by press-molding using various metal plates as in Embodiment 2, and the inclining portions 553 are formed on the shell on the side of which the inclining surfaces of the filter means 550 are provided, i.e., the diffuser shell 501 and the closure shell 502 in this embodiment. In FIG. 24, the inclining portions 553a, b are formed between a circular portion 561 and a peripheral wall 562 in the diffuser shell 501, and between an annular portion 565 and a peripheral wall 566 in the closure shell 502.

Both the upper and lower end surfaces of the filter means 550 are formed into the inclining end surfaces 551. The filter means 550 is disposed in the housing so that the upper end inclining end surface 551*a* is opposed to the inclining surface 552*a* of the inner surface of the diffuser shell 501, and the lower end inclining end surface 551*b* is opposed to the inclining surface 552 of the closure shell. An expanding portion 556 of a lower portion of the filter means expanding in the radial direction is disposed so that the outer periphery of the expanding portion abuts against the inner surface of a peripheral wall 566 of the closure shell.

According to the gas generator of the present embodiment formed in this manner, when the transfer charge 518 is ignited and burnt by the actuation of the igniter 511, the flame is ejected into the combustion chamber 505 from the through-hole 520 of the inner member 504, thereby igniting and burning the gas generating agent 509. The actuation gas generated by combustion of the gas generating agent 509 is purified and cooled while the gas passes through the filter means 550, and the gas breaks the seal tape 522 and is discharged from the gas discharge port 510. The filter means 550 is expanded radially due to passage of the actuation gas, and the inclining surfaces 551*a, b* provided on the upper and lower ends of the filter means 550 abut against the inclining surfaces 552*a, b* provided on the inner surfaces of both the shells, and it is possible to prevent the short pass of the actuation gas between the end surface of the filter means 550 and the inner surface of the housing 503.

Especially in the gas generator shown in FIG. 24, the outer periphery of the expanding portion of the lower portion of the filter means 550 is in contact with the inner surface of the peripheral wall 566 of the housing. Therefore, when the filter means 550 is expanded due to passage of the actuation gas, a portion thereof comes into contact with the inner surface of the peripheral wall of the housing, and it is possible to suppress further deformation and control the expanding amount. With this arrangement, it is possible to stably secure the contact state between the filter means 550 and the inclining surface 552.

Figure 25:
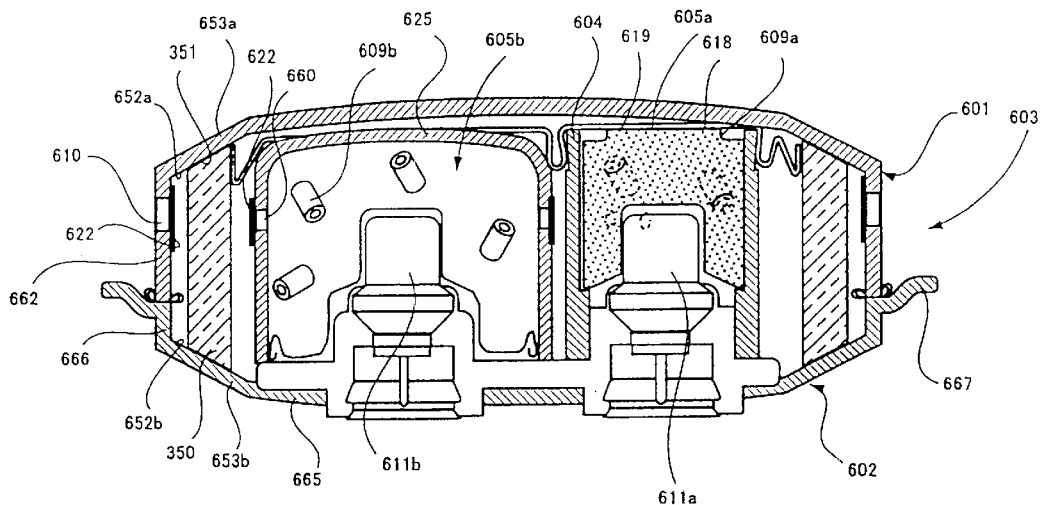
FIG. 25 is a vertical cross sectional view showing another embodiment of the gas generator.

In relation with the present embodiment, the gas generator in which the upper and lower inner surfaces of the housing are provided with inclining surfaces which incline so as to be narrowed in the radial direction can employ a structure shown in FIG. 25.

Figure 26:
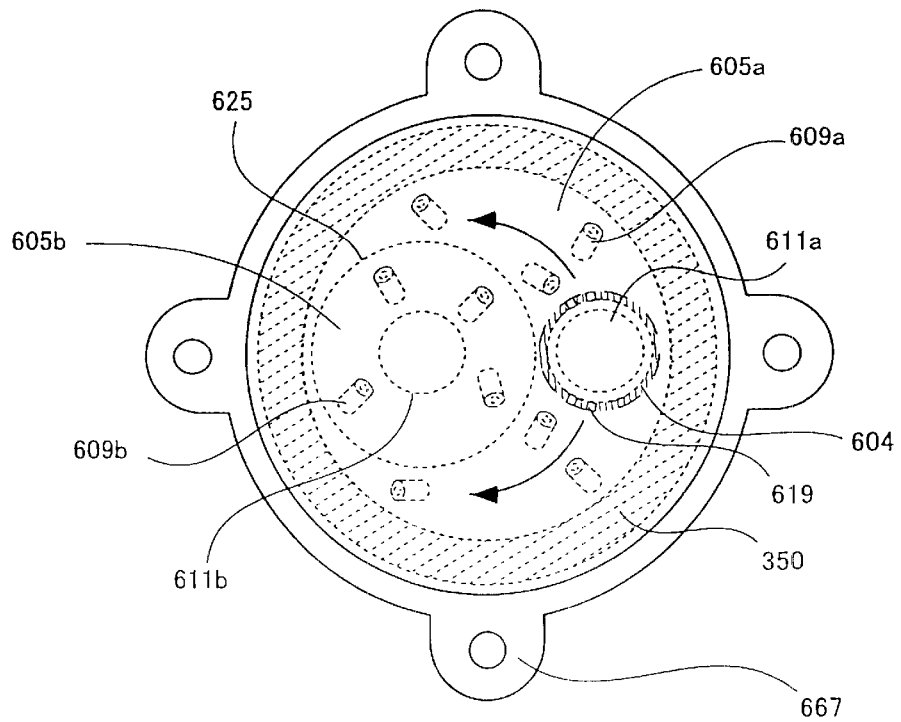
FIG. 26 is a phantom view of the gas generator shown in FIG. 25.

In addition to the internal structure such as layout and the number of combustion chambers and the igniters, the gas generator shown in FIG. 25 is different from the one shown in FIG. 24 in that a diffuser shell 601 and a closure shell 602 are joined by friction welding, and filter means (FIG. 20) which is not provided at its lower portion with an expanding portion is used as filter means 650. FIG. 26 is a schematic plan view of the gas generator for an air bag shown in FIG. 25.

In the gas generator of this embodiment, the diffuser shell 601 having a gas discharge port 610 and the closure shell 602 having a flange portion 667 are joined to each other by friction welding, thereby forming a housing 603. A cylindrical inner shell 625 whose upper opening is closed is disposed in the housing 603 eccentrically with respect to the center axis of the housing. The outside of the inner shell 625 is defined as a first combustion chamber 605*a,* and the inside of the shell 625 is defined as a second combustion chamber 605*b*. Electrical ignition type igniters 611 to be actuated by an electric signal and gas generating agents 609*a, b* which are to be ignited and burnt by actuation of the igniters are accommodated in the combustion chambers 605*a, b,* respectively. Especially, as shown in FIG. 26, the igniter 611*a* in the first combustion chamber 605*a* is disposed inside of the inner cylindrical member 604 in which a flame-transferring hole 619 is provided eccentrically with respect to the peripheral wall. A transfer charge 618 which is to be ignited and burnt by the igniter 611*a* is disposed above the igniter 611*a*. Although the transfer charge is not disposed in the second combustion chamber 605*b* in the drawing, it can be disposed if required.

The inner shell 625 defines the first combustion chamber 605*a* and the second combustion chamber 605*b*, and a peripheral wall thereof provided with an opening portion 660. The opening portion is closed by a seal tape 622 or the like. The seal tape 622 or the like for closing the opening portion 660 is formed so as to be burst, peeled, burnt or detached by combustion of the second gas generating agent 609*b* accommodated in the second combustion chamber 605*b*. The opening portion 660 is formed so that it does not open by combustion of the gas generating agent 609*a* in the first combustion chamber 605*a*.

In the gas generator shown in FIG. 25, the housing 603 is formed by joining the diffuser shell 601 and the closure shell 602 by the friction welding. The diffuser shell 601 is formed with an inclining portion 653*a* which is inclined so as to be narrowed toward the ceiling surface 661 from the peripheral wall 662. The closure shell 602 is also formed with an inclining portion 653*b* which is inclined so as to be narrowed toward the bottom surface 665 from the peripheral wall 666. The inner surfaces of the inclining portions 653*a, b* of both the shells are the inclining surfaces 652 which is opposed to inclining end surfaces 651 of the filter means 650, and these inclining surface 652 functions as a supporting portion of the filter means 650. In the drawing, the inclining portions 653*a, b* are formed by bending the shells, but it is also possible to form the inclining portions by curving the shells.

Filter means 350 as shown in FIG. 20 whose upper and lower ends are formed with inclining end surfaces 651 is disposed in the housing 603. In the drawing, the filter means 350 is disposed so that its upper inclining end surface 351 is opposed to the inclining surface 652*a* of the diffuser shell, and its lower inclining end surface 351 is opposed to the inclining surface 652*b* of the closure shell 602.

In this gas generator, when the first igniter 611*a* is actuated, the first transfer charge 618 is ignited and burnt. The flame of the transfer charge 618 is discharged in the direction shown with the arrow in FIG. 26 so that the flame surrounds the inner shell 625 from the flame-transferring hole 619 provided eccentrically with respect to the inner cylindrical member 604. The flame discharged from the flame-transferring hole 619 ignites and burns the gas generating agent 609*a* in the first combustion chamber 605*a*. The second igniter 611*b* is actuated simultaneously with or slightly later than the first igniter 611*a*. The second gas generating agent 609*b* in the second combustion chamber 605*b* is ignited and burnt by the actuation of. the igniter 611*b*, thereby generating the actuation gas. The opening portion 620 provided in the peripheral wall of the inner shell 625 is opened due to the pressure of the actuation gas. With this opening, the actuation gas generated by combustion of the second gas generating agent 609*b* flows into the first combustion chamber 605*a*.

The actuation gas generated by combustion of the first gas generating agent 609*a* and the second gas generating agent 609*b* is purified and cooled while the gas passes through the filter means 350, and the gas breaks the seal tape 622 and is discharged from the gas discharge port 610. In the gas generator shown in this drawing also, the filter means 350 expands radially outward by passage of the actuation gas, the inclining end surfaces 351 formed on the upper and lower end surfaces are pressed to the inclining surfaces 652*a, b* in the housing, i.e., the supporting portion, and it is possible to prevent the short pass of the actuation gas between the end surface of the filter means 350 and the inner surface of the housing 603.

Embodiment of Self-contracting Type Filter 4

Figure 27:
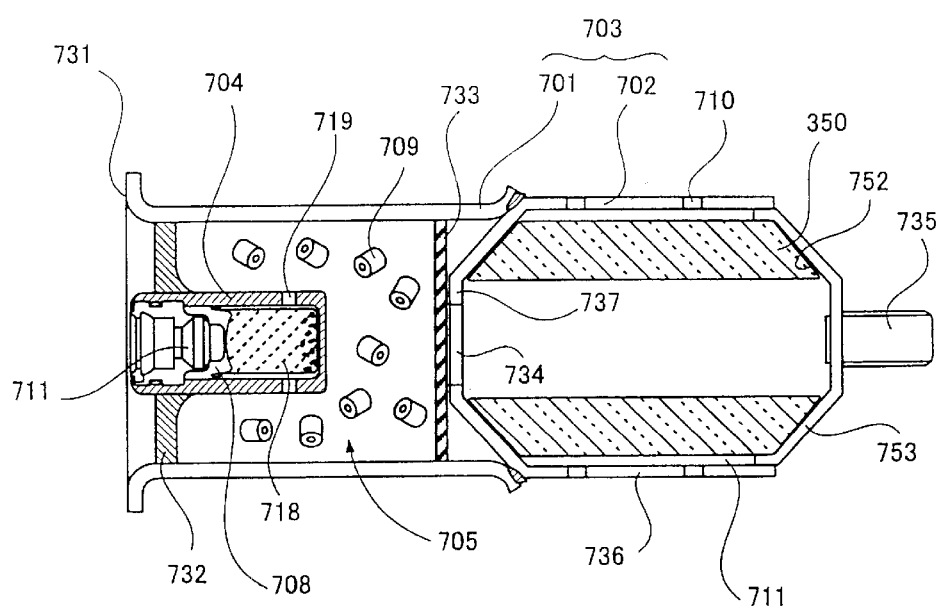
FIG. 27 is a vertical cross sectional view showing another embodiment of the gas generator.

FIG. 27 is a vertical cross sectional view showing another embodiment of the gas generator using filter means of the present invention. The gas generator shown in this embodiment is longer in the axial direction than the inner diameter thereof.

In the gas generator shown in FIG. 27, a filter means accommodating container 702 (hereinafter referred to "a filter container") in which filter means 750 is accommodated is connected to axially one end opening 730 of a cylindrical member 701, thereby forming a housing 703. The other end opening 731 is closed by an annular member 732 in which an ignition means container 704.

In the housing, a gas generating agent 709 which is to burnt to generate the actuation gas is accommodated in the cylindrical member 701. The interior space of the cylindrical member 701 functions as the combustion chamber 705 in which the gas generating agent burns. A circular porous plate 733 spreading in the diametrical direction is disposed on the end on the side of the filter container 702 in the combustion chamber 705. The gas generating agent 709 in the combustion chamber 705 is supported by the porous plate 733.

The igniting means container 704 fitted in the annular member 732 closes an end surface projecting into the combustion chamber 705. An ignition means accommodating chamber 708 separated from the combustion chamber 705 is provided inside the end surface. The ignition means comprising an igniter 711 and a transfer charge 718 is accommodated in the ignition means accommodating chamber 708. A plurality of flame-transferring holes 719 are formed in the peripheral wall of the ignition means container 704, and the flame generated by actuation of the ignition means is ejected from the flame-transferring holes 719 into the combustion chamber 705, thereby igniting and burning the gas generating agent 709.

The filter container 702 is substantially cylindrical shape as a whole, and peripheral edges of axially opposite end surfaces thereof are formed with inclining portions 753 which is formed like the chamfering shape and inclined so as to be narrowed in the axial direction of the container. A through-hole 734 is formed in the end surface of the filter container 702 on the side of the housing, and the other end surface is provided with a stud bolt 735 for mounting the gas generator to the module. A plurality of gas discharge ports 710 are formed in the peripheral wall. The interior space of the filter container 702 is in communication with the combustion chamber 705 through the through-hole 734 formed in the end surface of the housing. In the drawing, the filter container 702 is formed by closing the opened end of the cup-like member comprising a peripheral wall surface 736, an inclining portion 753 and a housing side end surface 737 by a lid member comprising an inclining portion 753 and an end surface 739 including the stud bolt 735.

The filter means 350 of the present invention shown in FIG. 20, i.e., a filter means which is substantially cylindrical shape as a whole and the inclining end surfaces 351 which is inclined so as to be narrowed in the axial extending direction are formed on axially opposite end surfaces thereof is accommodated in the filter container 702. The filter means 350 is disposed so that its inclining end surface 351 is opposed to the inner surface of the inclining portion 753 of the filter container 702, i.e., the inclining surface 752. A gap 741 having a predetermined width is secured between the outer peripheral surface of the filter means and the inner wall surface of the filter container 702.

At the time of actuation of this gas generator, when the igniter 711 is actuated, the transfer charge 718 is ignited and burnt, and the flame thereof is ejected from the flame-transferring hole 719 of the ignition means container 704 into the combustion chamber 705. The gas generating agent 709 is ignited and burnt by the flame of the transfer charge 718 ejected into the combustion chamber 705, thereby generating the actuation gas. The actuation gas flows into the filter container 702, and is purified and cooled while the gas passes through the filter means 350, and discharged from the gas discharge port 710. With passage of the actuation gas through the filter means 350, the filter means 350 expands in the diametric direction, its inclining end surface 351 abuts against the supporting portion (i.e., the inclining surface 752) on the inner surface of the inclining portion 753 of the filter container 702, and contracted in the axial direction. As a result, the filter means 350 is strongly pressed to the inner surface of the filter container 702, and it is possible to prevent the short pass of the actuation gas passing between both the members.

A Gas Generator Having a Plurality of Igniters

Further, the present invention includes a gas generator for an air bag, comprising a housing with a plurality of gas discharge ports which forms an outer shell container and accommodates two or more ignition means to ignite on an impact and a gas generating means which are to be independently ignited and burnt by the ignition means so as to generate a combustion gas for inflating an air bag, wherein the gas discharge ports are closed by sealing means for maintaining an internal pressure of the housing to the given pressure, and by controlling the gas discharge ports and/or the sealing means, a breaking pressure for breaking the sealing means is adjusted at multiple stages and thereby a difference of the housing maximum internal pressures at the time when each ignition means is activated can be suppressed.

Figure 32:
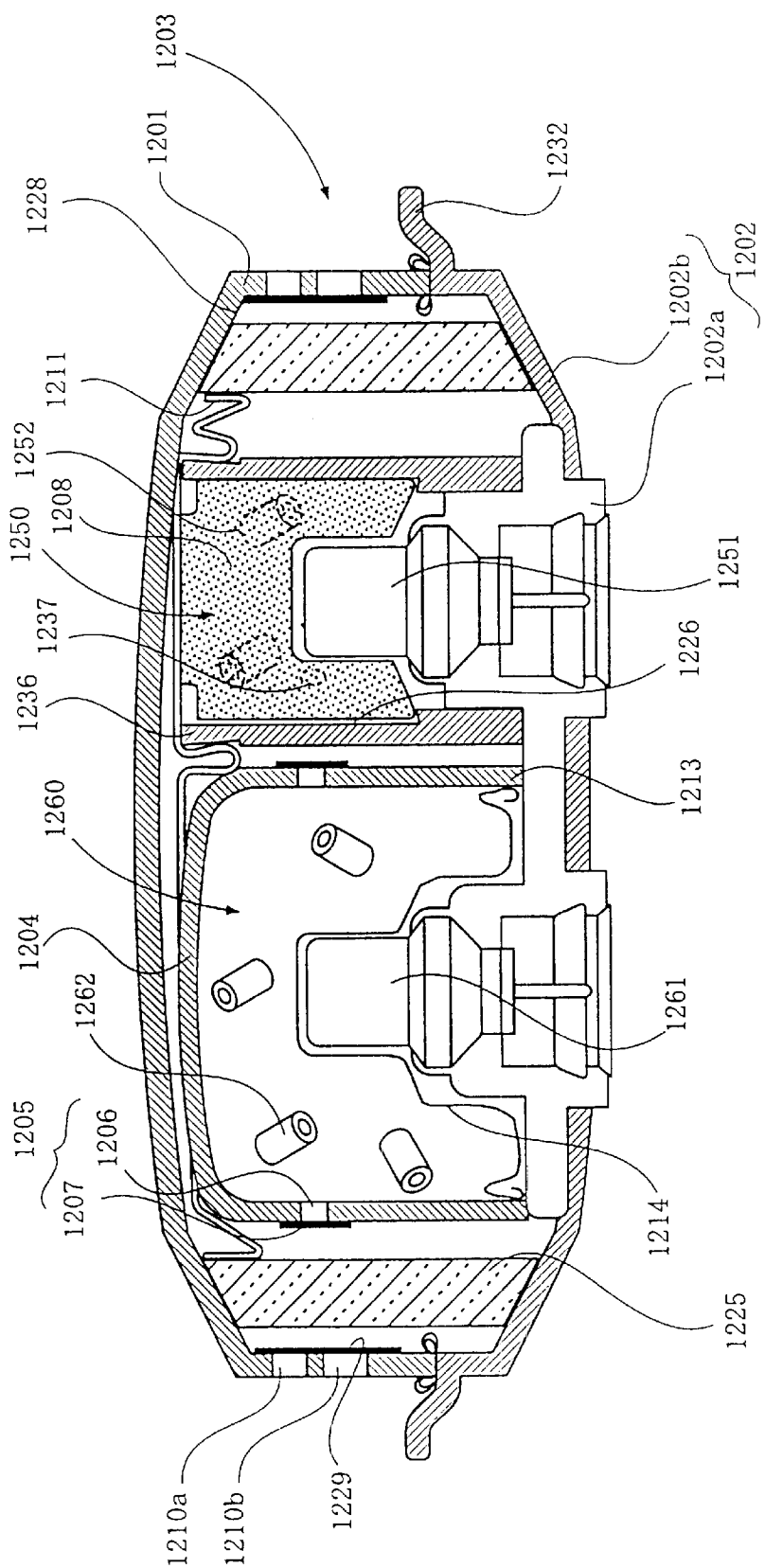
FIG. 32 is a vertical cross sectional view showing still another embodiment of the gas generator for the air bag.

FIG. 32 is a vertical cross sectional view which shows a gas generator for an air bag according to the other embodiment of the present invention. The gas generator shown in this embodiment also has a structure being particularly suitable for being arranged in a driver side.

In particular, the gas generator shown in this embodiment is characterized by an arrangement of two combustion chambers provided in the housing and a forming method.

Also in the present embodiment, a gas discharge port 1210 formed in a diffuser shell 1201 has two kinds of gas discharge ports 1210a and 1210b having different diameters, and these are closed by a seal tape 1229 for protecting a gas generating agent 1252 from an influence of an environment such as a humidity outside the housing. By providing two kinds of gas discharge ports 1210a and 1210b having different inner diameters (and opening areas), a combustion internal pressure in the housing 1203 at an actuation can be equalized (stabilizing of a combustion performance).

That is, in the gas generator shown in this embodiment, in a cylindrical housing 1203 obtained by joining a diffuser shell 1201 having a plurality of gas discharge ports 1210 and a closure shell 1202 for forming an inner storing space together with the diffuser shell 1201 and applying a friction welding to these shells, a cylindrical inner shell 1204 in a capsule-like shape having a circle in the horizontal cross section and a closed upper end is arranged and fixed eccentrically with respect to the center axis of the housing, thereby forming a first combustion chamber 1250 is formed in an outer side thereof and forming a second combustion chamber 1260 in an inner side thereof.

A eccentric degree of the inner shell 1204 arranged in the housing 1203 with respect to the housing 1203 can be suitably changed according to a desired volume ratio of a combustion chamber and the like, and may be changed according to a structure inside the housing 1203, for example, whether or not a coolant/filter 1225 exists. As an example, like the gas generator shown in this drawing, when the coolant/filter 1225 is arranged opposite to a peripheral wall surface of the housing 1203, it is possible to suitably select the eccentric degree in a range between 10 and 75%. However, since this range can be changed due to a size of the igniters 1251 and 1261 and the like, the range is only a measure of eccentricity of the inner shell 1204 in the gas generator shown in FIG. 32.

The inner shell 1204 may be formed in various kinds of shapes such as a rectangular shape, an oval shape and the like in a horizontal cross section, in order to join easily to the closure shell 1202, etc., it is preferable to be formed in a circular shape. In other wards, the horizontal cross sectional shape of the inner shell 1204 has to be a circular shape when joining the inner shell 1204 and the closure shell 1202 by a friction welding, and also when joining by a laser welding, it is necessary to keep an emitting distance of the laser constant.

As mentioned above, in this embodiment, the first combustion chamber 1250 and the second combustion chamber 1260 are defined by the inner shell 1204. That is, the first combustion chamber 1250 is provided on the outer side of the inner shell 1204, and the second combustion chamber 1260 is provided on the inner side of the inner shell 1204. A volume ratio between the first combustion chamber 1250 and the second combustion chamber 1260 (a volume of the first combustion chamber:a volume of the second combustion chamber) is set to 3.3:1 in the present embodiment, and it can also be suitably selected in a range of 97:1 to 1:1.1. However, also with respect to the volume ratio, the selected range can be suitably changed due to a size of the igniters (1251, 1261) and a shape of the gas generating agents (1252, 1262). Accordingly, the above range shows a range which can be selected in the structure of the gas generator shown in this drawing.

As mentioned above, the gas generating agents (1252, 1262) are respectively stored in the second combustion chamber 1260 and the first combustion chamber 1250 which are partitioned by the inner shell 1204. The first gas generating agent 1252 is stored in the first combustion chamber 1250 and the second gas generating agent 1262 is stored in the second combustion chamber 1260, respectively. In the present embodiment, the first gas generating agent 1252 and the second gas generating agent 1262 have the same shape or the like. The gas generating agents different from each other in at least one of a burning rate, a composition, a composition ratio and an amount can be stored in the respective combustion chambers.

The inner shell 1204 which defines the first combustion chamber 1250 and the second combustion chamber 1260 is arranged eccentrically with respect to the center axis of the housing 1203, and the second combustion chamber 1260 provided inside the inner shell 1204 is eccentric with respect to the housing 1203. The igniters are respectively arranged in the first combustion chamber 1250 and the second combustion chamber 1260, the second igniter 1261 arranged in the second combustion chamber 1260 is disposed in the center of the second combustion chamber 1260 which is eccentric with respect to the center axis of the housing 1203. Therefore, a flame generated by an activation of the igniter 1261 can uniformly burns the second gas generating agent 1262. And the second igniter 1261 and the first igniter 1251 disposed in the first combustion chamber 1250 are both arranged eccentrically with respect to the center axis of the housing 1203. As mentioned above, by arranging eccentrically the first and second igniters as well as the inner shell 1204 with respect to the center axis of the housing 1203, a range of a difference in the volume ratio of the first and second combustion chambers can be made larger, and the size of the housing 1203 in a diametrical direction can be restricted as much as possible.

Among the igniters arranged in the respective combustion chambers, the igniter 1251 arranged in the first combustion chamber 1250 has a transfer charge 1208 arranged in a peripheral and upper directions thereof. For convenience at assembling the gas generator, or in order to prevent the transfer charge 1208 from being scattered in the first combustion chamber 1250 due to the impact and the vibration applied at mounting on the vehicle, and to prevent an ignition performance to the first gas generating agent 1252 form being slipped, the transfer charge 1208 is stored in a transfer charge container 1226. The transfer charge container 1226 is easily broken due to the combustion of the transfer charge 1208 arranged therein and formed by an aluminum having a thickness (for example, about 200 $\mu$m) so as to transfer the flame to the periphery thereof. On the other hand, a transfer charge like the one arranged in the first combustion chamber 1250 is not necessarily required in the second combustion chamber 1260. This is because the second gas generating agent 1262 is ignited more easily, than the first gas generating agent 1252, and the pressure of the second combustion chamber is increasing in a sealed state until the breaking member 1207 for sealing a hole 1206 of the below-described inner shell 1204 is ruptured. The breaking member 1207 is not ruptured even when the internal pressure of the combustion chamber 1250 increases due to the combustion of the first gas generating agent 1252 but it is ruptured when the internal pressure of the second combustion chamber 1260 increases more than that of the first combustion chamber 1250. However, the transfer charge can be used as required.

A cylindrical member 1236 is placed in the first combustion chamber 1250 so as to surround an outer side in the radial direction of the first igniter 1251 and the transfer charge 1208 disposed above the igniter. The cylindrical member 1236 is formed into a cylindrical shape open at both upper and lower ends, one end portion thereof is outwardly fitted to an outer periphery of a portion fixed with the igniter 1251 so that no gap is formed. And the other end portion is inserted to be supported by a retainer 1211 disposed near an inner surface of a ceiling portion of the diffuser shell 1201 so as to be fixed to a predetermined portion. A plurality of flame-transferring holes 1237 are formed on a peripheral wall of the cylindrical member 1236, and the flame generated by the combustion of the transfer charge 1208 is injected from the flame-transferring hole 1237 so as to ignite and burn the first gas generating agent 1252 disposed in the outer side of the cylindrical member. It is preferable that the cylindrical member 1236 is made of the same material as that of the housing 1203.

Figure 33:
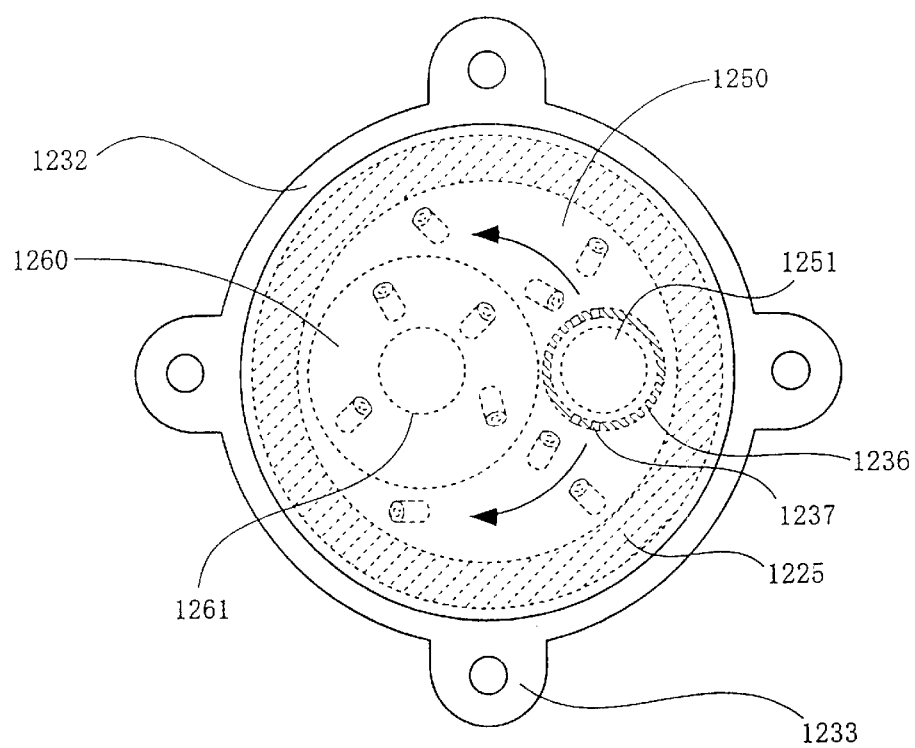
FIG. 33 is a phantom view of the gas generator shown in FIG. 31.

In particular, in the gas generator shown in this embodiment, the first combustion chamber 1250 is formed into an annular shape similar to a crescent shape obtained by stamping an inner side of a circle roundly, as shown in a perspective plan view in FIG. 33, and the first gas generating agent 1252 is placed therein. Accordingly, in the first combustion chamber 1250, as is different from the second combustion chamber 1260, a distance between the gas generating agent 1252 and the igniter 1251 is varied with a place for storing the gas generating agent 1252. Therefore, at a time of ignition of the igniter 1251, the ignition and the combustion of the first gas generating agent 1252 are performed unevenly. Then, the flame-transferring hole 1237 provided in a peripheral wall of the inner cylindrical member 1236 restricts a direction thereof so as to lead the flame of the transfer charge 1208 in a direction shown by an arrow in FIG. 33. Accordingly, it is possible to burn the gas generating agent 1252 in a portion shaded by the second combustion chamber 1260 (i.e. the inner shell 1204) evenly. Further, in place of the inner cylindrical member 1236, a injecting-direction restricting means (not shown) having holes formed in a direction shown by an arrow in FIG. 33 can be used. The injecting-direction restricting means restricts the direction of the injecting flame which is generated by the activation of the first ignition means (the igniter 1251 and the transfer charge 1208 in FIG. 32) for igniting the first gas generating agent 1252, in order to effectively burn the first gas generating agent 1252. As the injecting-direction restricting means, for example, a cuplike container having one end portion closed by a cylinder member and in which a nozzle for leading the flame of the ignition means in a desired direction (a direction shown by an arrow in FIG. 33) is provided on a peripheral wall portion. In this case, the injecting-direction restricting means is used in a state of being mounted (covered) around the first ignition means. Also in the case of using the above injecting-direction restricting means, it is preferable that the first ignition means arranged inside it comprises the igniter and the transfer charge which is to be ignited and burnt by the activation of the igniter.

The inner shell 1204 which defines the first combustion chamber 1250 and the second combustion chamber 1260 is formed into a capsule shape as mentioned above, and a plurality of opening portions 1205 are formed on a peripheral wall thereof. The opening portion 1205 is designed such as to be opened only by the combustion of the second gas generating agent 1262 stored in the second combustion chamber 1260 and is not opened by the combustion of the first gas generating agent 1252 stored in the first combustion chamber 1250. In the present embodiment, the opening portion 1205 comprises a plurality of holes 1206 provided on the peripheral wall of the inner shell 1204 and the breaking member 1207 for closing the hole, and a stainless seal tape is used as the breaking member 1207. The breaking member 1207 is designed such as to be broken, peeled, burnt or removed only by the combustion of the second gas generating agent 1262 so as to open the hole 1206 but not to be broken by the combustion of the first gas generating agent 1252.

The above inner shell 1204 is fixed by connecting an open lower portion 1213 thereof to the closure shell 1202. When the closure shell 1202 comprises the collar portion 1202a for fixing the igniter, the inner shell 1204 can be mounted to the collar portion 1202a. In the gas generator shown in FIG. 32, the closure shell 1202 is formed such as to integrally joint a circular collar portion having a size capable of fixing two igniters on a bottom surface of the cylindrical shell portion 1202b jointed to the diffuser shell 1201, and the inner shell 1204 is jointed to the collar portion 1202a. The collar portion 1202a can be integrally formed on the bottom surface of the cylindrical shell portion 1202b in a circular shape capable of being fixed at each igniter, and can be integrally formed on the bottom surface of the cylindrical shell portion 1202b. In such a case, the inner shell 1204 can be directly mounted on the bottom surface of the cylindrical shell portion 1202b in addition to the collar portion 1202a of the closure shell.

In the present embodiment, a joint of the inner shell 1204 and the closure shell 1202 can be performed by an convex-concave joint in addition to a friction welding, a cramping, a resistance welding and the like. In particular, in the case of joining the both by friction welding, preferably, it is performed in a state of fixing the closure shell 1202. Accordingly, even when the axial cores of the inner shell 1204 and the closure shell 1202 are not aligned to each other, a friction welding can be performed stably. In other words, when friction welding is performed in a state of fixing the inner shell 1204 and rotating the closure shell 1202, a center of gravity of the closure shell 1202 is shifted from a center of rotation and thereby a stable friction welding cannot be performed. Therefore, in the present invention, friction welding is performed in a state of fixing the closure shell 1202 and rotating the inner shell 1204. Further, at friction welding, it is preferable that the closure shell 1202 is positioned and fixed so as to always mount the inner shell 1204 to a determined position. Accordingly, it is preferable that a positioning means is suitably provided in the closure shell 1202. A gas generating agent fixing member 1214 is arranged in the inner shell 1204 in order to safely and smoothly perform a connection to the closure shell 1202. The gas generating agent fixing member 1214 is used in order to prevent the gas generating agent 1262 from directly contacting with the inner shell 1204 at a time of friction welding the inner shell 1204 to the closure shell 1202 and to obtain a placing space for the igniter 1261 inside the space formed by the inner shell 1204. When mounting the inner shell 1204 to the closure shell 1202, in addition to the above friction welding, it is possible to mount by an convex-concave joint as well as a crimping, a resistance welding and the like. Also in this case, an assembly performance is improved by using the gas generating agent fixing member 1214. The gas generating agent fixing member 1214 adopts here a canister made of aluminum and having a thickness which can be easily broken by the combustion of the gas generating agent 1262, as one example, and further, a suitable member capable of achieving the object mentioned above (regardless a material, shape and the like) such as a porous member made of a wire mesh. Besides, when the above gas generating agent fixing member 1214 is not used, it is possible to form a lump of the gas generating agent obtained by forming a lump of the single-hole cylindrical gas generating agent 1262 into the same shape as the inner space of the inner shell 1204 and place it in the inner shell 1204. In this case, the gas generating agent fixing member 1214 may be omitted.

In the present embodiment, the collar portion 1202a of the closure shell 1202 is formed in a size capable of fixing two igniters 1251 and 1261 horizontally. Accordingly, two igniters 1251 and 1261 are previously fixed to the collar portion 1202a by crimping, etc., and then, this collar portion 1202 is integrally formed with the cylindrical shell portion 1202b so as to form the closure shell 1202, and thereby, two igniters 1251 and 1261 can be fixed to the closure shell 1202. In the drawing, the first igniter 1251 and the second igniter 1261 are described in the same size, however, they may be structured such as to have a different output at each combustion chamber. Further, in this embodiment, a cable 1215 connected to each igniter 1251 and 1261 so as to transmit an activating signal is drawn out in the same direction.

A coolant/filter 1225 is arranged in the housing 1203 as filter means for purifying and cooling the combustion gas generated by the combustion of the gas generating agent. The gases generated by the combustion of the first and second gas generating agents both pass through the coolant/ filter 1225. In order to prevent a short pass, that is, to prevent the combustion gas from passing between an end surface of the coolant/filter 1225 and an inner surface of the ceiling portion of the diffuser shell 1201, the upper and lower inner peripheral surfaces of the coolant/filter 1225 and the inner surface of the housing may be covered with a cylindrical short-pass preventing member having an inward flange. In particular, in the gas generator shown in FIG. 32, a self-contracting type coolant/filter 1225 tapers at both upper and lower ends outwardly in the radial direction. A gap 1228 which is a flow path for the combustion gas is formed on the outer side the coolant/filter 1225.

For example, in the gas generator shown in FIG. 32, the igniter (1251, 1261) and the inner shell 1204 are arranged eccentrically with respect to the housing 1203. In the above gas generator, when the diffuser shell 1201 and the closure shell 1202 are joined by friction welding, joining the both the shells can be performed stably by fixing the side of the closure shell 1202 at the time of friction welding. Particularly, when inner shell 1204 is directly mounted to the closure shell 1202 by friction welding, as shown in FIG. 32, it is preferable that a flange portion 1232 for mounting the gas generator to the module case is provided in the side of the closure shell 1202, and a positioning portion is formed in a portion constituting the flange portion 1232, for example, a protruding portion 1233 or the like by notching the peripheral edge thereof. In case of forming in this manner, since the closure shell 1202 is always fixed in a definite direction on the positioning portion, the inner shell 1204 can be securely mounted at a determined position.

In the gas generator formed in the above manner, when the first igniter 1251 arranged in the first combustion chamber 1250 provided on the outer side the inner shell 1204 is activated, the first gas generating agent 1252 in the combustion chamber 1250 is ignited and burnt so as to generate the combustion gas. And a little gap is obtained between the inner shell 1204 and the coolant/filter 1225 and this gap allows a gas flow between the coolant/filter 1225 and the inner shell 1204, and thereby, the combustion gas can effectively use all the surface of the filter 1225. The combustion gas is purified and cooled while passing through the coolant/filter 1225, and thereafter is discharged from the gas discharge port 1210.

On the other hand, when the second igniter 1261 arranged in the inner shell 1204 is activated, the second gas generating agent 1262 is ignited and burnt so as to generate the combustion gas. The combustion gas opens the opening portion 1205 of the inner shell 1204 and flows into the first combustion chamber 1250 from the opening portion 1205. Thereafter, it passes through the coolant/filter 1225 as the combustion gas of the first gas generating agent 1252 does, and is discharged from the gas discharge port 1210. The seal tape 1229 which closes the gas discharge port 1210 is ruptured by passage of the combustion gas generated in the housing 1203. The second gas generating agent 1262 is ignited and burnt due to the activated second igniter 1261, and is never directly burnt on the combustion of the first gas generating agent 1252. This is because the opening portion 1205 of the inner shell 1204 is opened only by the combustion of the second gas generating agent 1262 but is not opened by the combustion of the first gas generating agent 1252.

In the gas generator formed in the above manner, the ignition timings of two igniters is adjusted such as to activate the second igniter 1261 after activating the first igniter 1251, or to simultaneously activate the first igniter 1251 and the second igniter 1261, and thereby an output's forms (an operating performance) of the gas generator can be optionally adjusted so that, under various conditions such as a vehicle speed at a time of collision, an environmental temperature, inflation of the air bag can be made most suitable in the air bag apparatus mentioned below. Particularly, in the gas generator shown in FIG. 32, two combustion chambers are arranged in the radial direction, by whereby a height of the gas generator can be restricted as much as possible.

Also in the gas generator shown in this drawing, a plurality of gas discharge ports 1210 formed in the housing 1203 are structured such that the opening diameter and/or the opening area thereof are controlled in two or more kinds. Therefore, a difference of the housing maximum internal pressure at the time when each ignition means is activated is suppressed, the internal pressure at the time when the gas generator is actuated is equalized, which provides a gas generator for an air bag having a stable combustion performance. Further, also in the gas generator according to this embodiment, by setting the opening area of each gas discharge port 1210 constant but by changing the thickness of the sealing means 1229 such as a seal tape so as to adjust the breaking pressure, a difference of the housing maximum internal pressure at the time when each ignition means is activated can be suppressed. Further, it is naturally possible to control both of the opening diameter and/or the opening surface in the gas discharge port 410 and the thickness of the sealing means 1229.

What is claimed is:
1. A gas generator for an air bag, comprising:
a housing provided with a gas discharge port, the housing having a top plate, a bottom plate, and a cylindrical wall provided between the top plate and the bottom plate;
cylindrical filter means, provided inside the housing, for at least one of purifying and cooling combustion gas generated by combustion of gas generating agents, at least one end of the filter means having an inclining end surface such that a height of the filter means decreases as a distance from a central axis of the filter means in a radial direction thereof increases, an outer peripheral surface of the filter means and an inner surface of the cylindrical wall defining a plenum; and
a supporting portion formed inside the housing and having an inclining surface substantially parallel to the inclining end surface of the filter means, the supporting portion engaging with the inclining end surface such that the plenum is maintained even when the filter means is urged to expand in the radial direction by the combustion gas.

2. A gas generator for an air bag according to claim 1, wherein the supporting portion is an inner surface of the housing substantially parallel to the inclining end surface of the filter means.

3. A gas generator for an air bag according to claim 1, wherein the supporting portion is a member attached to at least one of the top plate and the bottom plate and having the inclining surface substantially parallel to the inclining end surface of the filter means.

4. A gas generator for an air bag according to claim 1, wherein the filter means has inclining end surfaces on upper and lower end thereof, and the housing is provided with corresponding supporting portions.

5. A gas generator for an air bag according to claim 1, further comprising:
a retainer having a circular portion and an outer peripheral wall extending from a periphery of the circular portion, the circular portion extending between one end of the filter means and an inner surface of the housing opposing the one end of the filter and an inner surface of the outer peripheral wall opposing the outer peripheral surface of the filter means.

6. A gas generator for an air bag according to claim 1, wherein said cylindrical filter means is formed by a metal wire.

7. A gas generator for an air bag according to claim 1, wherein said cylindrical filter means extends between the diffuser shell and the closure shell, and the combustion gas is prevented from flowing between the inclining end surface and said inclining surface by a urging the inclining end surface towards said supporting portion due as the cylindrical filter means expands in the radial direction thereof due to the pressure generated by the combustion gas.

8. A method of preventing combustion gas generated in a gas generator housing for an air bag from by-passing in an end portion of a cylindrical filter means, for at least one of purifying and cooling the combustion gas, disposed inside a gas generator housing, comprising:

providing at least one end of the filter means with an inclining end surface such that a height of the filter means decreases as a distance from a central axis of the filter means in a radial direction thereof increases;

providing a plenum defined by an outer peripheral surface of the filter means and an outer peripheral wall of the housing; and providing a supporting portion formed inside the housing having an inclining surface substantially parallel to the inclining end surface of the filter means; and engaging the inclining surface of the supporting portion and the inclining end surface of the filter means such that the plenum is maintained even when the filter means is urged to expand in the radial direction by the-combustion gas.

9. The method according to claim 8, wherein the step of providing at least one end of the filter means with an inclining end surface includes the step of, providing the inclining end surface on each of the upper and lower end surfaces of the filter means.

10. The method according to claim 8, wherein said step of providing the supporting portion further includes, providing the inclining surface of the supporting portion by inclining a portion of the housing.

11. The method according to claim 8, wherein said step of providing the supporting portion further includes, providing a member attached to the housing and having the inclining surface substantially parallel to the inclining end surface of the filter means.

12. The method of claim 8, wherein said step of providing the cylindrical filter means further includes, providing the inclining end surface in each of the upper and lower end surface of the cylindrical filter means.

13. The method of claim 8, further comprising:

providing, in the gas generator housing, a retainer having an circular portion and an outer peripheral wall extending from a peripheral of the circular portion, the circular portion extending between one end of the filter means and an inner surface of the opposing the housing opposing the filter means.

14. An air bag apparatus, comprising:

a gas generator for an air bag, including,
 a housing provided with a gas discharge port, the housing having a top plate, a bottom plate, and a cylindrical wall provided between the top plate and the bottom plate,
 cylindrical filter means, provided inside the housing, for at least one of purifying and cooling combustion gas generated by combustion of gas generating agents, at least one end of the filter means having an inclining end surface such that a height of the filter means decreases as a distance from a central axis of the filter means in a radial direction thereof increases, an outer peripheral surface of the filter means and an inner surface of the cylindrical wall defining a plenum, and
 a supporting portion formed inside the housing and having an inclining surface substantially parallel to the inclining end surface the filter means, the supporting portion engaging with the inclining end surface such that the plenum is maintained even when the filter means is urged to expand in the radial direction by the combustion gas;

an impact sensor for sensing an impact to actuate the gas generator;

an air bag inflated by introducing thereinto a gas generated by the gas generator; and a module case for accommodating the air bag.

* * * * *